(12) United States Patent
Sampath et al.

(10) Patent No.: US 7,796,612 B2
(45) Date of Patent: *Sep. 14, 2010

(54) GIGABIT SWITCH WITH FRAME FORWARDING AND ADDRESS LEARNING

(75) Inventors: Srinivas Sampath, Sunnyvale, CA (US); Mohan Kalkunte, Sunnyvale, CA (US); Shekhar Ambe, San Jose, CA (US); Shiri Kadambi, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/312,496

(22) Filed: Dec. 21, 2005

(65) Prior Publication Data

US 2006/0120389 A1     Jun. 8, 2006

Related U.S. Application Data

(63) Continuation of application No. 09/877,010, filed on Jun. 11, 2001, now Pat. No. 7,046,679.

(60) Provisional application No. 60/270,158, filed on Feb. 22, 2001, provisional application No. 60/210,510, filed on Jun. 9, 2000.

(51) Int. Cl.
*H04L 12/28* (2006.01)
(52) U.S. Cl. ............................. 370/395.53; 370/395.54
(58) Field of Classification Search ........................ None
See application file for complete search history.

(56) References Cited

U.S. PATENT DOCUMENTS

| 5,278,789 A | 1/1994 | Inoue et al. |
| 5,390,173 A | 2/1995 | Spinney et al. |
| 5,414,704 A | 5/1995 | Spinney |
| 5,423,015 A | 6/1995 | Chung |
| 5,459,717 A | 10/1995 | Mullan et al. |

(Continued)

FOREIGN PATENT DOCUMENTS

EP     0312917 A2     4/1989

(Continued)

OTHER PUBLICATIONS

European search report for European application No. 01305062.0.

(Continued)

*Primary Examiner*—Phirin Sam

(57) ABSTRACT

A network switch and a method thereof for network communications include a first data port interface and a second data port interface supporting a data port transmitting and receiving data at a first data rate and a second data rate, respectively. The switch has a CPU interface to communicate with a CPU and a memory management unit to communicate data from at least one of the first and second data port interfaces and a memory. The switch includes a communication channel communicating data and messaging information between the first and second data port interfaces and the memory management unit and lookup tables, including an address resolution lookup table and a VLAN table. The first or second data port interfaces determine an egress port for an incoming data packet from a search of the address resolution lookup table and the VLAN table using a VLAN ID from the incoming data packet.

15 Claims, 39 Drawing Sheets

U.S. PATENT DOCUMENTS

| | | | |
|---|---|---|---|
| 5,473,607 | A | 12/1995 | Hausman et al. |
| 5,499,295 | A | 3/1996 | Cooper |
| 5,509,006 | A | 4/1996 | Wilford et al. |
| 5,524,254 | A | 6/1996 | Morgan et al. |
| 5,555,244 | A | 9/1996 | Gupta et al. |
| 5,555,398 | A | 9/1996 | Raman |
| 5,568,477 | A | 10/1996 | Galand et al. |
| 5,579,301 | A | 11/1996 | Ganson et al. |
| 5,644,784 | A | 7/1997 | Peek |
| 5,652,579 | A | 7/1997 | Yamada et al. |
| 5,691,984 | A | 11/1997 | Gardner et al. |
| 5,696,899 | A | 12/1997 | Kalwitz |
| 5,740,171 | A | 4/1998 | Mazzola et al. |
| 5,742,613 | A | 4/1998 | MacDonald |
| 5,748,631 | A | 5/1998 | Bergantino et al. |
| 5,761,424 | A | 6/1998 | Adams et al. |
| 5,781,549 | A | 7/1998 | Dai |
| 5,787,084 | A | 7/1998 | Hoang et al. |
| 5,790,539 | A | 8/1998 | Chao et al. |
| 5,802,052 | A | 9/1998 | Venkataraman |
| 5,802,287 | A | 9/1998 | Rostoker et al. |
| 5,825,772 | A | 10/1998 | Dobbins et al. |
| 5,828,653 | A | 10/1998 | Goss |
| 5,831,980 | A | 11/1998 | Varma et al. |
| 5,842,038 | A | 11/1998 | Williams et al. |
| 5,845,081 | A | 12/1998 | Rangarajan et al. |
| 5,852,607 | A | 12/1998 | Chin et al. |
| 5,887,187 | A | 3/1999 | Rostoker et al. |
| 5,892,922 | A | 4/1999 | Lorenz |
| 5,898,687 | A | 4/1999 | Harriman et al. |
| 5,909,686 | A | 6/1999 | Muller et al. |
| 5,918,074 | A | 6/1999 | Wright et al. |
| 5,940,596 | A | 8/1999 | Rajan et al. |
| 5,953,340 | A * | 9/1999 | Scott et al. .................. 370/401 |
| 5,959,989 | A | 9/1999 | Gleeson et al. |
| 5,978,951 | A | 11/1999 | Lawler et al. |
| 5,987,507 | A | 11/1999 | Creedon et al. |
| 6,011,795 | A | 1/2000 | Varghese et al. |
| 6,041,042 | A | 3/2000 | Bussiere |
| 6,041,053 | A | 3/2000 | Douceur et al. |
| 6,061,351 | A | 5/2000 | Erimli et al. |
| 6,094,435 | A | 7/2000 | Hoffman et al. |
| 6,104,696 | A | 8/2000 | Kadambi et al. |
| 6,111,874 | A | 8/2000 | Kerstein |
| 6,119,196 | A | 9/2000 | Muller et al. |
| 6,147,993 | A | 11/2000 | Kloth et al. |
| 6,175,902 | B1 | 1/2001 | Runaldue et al. |
| 6,185,185 | B1 | 2/2001 | Bass et al. |
| 6,195,351 | B1 | 2/2001 | Hiscock et al. |
| 6,226,292 | B1 | 5/2001 | DiPlacido |
| 6,233,242 | B1 | 5/2001 | Mayer et al. |
| 6,233,246 | B1 | 5/2001 | Hareski et al. |
| 6,236,654 | B1 | 5/2001 | Egbert |
| 6,249,521 | B1 | 6/2001 | Kerstein |
| 6,260,073 | B1 | 7/2001 | Walker et al. |
| 6,269,098 | B1 | 7/2001 | Crayford |
| 6,295,299 | B1 | 9/2001 | Haddock et al. |
| 6,310,882 | B1 | 10/2001 | Lorenz et al. |
| 6,310,884 | B1 | 10/2001 | Odenwald, Jr. |
| 6,335,932 | B2 * | 1/2002 | Kadambi et al. ............. 370/391 |
| 6,356,551 | B1 | 3/2002 | Egbert |
| 6,396,841 | B1 | 5/2002 | Co et al. |
| 6,400,715 | B1 | 6/2002 | Beaudoin et al. |
| 6,442,162 | B1 | 8/2002 | O'Neill et al. |
| 6,460,120 | B1 | 10/2002 | Bass et al. |
| 6,473,403 | B1 | 10/2002 | Bare |
| 6,490,276 | B1 | 12/2002 | Salett et al. |
| 6,496,502 | B1 | 12/2002 | Fite, Jr. et al. |
| 6,515,993 | B1 | 2/2003 | Williams et al. |
| 6,522,654 | B1 | 2/2003 | Small |
| 6,553,028 | B1 | 4/2003 | Tang et al. |
| 6,553,031 | B1 | 4/2003 | Nakamura et al. |
| 6,560,229 | B1 * | 5/2003 | Kadambi et al. ............. 370/392 |
| 6,560,236 | B1 | 5/2003 | Varghese et al. |
| 6,570,875 | B1 | 5/2003 | Hegde |
| 6,574,194 | B1 | 6/2003 | Sun et al. |
| 6,625,157 | B2 | 9/2003 | Niu et al. |
| 6,636,499 | B1 | 10/2003 | Dowling |
| 6,658,015 | B1 | 12/2003 | Merchant et al. |
| 6,674,756 | B1 | 1/2004 | Rao et al. |
| 6,674,760 | B1 | 1/2004 | Walrand et al. |
| 6,680,945 | B1 | 1/2004 | Merchant et al. |
| 6,704,303 | B1 | 3/2004 | Bowman-Amuah |
| 6,707,818 | B1 * | 3/2004 | Kadambi et al. ............. 370/391 |
| 6,711,171 | B1 | 3/2004 | Dobbins et al. |
| 6,717,913 | B1 | 4/2004 | Ghahremani et al. |
| 6,741,589 | B1 | 5/2004 | Sang et al. |
| 6,765,914 | B1 | 7/2004 | Jain et al. |
| 6,769,033 | B1 | 7/2004 | Bass et al. |
| 6,775,283 | B1 | 8/2004 | Williams |
| 6,778,547 | B1 | 8/2004 | Merchant |
| 6,788,680 | B1 | 9/2004 | Perlman et al. |
| 6,789,118 | B1 | 9/2004 | Rao |
| 6,791,979 | B1 | 9/2004 | Berl et al. |
| 6,798,788 | B1 | 9/2004 | Viswanath et al. |
| 6,810,037 | B1 | 10/2004 | Kalapathy et al. |
| 6,813,268 | B1 | 11/2004 | Kalkunte et al. |
| 6,816,488 | B1 | 11/2004 | Merchant et al. |
| 6,850,521 | B1 | 2/2005 | Kadambi et al. |
| 6,975,627 | B1 | 12/2005 | Parry et al. |
| 6,999,452 | B1 | 2/2006 | Drummond-Murray et al. |
| 7,046,679 | B2 * | 5/2006 | Sampath et al. ......... 370/395.53 |
| 7,139,269 | B2 | 11/2006 | Kalkunte et al. |
| 2002/0009081 | A1 | 1/2002 | Sampath et al. |
| 2002/0181496 | A1 | 12/2002 | Narasimhan et al. |
| 2006/0274786 | A1 * | 12/2006 | Malalur et al. ............... 370/468 |

FOREIGN PATENT DOCUMENTS

| | | |
|---|---|---|
| EP | 349099 | 1/1990 |
| EP | 0465090 A1 | 1/1992 |
| EP | 0518595 A2 | 12/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 097300 A2 | 4/1999 |
| FR | 2 725 573 A1 | 4/1996 |
| GB | 2333429 | 7/1999 |
| JP | 4-189023 | 7/1992 |
| WO | WO 98/09473 | 3/1998 |
| WO | 1999/00945 A1 | 1/1999 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | 00/03517 A1 | 1/2000 |
| WO | WO 00/03515 | 1/2000 |
| WO | WO 00/03516 | 1/2000 |
| WO | WO 00/03522 | 1/2000 |
| WO | 00/18071 | 3/2000 |
| WO | 01/01637 | 1/2001 |
| WO | WO9900936 A1 | 6/2001 |

OTHER PUBLICATIONS

European search report for European application No. 01305063.8.
European search report for European application No. 01305073.7.

"A High-Speed CMOS Circuit for 1.2-Gb/s 16×16 ATM Switching," Alain Chemarin et al. 8107 IEEE Journal of Solid-State Circuits 27 Jul. 1992, No. 7, New York, US, pp. 1116-1120.

"Local Area Network Switch Frame Lookup Technique for Increased Speed and Flexibility," 700 IBM Technical Disclosure Bulletin 38 Jul. 1995, No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28 Jul. 1993, No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

Partridge, C., et al., "A 50-GB/S IP Router," IEEE/ACM Transactions on Networking, IEEE Inc., New York, US, vol. 6, No. 3, Jun. 1, 1998, pp. 237-248.

Parulkar, G., et al., "AITPM: A Strategy for Integrating IP with ATM," Computer Communications Review, Association for Computing Machinery, New York, US, vol. 25, No. 4, Oct. 1, 1995, pp. 49-58.

Virtanen, S. "On Communications Protocols and their Characteristics Relevant to Designing Protocol Processing Hardware", University of Turku, Turku Centre for Computer Science, Technical Report 305, Sep. 1999, pp. 1-31.

Vuppala, V. et al., "Virtual Network Ports: An Inter-network Switching Framework", Proceedings of 1999 Conference in Computer Communication, Sep. 28, 1998, pp. 1-22.

"European Search Report for Application No. EP 01 30 5066, Search Report Mailed May 13, 2009", 6 pages.

Office Action Received for U.S. Appl. No. 09/877,013, mailed on Nov. 2, 2004, 14 pages.

Office Action Received for U.S. Appl. No. 09/877,013, mailed on Sep. 15, 2005, 11 pages.

Advisory Action Received for U.S. Appl. No. 09/877,013, mailed on Jan. 13, 2006, 3 pages.

Notice of Allowance Received for U.S. Appl. No. 09/877,013, mailed on Mar. 7, 2006, 4 pages.

Yu, S. et al., "Queue Management for Shared Buffer and Shared Multi-buffer ATM Switches", Department of Electronics Engineering & Institute of Electronics, National Chiao Tung University, Hsinchu, Taiwan, R.O.C., (Mar. 24, 1996),688-695 Pages.

Armitage, Grenville "The Magic Behind the Myths" Bell Labs Research Silicon Valley, Lucent Technologies, MPLS, IEEE Communications Magazine, 0163-6804, Jan. 2000, pp. 124-131.

Ekman, J. et al., "Gigabit switch using free-space and parallel optical data links for a PCI-based workstation cluster", Lasers and Electro-Optics Society 2000 Annual Meeting LEOS 2000 13th Annual Meeting. IEEE vol. 2, Nov. 13-16, 2000, pp. 494-495.

Huang, Nen-Fu, et al, "A Fast IP Routing Lookup Scheme for Gigabit Switching Routers" IEEE, 0-7803-5417, Jun. 1999, pp. 1429-1436.

Muh-rong, Y., et al., "Batman: a new architectural design of a very large next generation gigabit switch Communications", 1997. ICC 97 Montreal, IEEE International Conference on vol. 2,Jun. 8-12, 1997, pp. 740-744.

Newman, Peter, et al., "IP Switching and Gigabit Routers", IEEE Communications Magazine, 0163-6804, Jan. 1997, pp. 124-131.

European Search Report for application No. 01305065.3 dated Feb. 13, 2009.

* cited by examiner

GIGABIT SWITCH WITH FRAME FORWARDING AND ADDRESS LEARNING

REFERENCE TO RELATED APPLICATIONS

This is a Continuation of application Ser. No. 09/877,010, filed on Jun. 11, 2001, now U.S. Pat. No. 7,046,679, which in turn is an application claiming priority of U.S. Provisional Patent Application Ser. Nos. 60/210,510, filed on Jun. 9, 2000 and 60/270,158, filed on Feb. 22, 2001. The subject matter of these earlier filed applications is hereby incorporated by reference.

BACKGROUND OF THE INVENTION

1. Field of the Invention

The invention relates to an apparatus for high performance switching in local area communications networks such as token ring, ATM, ethernet, fast ethernet, and gigabit ethernet environments, generally known as LANs. In particular, the invention relates to a new switching architecture in an integrated, modular, single chip solution, which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic ethernet wirespeed is up to 10 megabits per second, and Fast Ethernet is up to 100 megabits per second. The newest ethernet is referred to as gigabit ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed.

Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, the means with which the elements communicate with each other can limit the operational speed of the switch if elements are made to wait for those communications.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The present invention is directed to a switch-on-chip solution for a network switch, capable of using ethernet, fast ethernet, and gigabit ethernet systems, wherein all of the switching hardware is disposed on a single microchip. The present invention is also directed to methods employed to achieve the desired switching. The present invention is configured to maximize the ability of packet-forwarding at linespeed, and to also provide a modular configuration wherein a plurality of separate modules are configured on a common chip, and wherein individual design changes to particular modules do not affect the relationship of that particular module to other modules in the system.

More specifically, the present invention is directed to a network switch with improved frame forwarding and address learning. The present invention allows the IPIC to forward the packet on the 10 GE interface by examining an opcode designating the packet type in the header of the packet. The method of looking up and updating addresses is also improved in the present invention as the VLAN ID can be obtained either through the header is the packet is tagged or through a PTABLE when the packet is untagged.

The present invention is directed to a network switch for network communications. The switch includes a first data port interface supporting at least one data port transmitting and receiving data at a first data rate and a second data port interface supporting at least one data port transmitting and receiving data at a second data rate. The switch also has a CPU interface configured to communicate with a CPU and a memory management unit for communicating data from at least one of the first and second data port interfaces and a memory. It also includes a communication channel for communicating data and messaging information between the first and second data port interfaces and the memory management unit and a plurality of lookup tables, including an address resolution lookup table and a VLAN table. One of the first or second data port interfaces is configured to determine an egress port or egress ports for an incoming data packet from a search of the address resolution lookup table and the VLAN table using a VLAN ID derived from the incoming data packet.

When the second data rate is greater than the first data rate, a header of the incoming data packet contains an opcode used to identify a packet type, and the incoming data packet arrives at a port of the second data port interface, the second data port interface is configured to forward the incoming packet based on the opcode. Additionally, the opcode can identify whether the incoming data packet is a unicast packet, a multicast packet, a broadcast packet or resulted in a destination lookup failure.

The present invention is also directed to a method of switching data in a network switch. An incoming data packet is received at a first port of a switch and a first packet portion, less than a full packet length, is read to determine particular packet information. A VLAN ID is derived from the first packet portion, a VLAN table is searched using the VLAN ID and an address resolution lookup table is searched using the particular packet information and the VLAN ID. An egress port or egress ports are determined based on the above searching steps and it is determined whether there is a matched entry in the address resolution lookup table. If the matched entry is not in the address resolution lookup table, the particular packet information is learned and the particular packet information is placed as an entry in the address resolution lookup table. The incoming data packet is modified to include forwarding and routing information based on the above searching steps and the modified data packet is sent to the egress port or egress ports. Additionally, the VLAN ID may be read from a VLAN tag in a header of the incoming data packet, when the incoming data packet is tagged or a port based VLAN table based on the particular packet information may be searched to obtain the VLAN ID, when the incoming data packet is untagged. When the incoming data packet is a multicast packet, a multicast index is derived from a result from the search of the address resolution lookup table and a multicast table is searched using the multicast index as a key to obtain the egress ports. A port bitmap, a module ID bitmap, an untagged port bitmap and a class of service may be obtained through the searching steps. Also, it can be determined if incoming data packet should be mirrored to another port, if a destination for the incoming data packet is a trunked port and if a destination for the incoming data packet is on a stacked linked network switch connected to the network switch.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
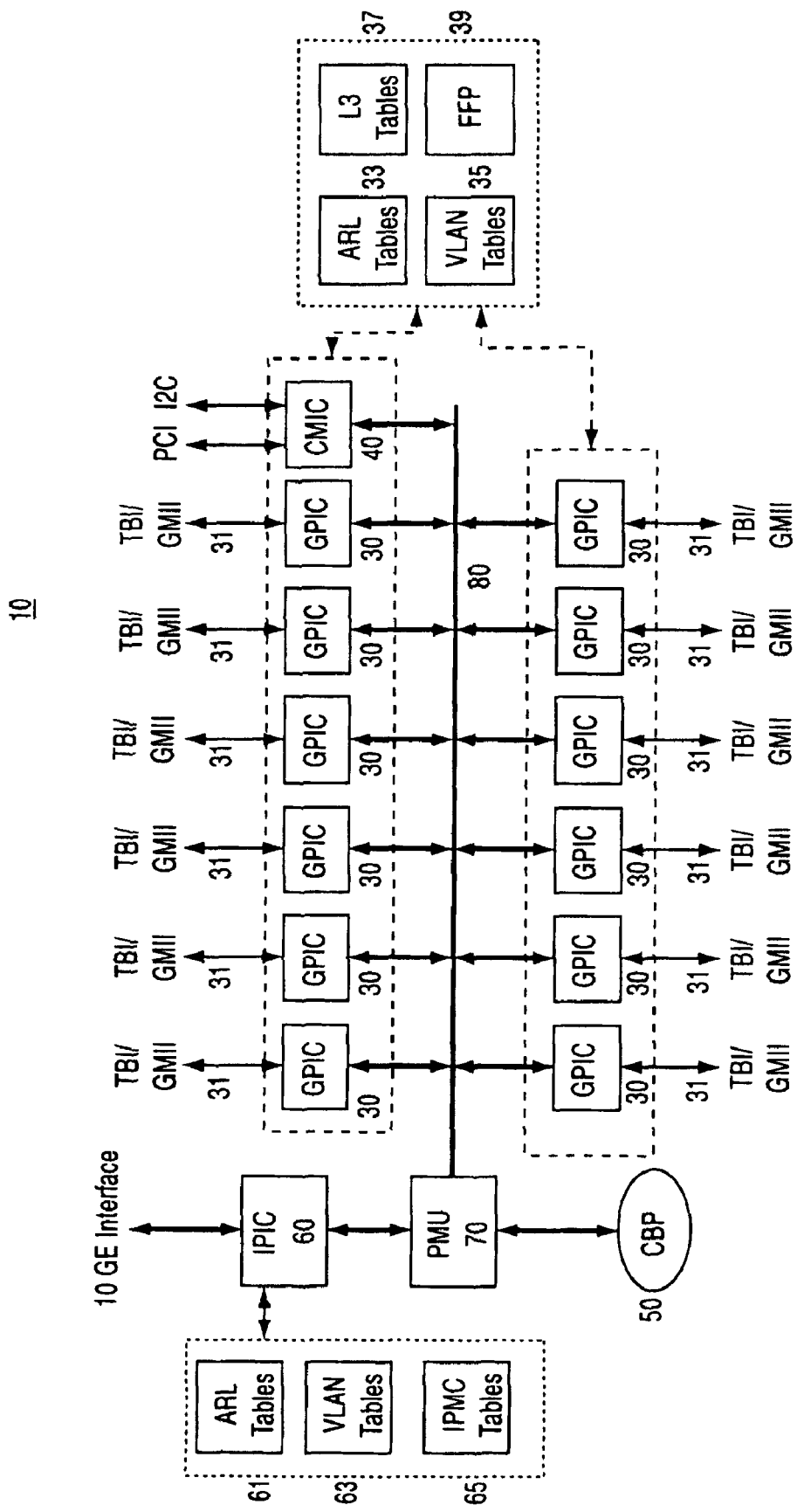
FIG. 1 is a general block diagram of elements of the present invention.

FIG. 1 illustrates a configuration wherein a switch-on-chip (SOC) 10, in accordance with the present invention, is illustrated. The following are the major blocks in the chip: Gigabit Port Interface Controller (GPIC) 30; Interconnect Port Interface Controller (IPIC) 60; CPU Management Interface Controller (CMIC) 40; Common Buffer Pool (CBP)/Common Buffer Manager (CBM) 50; Pipelined Memory Management Unit (PMU) 70; and Cell Protocol Sideband (CPS) Channel 80. The above components are discussed below. In addition, a Central Processing Unit (CPU) can be used as necessary to program the SOC 10 with rules which are appropriate to control packet processing. However, once SOC 10 is appropriately programmed or configured, SOC 10 operates, as much as possible, in a free running manner without communicating with CPU.

The Gigabit Port Interface Controller (GPIC) module interfaces to the Gigabit port 31. On the medium side it interfaces to the TBI/GMII or MII from 10/100 and on the chip fabric side it interfaces to the CPS channel 80. Each GPIC supports 1 Gigabit port or a 10/100 Mbps port. Each GPIC performs both the ingress and egress functions.

On the Ingress the GPIC supports the following functions: 1) L2 Learning (both self and CPU initiated); 2) L2 Management (Table maintenance including Address Aging); 3) L2 Switching (Complete Address Resolution: Unicast, Broadcast/Multicast, Port Mirroring, 802.1Q/802.1p); 4) FFP (Fast Filtering Processor), including the IRULES Table); 5) a Packet Slicer; and 6) a Channel Dispatch Unit.

On the Egress the GPIC supports the following functions: 1) Packet pooling on a per Egress Manager (EgM)/COS basis; 2) Scheduling; 3) HOL notification; 4) Packet Aging; 5) CBM control; 6) Cell Reassembly; 7) Cell release to FAP (Free Address Pool); 8) a MAC TX interface; and 9) Adds Tag Header if required.

It should be noted that any number of gigabit ethernet ports 31 can be provided. In one embodiment, 12 gigabit ports 31 can be provided. Similarly, additional interconnect links to additional external devices and/or CPUs may be provided as necessary.

The Interconnect Port Interface Controller (IPIC) 60 module interfaces to CPS Channel 80 on one side and a high speed interface, called HiGig™ interface, on the other side. The HigGig is a XAUI interface, providing a total bandwidth of 10 Gbps.

The CPU Management Interface Controller (CMIC) 40 block is the gateway to the host CPU. In it's simplest form it provides sequential direct mapped accesses between the CPU and the CHIP. The CPU has access to the following resources on chip: all MIB counters; all programmable registers; Status and Control registers; Configuration registers; ARL tables; 802.1Q VLAN tables; IP Tables (Layer-3); Port Based VLAN tables; IRULES Tables; and CBP Address and Data memory.

The bus interface is a 66 MHz PCI. In addition, an I2C (2-wire serial) bus interface is supported by the CMIC, to accommodate low-cost embedded designs where space and cost are a premium. CMIC also supports: both Master and Target PCI (32 bits at 66 MHz); DMA support; Scatter Gather support; Counter DMA; and ARL DMA.

The Common Buffer Pool (CBP) 50 is the on-chip data memory. Frames are stored in the packet buffer before they are transmitted out. The on-chip memory size is 1.5 Mbytes. The actual size of the on-chip memory is determined after studying performance simulations and taking into cost considerations. All packets in the CBP are stored as cells. The Common Buffer Manager (CBM) does all the queue management. It is responsible for: assigning cell pointers to incoming cells; assigning PIDs (Packet ID) once the packet is fully written into the CBP; management of the on-chip Free Address Pointer pool (FAP); actual data transfers to/from data pool; and memory budget management.

When a port is in TurboGig mode, it can operate in speed in excess of 2.5 Gbps. The transmit IPG on the port should be at 64 bit times. The FFP support on the TurboGig is a subset of the masks. A total of 128 IRULES and 4 IMASKs are supported when the port is in TurboGig mode. A total of 16 meter-ds is supported on the FFP.

The Cell Protocol Sideband (CPS) Channel 80 is a channel that "glues" the various modules together as shown in FIG. 1. The CPS channel actually consists of 3 channels:

a Cell (C) Channel: All packet transfers between ports occur on this channel;

a Protocol (P) Channel: This is a synchronous to the C-channel and is locked to it. During cell transfers the message header is sent via the P-channel by the Initiator (Ingress/PMMU); and a Sideband (S) Channel: its functions are: CPU management: MAC counters, register accesses, memory accesses etc; chip internal flow control: Link updates, out queue full etc; and chip inter-module messaging: ARL updates, PID exchanges, Data requests etc. The side band channel is 32 bits wide and is used for conveying Port Link Status, Receive Port Full, Port Statistics, ARL Table synchronization, Memory and Register access to CPU and Global Memory Full and Common Memory Full notification.

The following messages are used over the channels discussed above.

Side Band Channel Messages

The following messages are used over the channels discussed above, specifically messages used on the side band channel.

A Back Pressure Warning Status message is sent by the MMU when the ingress cell queue crosses the Rx Cell Warning Limit. The bit is set in the Port Bitmap for the ports, which have gone above the Warning Limit. When Ingress gets this message it should send Pause Frame for the Full Duplex ports which has crossed the limit. For Half duplex ports it should enable the Jam Signal.

A Back Pressure Discard Status message is sent by the MMU when the ingress cell queue crosses the Rx Cell Discard Limit. The bit is set in the Port Bitmap for the ports, which have gone above the Discard Limit. It is noted that the Module which sends this message must implement Hysteresis. One easy way to implement is setting the Low Discard Limit Water Mark to be N cells below Rx Cell Discard Limit.

A COS Queue Status Notification message is sent by the MMU when the Transaction Queue crosses the Transaction Queue Architectural Limit on one of the COS Queue. The Port Bitmap contains all the ports which has gone above the Limit. When Ingress gets this message, it should copy the Port Bitmap from this Message into the Active Port Register corresponding to the COS. There are 4 sets of Active Port Register—one Active Port Register per COS and one HOL Register per port. The Active Port Register is picked up corresponding to the COS value in the message.

A HOL Status Notification message is sent by the MMU when the Queue crosses the HOL Cell Water Mark on one of the egress port. The bit is set in the Port Bitmap for the ports which have gone above the HOL Cell Water Mark. When the Ingress port gets this message it should copy the Port Bitmap from this Message into the Active Port Register 8 (also called HOL Register) corresponding to the egress ports.

If the memory is full, a Memory Full Notification message is sent by MMU to all the ports. A Memory Available Notification message is sent by the MMU when the memory goes below the Low Water Mark after hitting High Water Mark.

A Read Memory Command message is used by CPU to read the Packet Memory. The Source port, included in the message, should be that of CPU port Number. The address is the start of the Memory Location and DataLen is the total Number of bytes to be read. The Destination port is not explicitly specified, but it is implied that this Message is for the MMU.

The Read Memory Ack message is sent in response to Memory Read Command issued by the CPU to read the Packet Memory. The Destination port in this message must be that of CPU port Number. If there is error in executing the Read Memory Command, then E bit is set and the Error code is set to indicate the type of the error. It is noted that this message does not use the Data Len field, as the CPU must know ahead of time how many bytes to expect.

The Write Memory Command message is used by CPU to write into the Packet Memory. The Source port used should be that of CPU port Number. DataLen is the total Number of bytes to be written starting from Memory Location given in the Address field of the message. A Write Memory Ack message is sent in response to Write Memory Command issued by the CPU to write in the Packet Memory. The Destination port in this message must be that of CPU port Number. If there is error in executing the Write Memory Command then E bit is set and the Error code is set to indicate the type of the error.

A Read Register Command message is used by CPU to read the Configuration Registers. The Source port used in the message should be that of CPU port Number/Device Id and the address is the address of the Register. The Read Register Ack message is sent in response to Read Register Command issued by CPU. The Destination port should be that of CPU/Device Id. Data field contains the Register value. If there is error in executing the Read Register Command, then E bit is set and the Error code is used to indicate the type of the error.

A Write Register Command message is used by CPU to write into the Configuration Registers of the switch Fabric. The Source port used should be that of CPU port Number/Device Id and the Address is the Address of the Register. Data field contains the data to be written in the Register. A Write Register Ack (0x0e) message is used to indicate the completion of the Write Register Command. The Destination port should be that of CPU/device id. If there is error in executing the Write Register Ack then E bit is set and the Error code is used to indicate the type of the error.

The ARL Insert Command message is used to insert an ARL Entry into the ARL table. The Source port is ARL Module Number, which uniquely identifies the Module, which maintains the ARL Table. Insertion into the ARL has certain rules. When a ARL Module sends ARL Insert Command, it waits for the ARL Insert Complete from rest of the ARL Modules, except CPU, before issuing the next ARL Insert Command. So there can never be two outstanding Requests for ARL Insert. But it is possible that an ARL Insert and ARL Delete command from the same Module can be outstanding. Also note that ARL Module does not wait for the ARL Insert or Delete Complete Acknowledgement from CPU, because CPU may be running at its own pace and switch does not want to take the performance hit in terms of Learning ARL Entries. An ARL Insert Complete message is used to acknowledge the completion of ARL Insert Command. The Source port Identifies the ARL Module sending the Ack and the Destination port identifies the ARL Module, which has initiated ARL Insert Command.

An S-Channel ARL Lookup Command is a lookup command for a specific ARL entry in the ARL Table. The Src Port is CMIC and the Opcode is 0x19. The ARL Memory address (BLOCK) is 0x0 or 0x1 or 0x2. The INDEX is always 0. A Memory Read Ack is returned in response to this ARL Lookup Command. If the entry is found, the actual content of the entry is returned. If the entry is not found, ARLEntry Words will be all f's. If the ARL lookup command times out due to insufficient ARL bandwidth, then the ARLEntry words will be all 0's. Software will have to retry the lookup again. For verification purpose, whether the Lookup commands arrive uniformly or in bursts, the one of the above three values should be returned.

The ARL Delete Command message is used to delete an ARL Entry from the ARL table. A similar ARL Delete Rule is followed such that when a ARL Module sends ARL Delete Command, it waits for the ARL Delete Complete Message from rest of the ARL Modules, except CPU, before issuing the next ARL Delete Command. So there can never be two outstanding Requests for ARL Delete. An ARL Delete Complete message is used to acknowledge the completion of ARL Delete Command. The Source port portion of the message identifies the ARL Module sending this message and the Destination port identifies the ARL Module that has initiated ARL Delete Command.

A Link Status Notification message is sent whenever there is link Status change on any port. Each bit in the Port Bitmap conveys the status of the corresponding port. If the bit is set then the link is up and if the bit is reset then the link is down. Upon receiving this Message the Ingress ANDs the received Port Bitmap with Forwarding Port Bitmap. In other words ingress changes the Forwarding Port Bitmap if the port link has gone down, but when the link comes up it is up to CPU to take necessary action. A Memory Failed Notification message is sent by MMU to inform the CPU that it has detected the Packet Memory Failure. It is up to CPU to take the necessary action. E bit is set to indicate error condition. Other housekeeping messages are also used and the above listing of messages is not exhaustive.

Ingress Flow

When the packet comes in from the ingress port the decision to accept the frame for learning and forwarding is done based on several ingress rules. These ingress rules are based on the Protocols and Filtering Mechanisms supported in the switch. The protocols which decide these rules are 802.1d (Spanning Tree Protocol), 802.1p and 802.1q. Extensive Filtering Mechanism with inclusive and exclusive Filters is supported. These Filters are applied on the ingress side and depending on the outcome different actions are taken. Some of the actions may involve changing the 802.1 p priority in the packet Tag header, changing the Type Of Service (TOS) Precedence field in the IP Header or changing the egress port.

Figure 2:
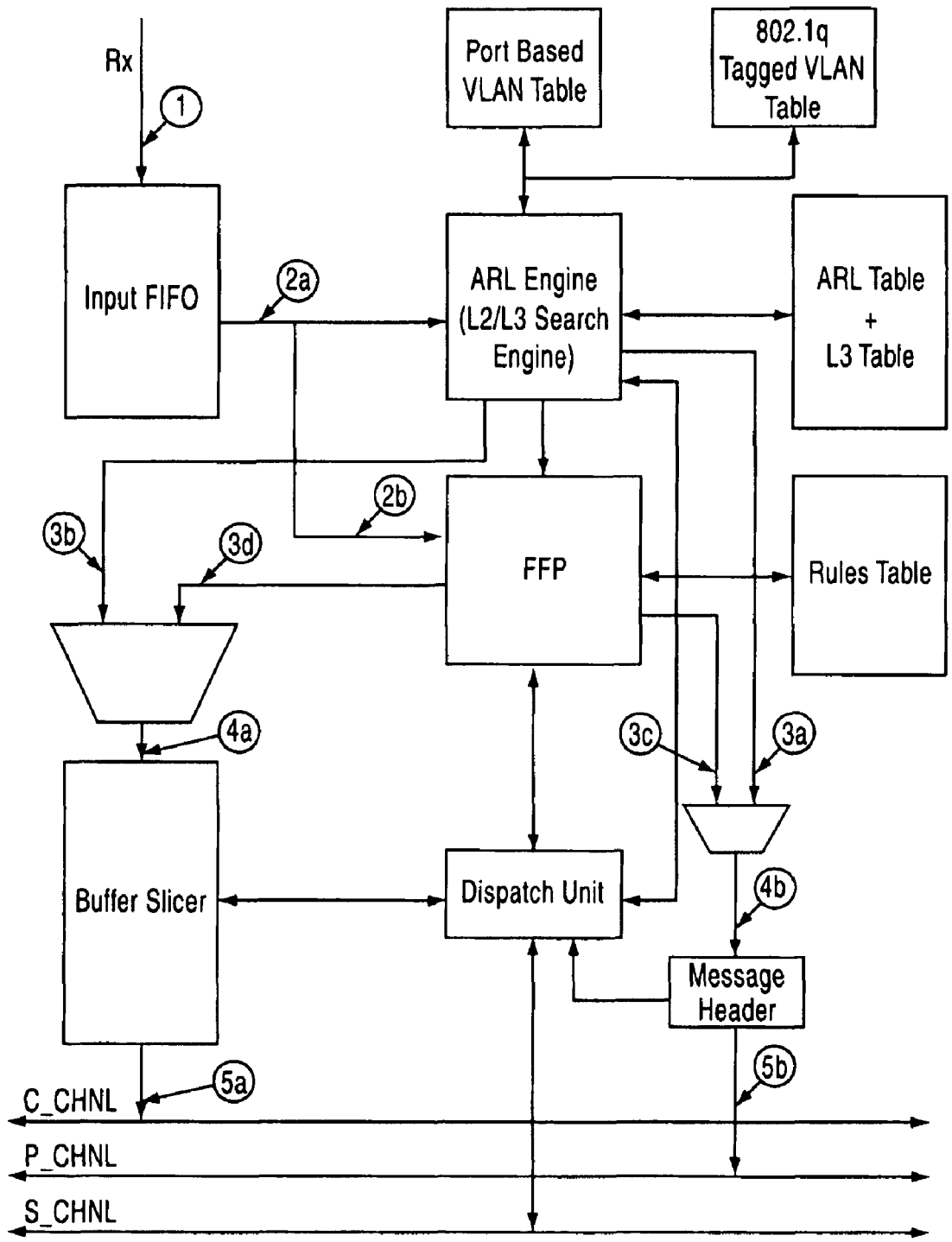
FIG. 2 is a data flow diagram of a packet on ingress to the switch.

The data flow on the ingress into the switch will now be discussed with respect to FIG. 2. As the packet comes in, it is put in the Input FIFO, as shown in step 1. An Address Resolution Request is sent to the ARL Engine as soon as first 16 bytes arrive in the Input FIFO (2*a*). If the packet has 802.1q Tag then the ARL Engine does the lookup based on 802.1q Tag in the TAG BASED VLAN TABLE. If the packet does not contain 802.1 q Tag then ARL Engine gets the VLAN based on the ingress port from the PORT BASED VLAN TABLE. Once the VLAN is identified for the incoming packet, ARL Engine does the ARL Table search based on Source Mac Address and Destination Mac Address. The key used in this search is Mac Address+VLAN Id. If the result of the ARL search is one of the L3 Interface Mac Address, then it does the L3 search to get the Route Entry. If an L3 search is successful then it modifies the packet as per Packet Routing Rules.

At step 2b, a Filtering Request is sent to Fast Filtering Processor (FFP) as soon as first 64 bytes arrive in the Input FIFO. The outcome of the ARL search, step 3a, is the egress port/ports, the Class Of Service (COS), Untagged Port Bitmap and also in step 3b the modified packet in terms of Tag Header, or L3 header and L2 Header as per Routing Rules. The FFP applies all the configured Filters and results are obtained from the RULES TABLE.

The outcome of the Filtering Logic, at 3c, decides if the packet has to be discarded, sent to the CPU or, in 3d, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, in 4a, are applied to modify the packet in the Buffer Slicer. Based on the outcome of ARL Engine and FFP, 4b, the Message Header is formed ready to go on the Protocol Channel. The Dispatch Unit sends the modified packet over the cell Channel, in 5a, and at the same time, in 5b, sends the control Message on the Protocol Channel. The Control Message contains the information such as source port number, COS, Flags, Time Stamp and the bitmap of all the ports on which the packet should go out and Untagged Bitmap.

Layer 2 Tables and Registers

The port Based VLAN Table (PTABLE) is 15 entries deep. It is indexed by port number and used to get the VLAN Tag for implicitly tagged VLANs. The PTABLE contains attributes that are relevant on a per port basis such as trunk port, address learning options on a port etc.

The following PTABLE fields are used:

Port VID—the Port VLAN Identifier is the VLAN Id used by Port Based VLAN.

Sp State—This field identifies the current Spanning Tree State. Value 0x00 designates that the Port is in a Disable State. No packets are accepted in this state, not even BPDUs. Value 0x01 designates that the Port is in Blocking or Listening State. In this state no packets are accepted by the port, except BPDUs. Value 0x02 designates that the Port is in a Learning State. In this state the packets are not forwarded to another port but are accepted for learning. Value 0x03 designates that the Port is in Forwarding State. In this state the packets are accepted both for learning and forwarding. When Multiple Spanning Trees are used in the device, the bits of the Sp State should be set to 11.

Port Discard Bits (PDB)—If the first bit is set then all the frames coming on this port will be discarded. If the second bit is set, then any 802.1Q Priority Tagged (VID=0) and Untagged frame coming on this port will be discarded.

TGID—This field identifies the trunk Group, this port belongs to.

T Bit—This bit identifies that the port is a member of the trunk Group.

C Learn Bit—If this bit is set, then the packet is sent to the CPU whenever the source Address is learnt.

B Bit—is BPDU bit. If this bit is set then the port rejects BPDUs. This Bit is set for trunk ports which are not suppose to accept BPDUs.

M Bits—is used for Mirroring Functionality. If this bit is set then enable mirroring on ingress.

CML Bits—CPU Managed Learning. The bit can be set to learn all new addresses, to not learn addresses and send the packet to the CPU, with the packet being switched or not, and to not learn new address and the packet with a new address being dropped.

DSCP—Differentiated Services Codepoint—If DSE Bit is set, then use this DSCP for a packet coming in through this port.

DSE_Mode—Depending on how the bit is set, no action is taken, the DSCP for the IP packet is picked up from the Table if the DSCP of the incoming packet is zero, or the DSCP for the IP packet is picked up from the Table regardless of the DSCP of the incoming packet.

RPE—Remap Priority Enable—If this bit is set then the 802.1 p priority is remapped. The new priority is picked up from New Priority field. This is used for untagged packets only.

New Priority—This field is used to re-map the 802.1 p Priority. Priority is remapped only if the RPE bit is set.

L3_DIS—If this bit is set then a packet is not L3 switched at this port if the DA Mac address is that of the L3 interface. L2 switching is not affected by setting of this bit.

PORT_BLOCK_MASK—This defines a set of egress ports that the packet should not be forwarded for the ingress port. If the bit is not set for the port, then the packet is never forwarded to that port.

A 802.1Q Tagged VLAN Table (VTABLE) is used to get all the member ports associated with a VLAN. The 802.1Q Tagged VLAN Table has 4K entries. If the packet is untagged, the VID is picked up from the PTABLE. If the incoming packet is tagged, the VID of the incoming packet is used to index into the VTABLE. If the V bit is set, then it is a configured entry and the VLAN Bitmap/Untagged Bitmap is picked up from the VTABLE. Otherwise, the packet is sent to CPU (if C_DROP_BIT=0) or dropped (if C_DROP_BIT=1).

The VTABLE contains attributes that are relevant on a per VLAN basis such as Spanning tree group, VLAN bitmap, untagged bitmap, module id bitmap etc. The VTABLE fields include:

VID—VLAN identifier as described in IEEE 802.1Q standard.

STG—This identifies the Spanning Tree Group that the VID belongs to for tagged packets. Up to 256 Spanning Tree Groups are supported.

VLAN Port Bitmap—VLAN Port Bitmap Identifies all the egress ports on which the packet should go out.

Untagged Bitmap—This bitmap identifies the Untagged Members of the VLAN. i.e., if the frame destined out of these member ports should be transmitted without Tag Header.

Module Id Bitmap—Identifies all the destination modules the packet has to go out on.

V—This bit is set for every VID that is configured in the Table. The default is 0.

Support for Multiple Spanning Tree is provided in the present invention. In other words, each VLAN can have its own Spanning Tree. Therefore, the Spanning Tree state must be maintained on a per port per VLAN basis. When an untagged packet arrives, the STG (Spanning Tree Group) is picked up from the PTABLE for the corresponding ingress port. If a tagged packet arrives, the STG is picked from the VTABLE for the corresponding incoming VLAN ID (VID).

The Spanning Tree Group Identifier (STG) table is used to get the Spanning Tree State of the port. The Spanning Tree Group (STG) is picked up from the PTABLE or VTABLE. The STG is used as an index to get the Spanning Tree State of the VLAN for all the ports. The corresponding ingress port is looked up for the Spanning Tree State of the ingress port. The STG Table is 256 deep. Entry 0 is the default SST and is used when the device runs a Single Spanning Tree (SST) or if the VLAN ID is not found in the VTABLE. When the device runs a SST, the STG group for all the ports in the PTABLE should be programmed to 0 and the STG for each VLAN in the VTABLE should be programmed to 0.

Before sending the message to the egress port/ports, the ARL Engine checks if the egress port(s) are in Forwarding State before sending the message to the port. The Forwarding PortBitmap for egress ports is constructed on a packet by packet basis. For a given STG, the 2 bits for each port are ANDED to determine the Spanning Tree state for that port and for that STG. This constructed Forwarding Port Bitmap is ANDED with the PortBitmap and ANDED with EPC_LINK to determine the Final PortBitmap.

The ARL Table is 8 k deep. The search key for the ARL Table is {Mac address, VID}. For untagged packets, the VID is picked up from the PTABLE and for tagged packets the VID is present in the VLAN tag. The ARL Table is searched whether the packet is unicast or Multicast packet. The ARL Table has the following fields:

Mac Address—Mac Address

VID—VLAN ID as described in IEEE 802.1Q standard for Tagged packets. For Untagged Packet, this value is picked up from PTABLE and for tagged packet, the VID is present in the VLAN Tag.

CosDst—The Class of Service is based on the Destination Address. COS identifies the priority of this packet. The present invention supports 4 levels of internal COS and can map the 8 levels of priorities as described in IEEE 802.1p standard to internal COS.

C bit—identifies that the packet should be given to CPU port.

L3 Bit—identifies that this entry is created as result of L3 Interface Configuration. The Mac address in this entry is the L3 interface Mac Address and that any packet addressed to this Mac Address needs to be routed.

SD_Disc Bits—These bits identify whether the packet should be discarded based on Source Address or Destination Address.

St Bit—identifies that this is a static entry (it is not learnt Dynamically) and cannot be aged out. Only CPU can delete this entry.

Ht Bit—This bit is set if there is match with the Source Address. It is used in aging mechanism. If this bit is not set for AGE TIME Duration (Default is 300 seconds), then this entry is purged out by the aging Process.

CosSrc—Class of Service based on the Source Address.

TGID/Port Number—If the most significant bit is not set, then this field indicates the port number on which the associated Mac address is learnt. If the most significant bit is set, then this field indicates that the associated MAC address is learnt on one of the trunk ports. The last 5 bits of this field will indicate the TGID. So if there is a match on Destination address then the output port is not decided by the port number in this entry, but is decided by the trunk identification process based on the rules identified by the RTAG bits and the trunk group Identified by the TGID.

S C P—The Source COS Priority bit is set (in the matched Source Mac Entry) then Source COS has priority over Destination COS.

Module Id—is the Module on which this Mac Address is learnt.

Also included is a multicast table. The Multicast Table is 256 deep and is indexed by the key returned from the ARL search. When a Multicast packet arrives, the ARL Table is searched with search key (MAC Address, VID). If the entry is found, the Multicast Table index is picked up from the ARL Table. From the Multicast Table, the Mc Port Bitmap and the Untagged Bitmap are picked up if the PFM for the ingress port is set to 1 or 2. If the PFM=0, the Port Bitmap and the Untagged Bitmap are a picked up from the VTABLE for the associated VLAN. Multicast logic is further detailed in the ARL Flowchart, in the following sections. The multicast table has the following fields:

Mc Port Bitmap—The port bitmap Identifies all the egress ports on which the packet should go.

Untagged Bitmap—This bitmap identifies the Untagged Members of the VLAN. i.e., if the frame destined out of these member ports should be transmitted without Tag Header.

Module Id Bitmap—Module Id Bitmap identifies all the Modules that the packets should go to.

The Trunk group Table is indexed by the Trunk Group Identifier (TGID). The TGID is usually picked up during the ARL lookup. The Trunk Group Table is used to derive the egress port when a packet has to go out on a trunk port. The RTAG is now picked up from the Trunk Group Table. The table provides the size of the trunk group and provides the trunk selection criterion. A Trunk Group Bitmap Table contains the bitmap of trunk ports on this Module, which are members of this trunk Group. It is indexed by Trunk Group Id (TGID).

Additional registers are also provided. They include the Egress Mirroring Register that contains a bitmap of ports, which are mirrored on egress. A Priority to COS Queue Mapping Register (COS_SEL) is used to map the incoming packet priority or derived packet priority (after Address Resolution and Filtering Mechanism) to the Egress COS Queue. The Priority to COS Queue Mapping is done after the packet has undergone the Address Resolution and Filtering Mechanism, just before sending the packet on the CP Channel. This mapping does not change the Priority field in the Tag Header of the packet, it only decides which COS queue should the packet go out of at the egress port. The need for this register arises due to recommended user priority to traffic class mappings defined in 802.1p standard. A switch configuration register is also provided.

Address Resolution Logic

Address Resolution Logic (ARL) is used for many functions of the functions that the switch performs. It is used to get the egress port in case of a Unicast Packet and to get the set of egress ports in case of Broadcast, Multicast and Destination Look up Failures (DLFs). ARL is also used to get the VLAN Identifier both for implicitly and explicitly Tagged VLANs and for getting all the VLAN members. ARL is used to decide on the COS for the incoming packet based on either Source or Destination Address. If the destination Address is on the trunk port then ARL is used to select the trunk port based on the trunk Rules. Learning the Source Mac Addresses which are not in the table is accomplished by ARL, as well as learning the Multicast and Static Unicast Addresses under CPU control. ARL is also used in accepting the packets for Forwarding and Learning based on Spanning Tree State and for Layer 3 switching.

As soon as the first "n" bytes of the packet come in the Ingress FIFO, the Address Resolution Request is sent to the ARL Engine. The ARL Engine reads first the 16 bytes to get the source Mac Address, the Destination Mac Address and the VLAN Tag. For an explicitly tagged VLAN the VLAN Tag is determined from the 802.1Q header. For an implicitly tagged VLAN (no 802.1Q header) the VLAN Tag is got from PTABLE. The PTABLE is indexed with the ingress port and both the VLAN Tag and the VLAN Bitmap are picked up from there.

VLAN Tag is appended with Source Mac Address and Destination Mac Address to form the Source Mac Key {VLAN Id, Source Mac} and Destination Mac Key {VLAN Id, Destination Mac}. These keys are used to find ARL Entry in the ARL Table.

The source key is searched in the ARL table. If the entry is not found then Source Mac Address needs to be learnt. The ARL Engine inserts this new address at the right place. If the search is successful then other flags such as Disc Bits, J Bits, C Bit etc are checked and actions are taken depending on these bits.

A similar search is done on the Destination Key. If the Destination Key matches one of the ARL Entries then the port number is picked up from this entry. In case of Multicast Address, the Multicast table (MARL) is searched which gives the set of egress port on which this Multicast Packet should go out. In case of Destination Lookup Failure (DLF) the VLAN Port Bitmap in PTABLE or VTABLE identifies the egress ports. In case of implicitly tagged VLANs, VLAN Port Bitmap is used from PTABLE and in case of explicitly tagged VLANS, VLAN Port Bitmap is used from VTABLE.

Learning a new Mac address, if one is not found the ARL Table, without CPU intervention is one of the key features of the present invention. When the switch comes up after initialization there are no entries in the ARL Table. The table itself should be set to all zeros. Generally the first address which is put in the table is that of the switch and this entry should have the CPU bit set to identify that it a Switch Mac Address so that any packet with this Mac Address is given to Switch CPU. This entry should also be marked as STATIC ENTRY by setting the St Bit, so that the Dynamic Aging Process does not delete this entry.

ARL Entries are learnt in three different ways:

1) Dynamic Address Learning: Dynamic Entries are created and updated by the Learning Process. For an incoming packet, Source Mac Address is searched in the ARL Table, actually Source Key (VLAN Id, Source Mac) is used for the search. If the entry is not found in the ARL Table then the address needs to be learnt. If the entry is found, but the port number does not match the ingress port then the entry stays the same, except that the old port number is replaced by the new ingress port number. This happens whenever there is station movement. There is a special case in case of trunk port, which we will discuss later. For the Dynamic Address Learning the Static Bit should be set to zero, which identifies that the entry is learnt dynamically and it should be purged by the Aging Process when the AGE TIMER expires and if the hit bit is not set.

2) Static Address Learning: Static Addresses are added and removed in the ARL Table under explicit management control by the CPU. These addresses should not be purged by the Aging Process. The ST Bit in the entry is set to identify that it is a Static Entry.

3) Multicast Address Learning: Multicast Addresses are added and removed in Multicast Table under explicit Management control. GMRP protocol specified in the IEEE 802.1p protocol is used to learn the Multicast Addresses.

For a trunk port, the ARL Learning logic works slightly differently. The same Mac address can come from two different trunk ports. For example, conversation between Stations A and B may go on trunk port 0 and conversation between Stations A and C may go on trunk port 1. For a normal port it may look like the Station A has moved from trunk port 0 to trunk port 1. So for the ARL Learning process to function properly the Station Movement Logic for trunk ports must be handled slightly differently.

If the Source Key is matched with an entry in the ARL Table, and the port Number does not match with the ingress port Number, then the T bit is checked. If the T bit is set then the ingress port is compared against all the trunk ports in that trunk Group. If one of the trunk port matches the ingress port then Hit Bit is set. If none of the ports in the trunk Group match the ingress port then the port Number in the ARL Entry is replaced by the ingress port (Station Movement).

Whenever the Source address is matched with the entry in the ARL table, the Hit bit is set. This bit is used in making a decision to purge the ARL Entry. If this bit is not set for AGE TIME Duration, default being 300 seconds, then this entry is purged out by the aging Process. When ARL checks for the Hit bit, it makes sure that the entry was learnt on that ARL Module. This is done by checking the port number in the ARL Entry.

If a new Mac Address has to be learnt and if the ARL Table is Full, then a random non-static entry picked up for purging so as to learn the new entry or the new entry is not learnt at all. In real life situation, such a condition should never happen, as the entries gets purged out every AGE Time if the hit bit is not set on those entries.

ARL Logic

Figure 3:
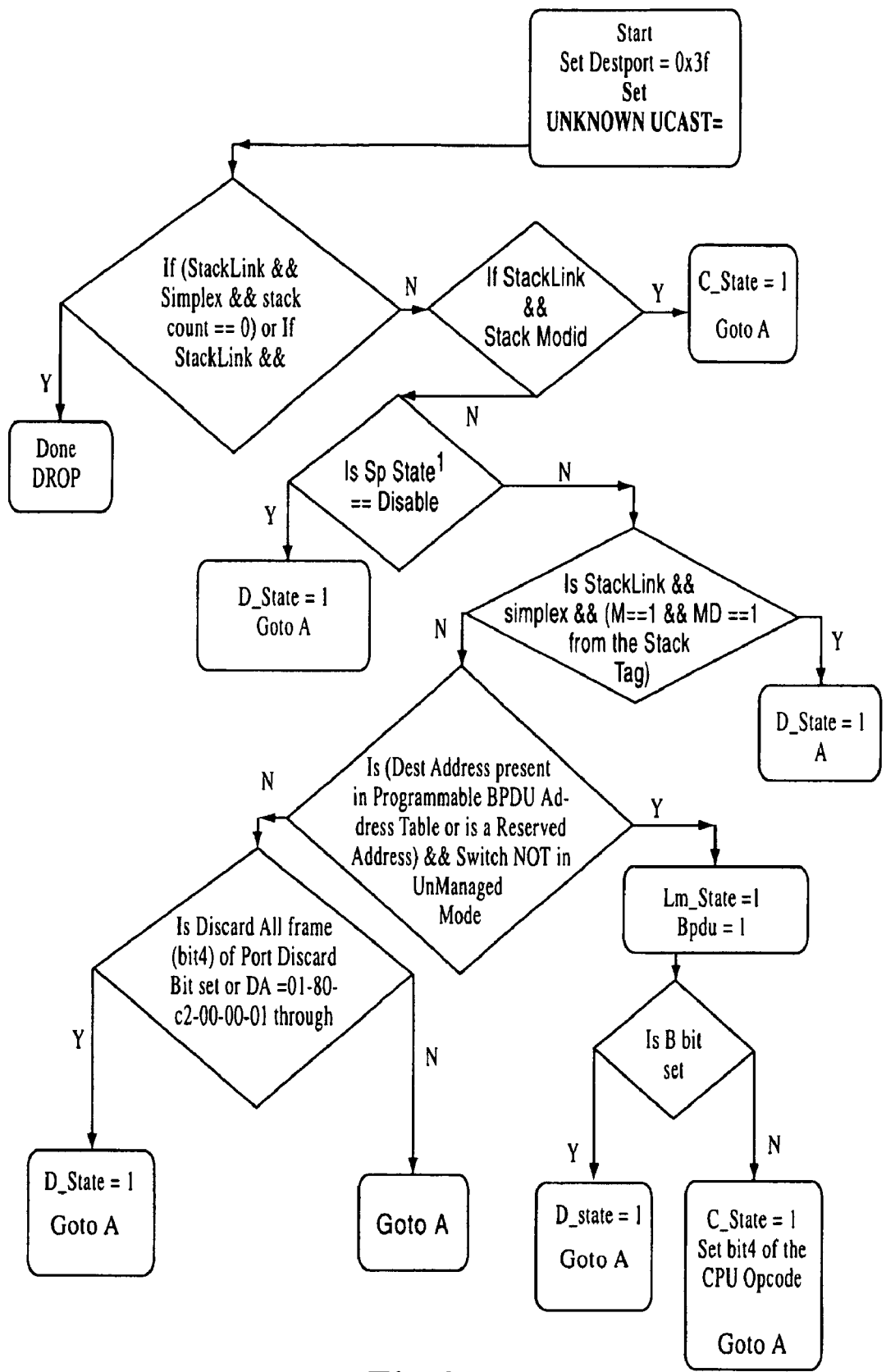
FIG. 3 is a data flow diagram of the ARL logic for the present invention.

The ARL logic will now be discussed. The flow chart illustrated in FIG. 3 details the evaluation based on states of the packets. The C_State is a flag that indicates that the Packet should be sent only to CPU. For a BPDU or Control Message (one with destination Mac Address equals the reserved address), if the packet is Tagged then the CoS is chosen from the Priority field of the packet, else CoS is picked up from CPU Control Queue COS field in Switch Configuration Register. CPU_PRI (from the Switch Configuration register) overrides RPE and FFP. The D_State is a flag that indicates that the Packet should be discarded, but sends the packet to CPU if a copy needs to go to CPU. The BPDU Address is 0x01-80-c2-00-00-00. It is noted that Reserved Addresses are: 0x01-80-c2-00-00-0X, 0x01-80-c2-00-00-10 or 0x01-80-c2-00-00-2X.

For State C & D (goto states), the packet needs to be sent to the "Mirrored-To" Port if the Ingress Port is Mirrored. My_modid comes from the Stacking Configuration register. C*, D*, D+ are also go to states.

If the packet is an untagged BPDU whose port's B bit is not set, then the packet's priority as seen by the FFP for the purposes of matching AND for action bit 9 is the CPU_PRI from the CONFIG register.

Stack_Modid=0x1f implies that the packet was generated by the CMIC of another module. The CMIC must set the ED bit in this case. The packet is not subject to egress mirroring. The Stack Count for this packet when generated by the CMIC should be set to 1.

On a Stacking link, the packet is always tagged with a length of at least 68 bytes, the Spanning tree state must be in forwarding state and port discard bit4 must not be set.

In unmanaged mode of operation, the BPDUs should be flooded to all the ports since there is no CPU. Reserved Multicast addresses (DA=01-80-c2-00-00-01 through 01-80-c2-00-00-0F) should be dropped and not flooded. UnManaged Mode bit is defined in the Switch Configuration Register. If switch is in Unmanaged mode, the following rules should be observed:
1. PFM for all the ports should be set to 1;
2. No Filtering (FIL_ENA should be set to zero);
3. Port Discard bit 4 and 5 should be set to zero;
4. CPU port should not be included in the VTABLE;
5. CML should be set to 0;
6. C bit in PTABLE=0;
7. Untagged Bitmap in VTABLE should be set to all 1s (untagged packet should go out untagged);
8. Untagged Bitmap for Tagged packet and Priority tagged packet is hardcoded to 0. (Tagged packet should go out as Tagged and Priority Tagged packet should go out as Priority tagged);
9. No static entries in the ARL (otherwise station moves will send copy to CPU);
10. No L3 switching;
11. No explicit support for stacking is provided. The device should not be programmed in stacking mode in unmanaged mode of operation;
12. Trunking of ports is not allowed in Unmanaged mode;
13. No Mirroring;
14. Ingress Filtering Mode should not be enabled;
15. Spanning Tree State in PTABLE=3. STG should be programmed to 0 and the default values for the port states in the STG Table for STG=0 is all 1s; and
16. No setting of Static bit or C bit is allowed in the ARL Table If any address is configured in the Programmable BPDU register, they will get flooded in the unmanaged mode. In the unmanaged mode, the Programmable BPDU register 1 should be set to 01-80-c2-00-00-20 and BPDU register 2 should be set to 01-80-c2-00-00-21.

Figure 4:
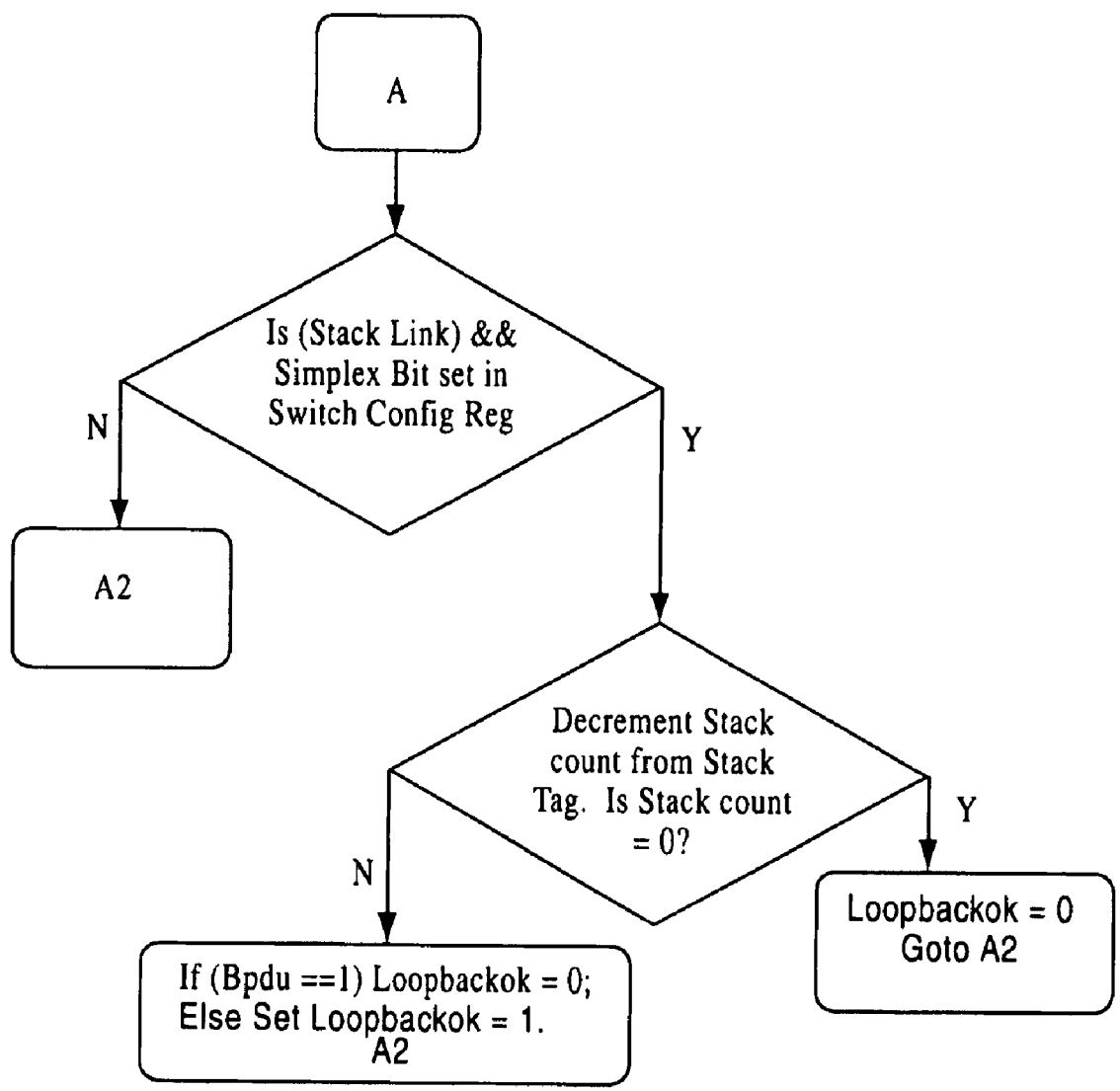
FIG. 4 is a sub-flowchart for the ARL logic for the present invention.

FIG. 4 shows the sub-flowchart A. When the logic reaches A2, the Packet is a normal Packet. The logical function "Is Stack Link" implies that "Is Ingress Port=Stack Link" when true. The Set LoopbackOk flag is used to remember the state that it is Ok to send the packet back on the same port on which it has come in.

Figure 5:
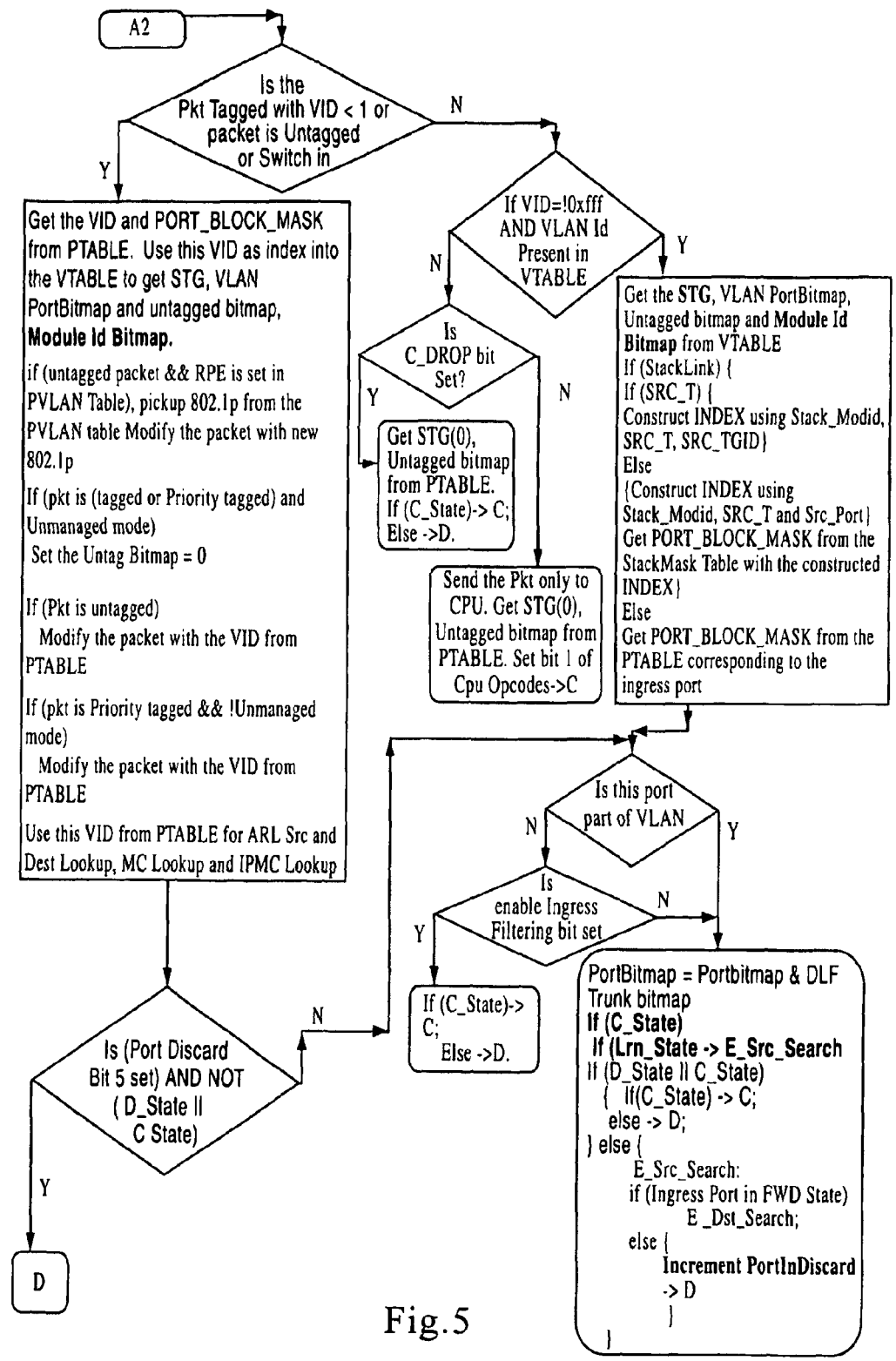
FIG. 5 is a sub-flowchart for the ARL logic for the present invention.

The logical flow of sub-flowchart A2 is shown in FIG. 5. It is noted that the Enable Ingress Filtering bits are defined in section on Virtual Bridged Local Area Networks (IEEE 802.1Q) Support. It is also noted that VID=0xfff is an invalid Configuration in the PTABLE Table. All untagged bitmaps in each table must be zero for the bit(s) representing the Stack Link port(s), if any. Otherwise, it is a configuration error and the behavior is unspecified. The C_DROP bit is defined in the Switch Configuration Register (CONFIG2).

The priority for tagged packets are as follows: 1) Tag and 2) FFP. The priority for untagged packets are 1) ARL (if SCP and matched source entry) (If !SCP then matched destination entry), 2) If RPE then New priority field in the PTABLE and 3) FFP.

Also defined, PortInDiscard is a counter incremented each time a packet is dropped because the ingress is not in Forwarding State. Since Multiple Spanning trees are supported, the forwarding state of a port (ingress and egress) is determined as follows: The STG (Spanning Tree Group) is picked from PTABLE or VTABLE depending on whether the packet is untagged or tagged. Using STG as the index, the Spanning Tree State for STG and for the ingress port is picked up. This is ANDED with the Sp State from the PTABLE. The Forwarding PortBitmap is constructed from the STG Table by first picking up the Egress Port Spanning Tree State for the STG and ANDing the 2 bits for each port. This is ANDED with the Sp State of each port from the PTABLE.

For Multiple Spanning Trees, then the Sp State in PTABLE should be set to 11. For a Single Spanning Tree, then the STG must be programmed to 0 for all VLANs (PTABLE or VTABLE) and the default values for all the ports for STG=0 entry is all 1s. In the PTABLE and VTABLE, the IPIC port should be programmed as part of the VLAN bitmap if the VLAN spans multiple modules. The untagged packet will also go through the ingress filtering which will check if the ingress port is a member of the VLAN. Therefore, in the PTABLE all ports belonging to a trunk group must be set to 1 s.

Figure 6:
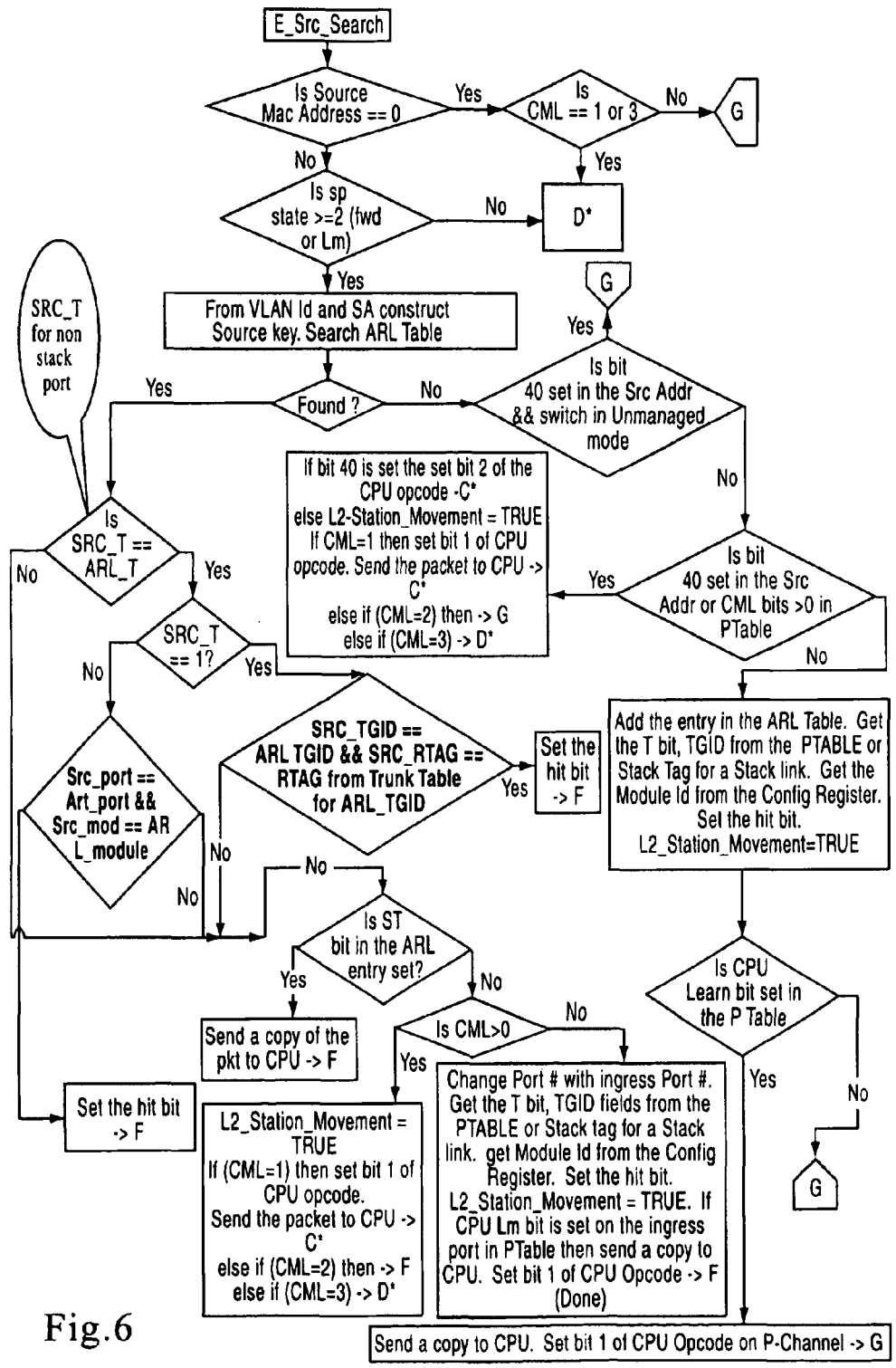
FIG. 6 is a data flow diagram for an E_Src_Search process.
Figure 7:
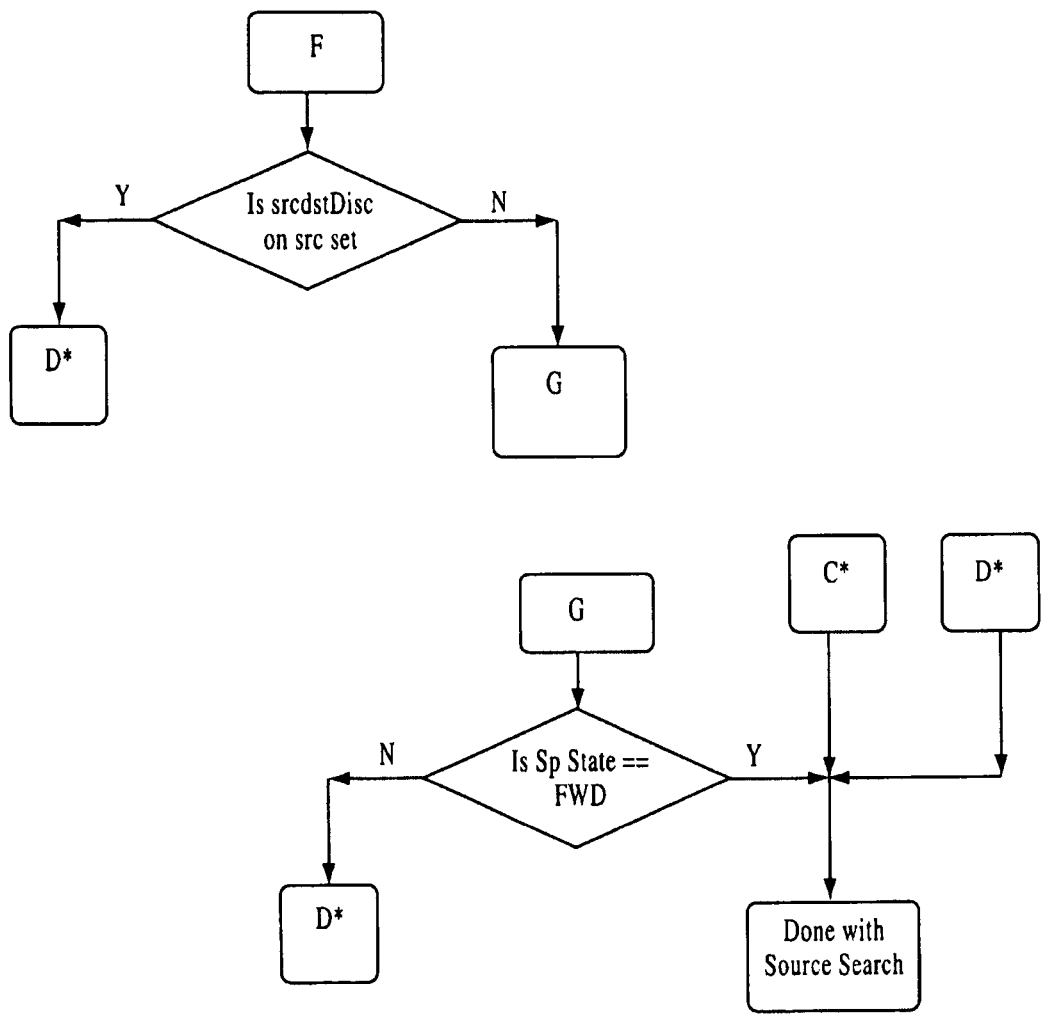
FIG. 7 are sub-flowcharts for the ARL logic for the present invention.
Figure 8:
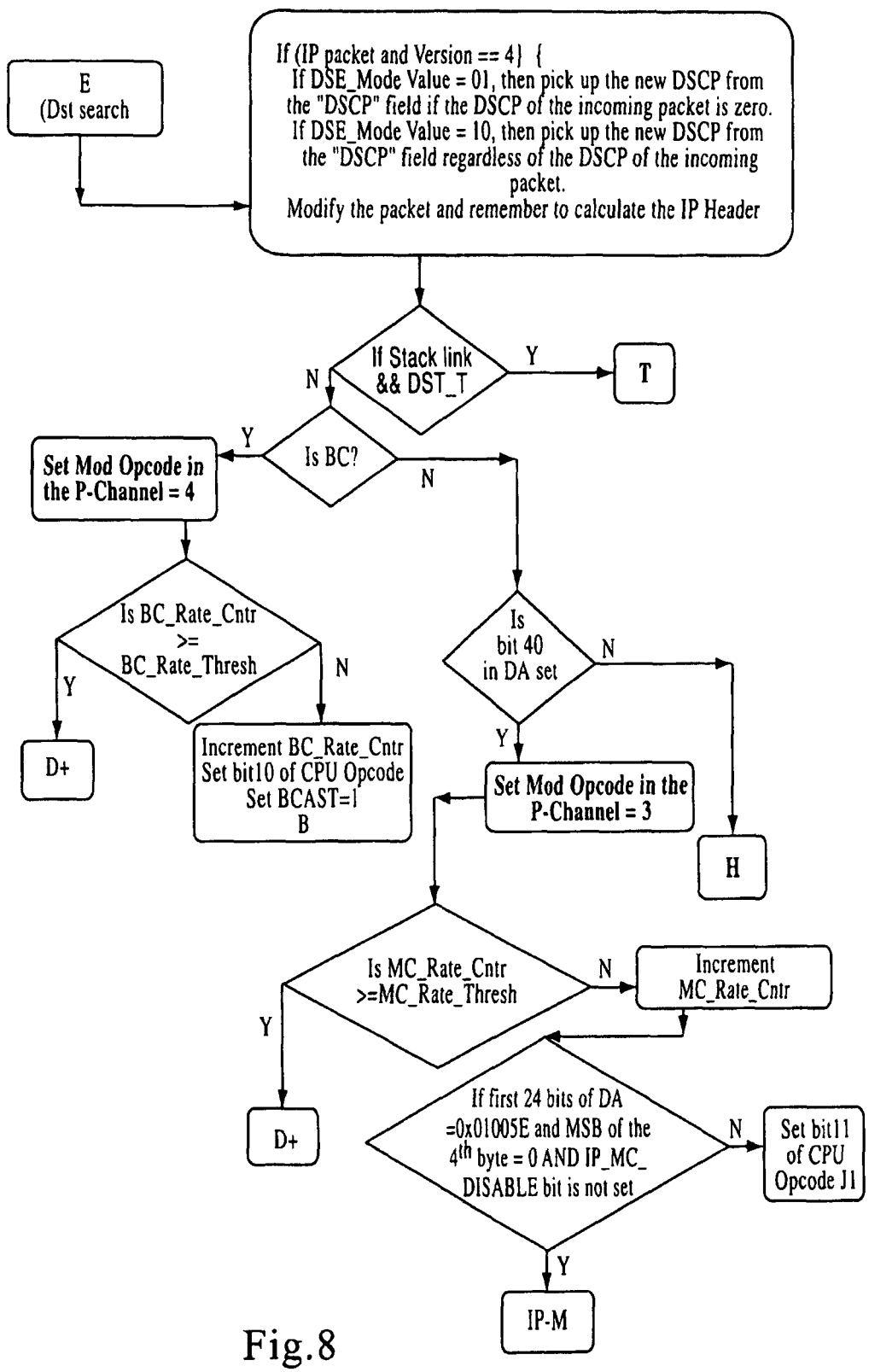
FIG. 8 is a data flow diagram for an E_Dst_Search process.

The E_Src_Search is defined logically in FIG. 6. It is noted that on the Stack Link, the SRC_T bit, SRC_TGID and SRC_RTAG are picked up from Stack Tag for learning. With respect to the figure, if F or G is reached, then the ARL has gone through Source Key search. The Source entry is either found or learnt. The F and G sub-flowcharts are illustrated in FIG. 7.

Next the E Dst_search flowchart is discussed. The Rate Control (RC) Discard Bits are internal to Ingress and used for rate control on Broadcast, DLF and Multicast Packets. With respect to the flowchart, if the Source search takes into "C" State and Destination search takes into "D" State, then go to "C" State. The following states are represented as indicated below. B—the Packet has to go out on all VLAN Ports; H—the Packet is a unicast packet; J1—the packet is a multicast packet; L3—the packet needs to be L3 switched; and IP-M—the packet is IP Multicast. It needs to be L2 switched and or L3 switched.

If new DSCP or new Priority is picked up form the PTABLE, the packet is modified and this header is used for FFP. If the packet is Priority Tagged, VLAN Id is picked up from the PTABLE and the packet is modified. IP_MC_DISABLE is a configuration bit defined in Switch Configuration Register 2

Figure 9:
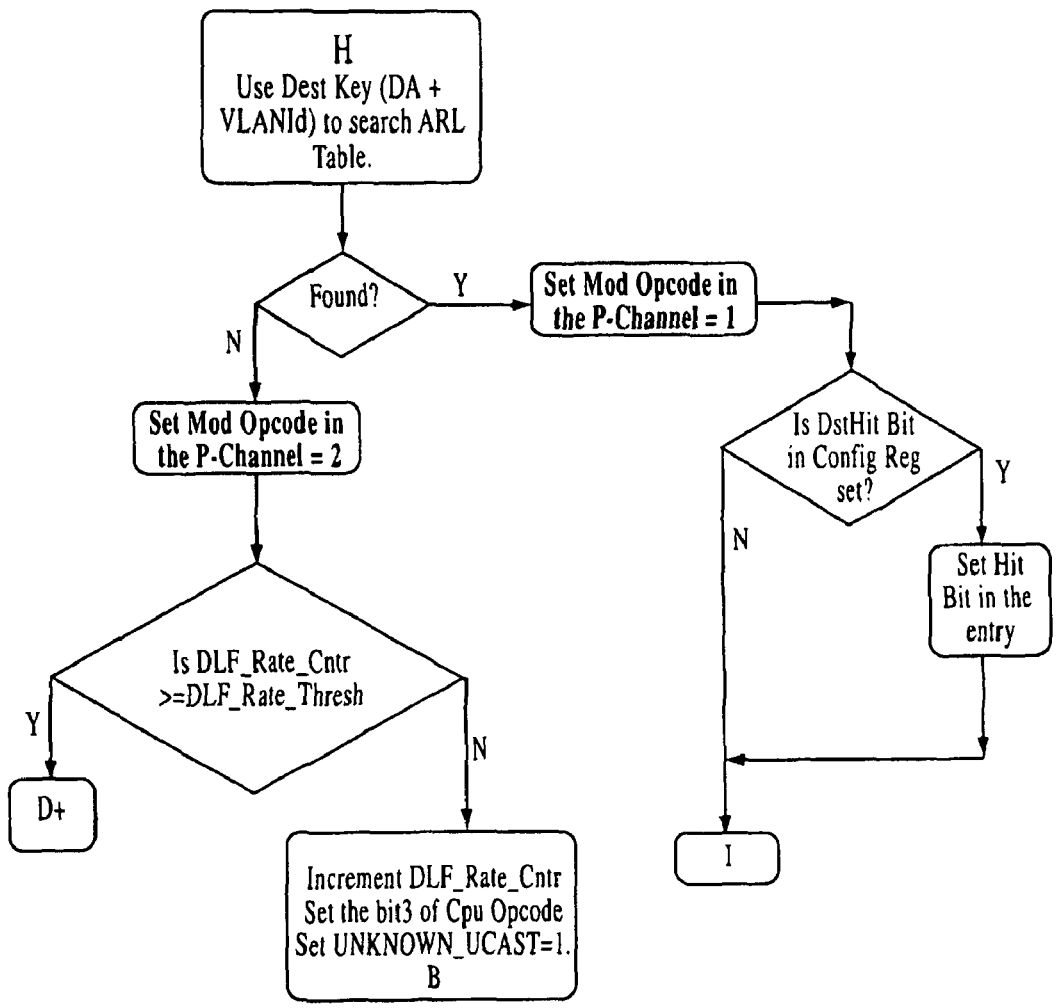
FIG. 9 is a sub-flowchart for the ARL logic for the present invention.
Figure 10:
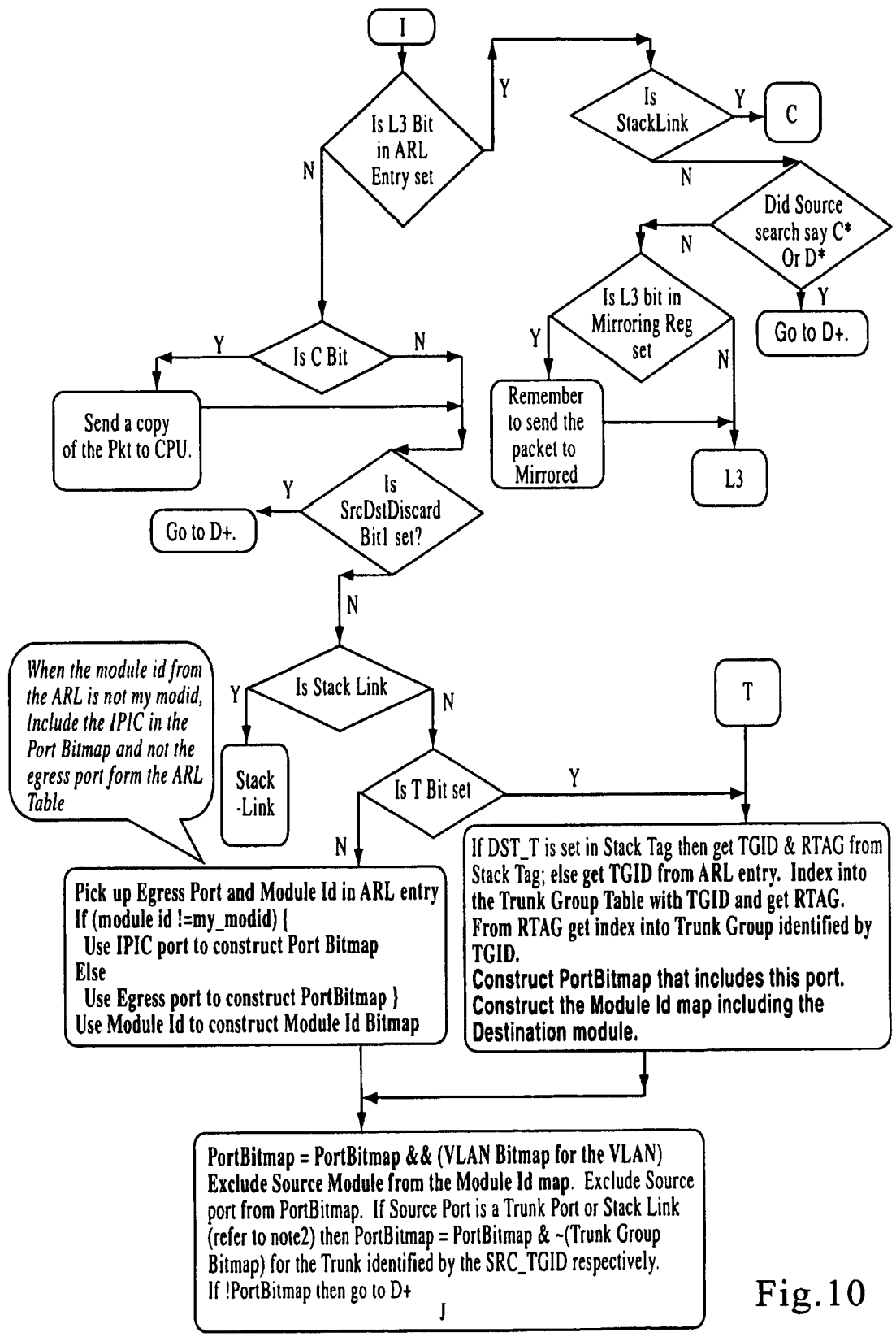
FIG. 10 is a sub-flowchart for the ARL logic for the present invention.

The sub-flowchart H is illustrated in FIG. 9, with a sub-flowchart of H, specifically I, illustrated in FIG. 10. I indicated that the packet has gone through all the discard conditions. It is noted that Rate Control (RC) Discard Bits are internal to Ingress and used for rate control on Broadcast, DLF and Multicast Packets.

Figure 11:
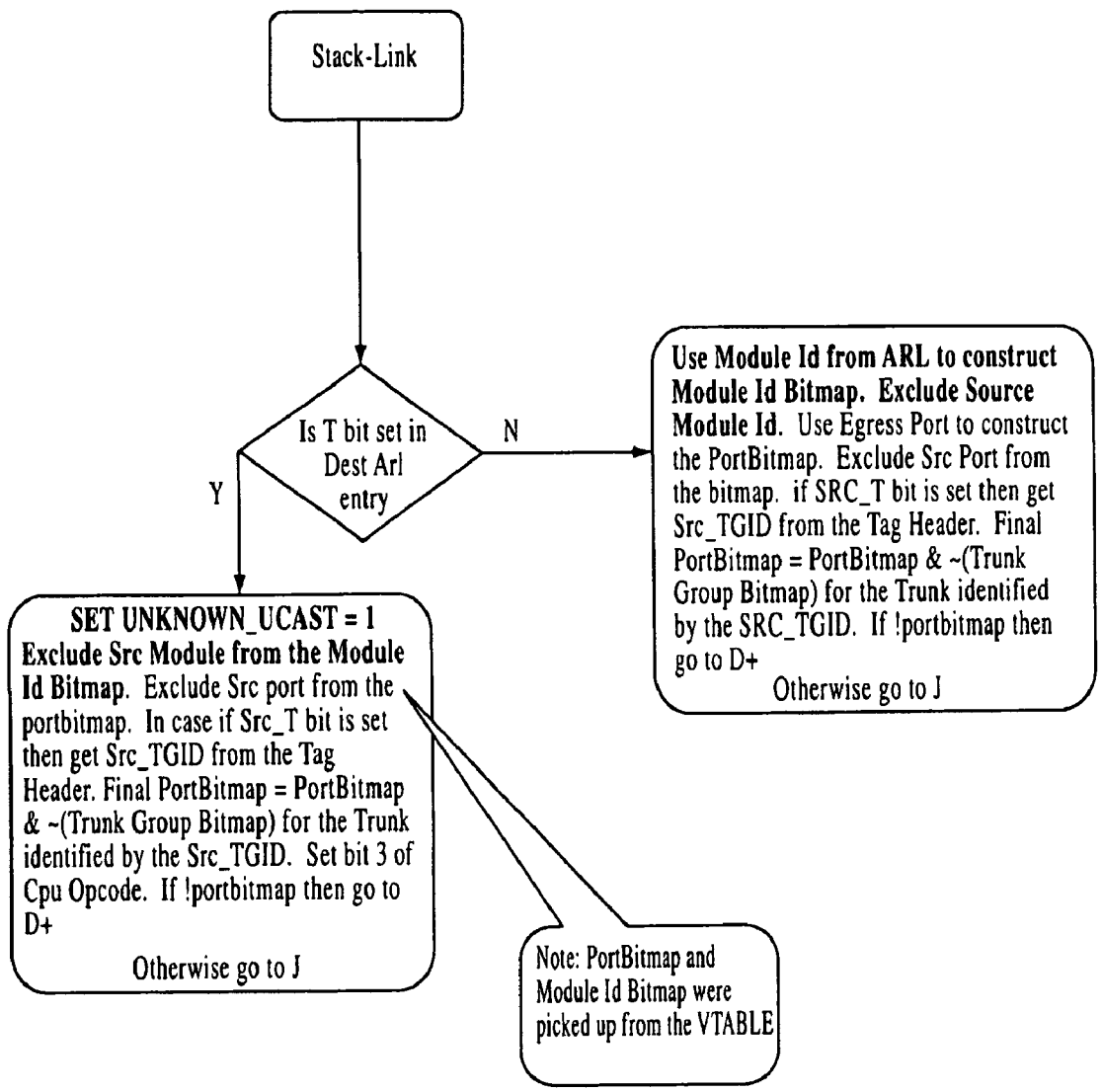
FIG. 11 is a data flow diagram for determining a stack-link status.

It is noted that if the Packet is a Tagged Packet then the CoS is chosen from the Priority field in the packet. For the Untagged packet, if the RPE is set, then the priority is picked up from the new priority field in the PTABLE, otherwise the CoS is chosen from the matched Source Entry in the ARL Table, if the Source CoS Priority (SCP) bit is set or DLF. If SCP is set to zero or SLF then it is picked up from the matched Destination Entry in the ARL Table. Additionally, if the L3 bit is set, the ARL T bit must not be set. This is important for the Stack-Link flowchart illustrated in FIG. 11.

Figure 12:
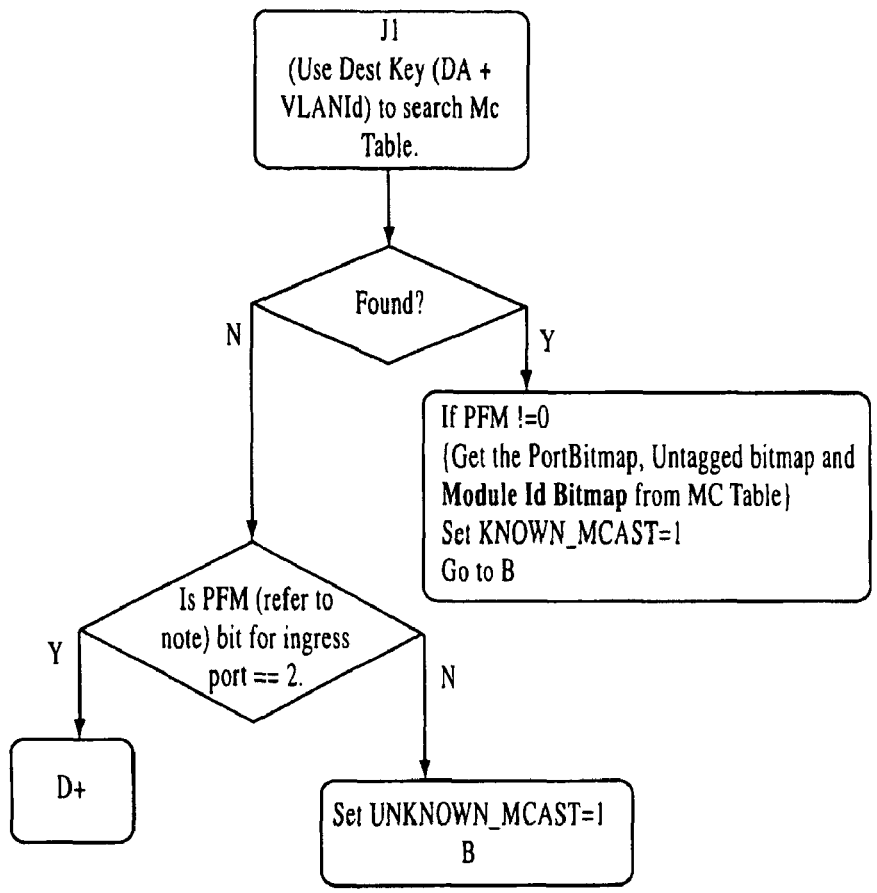
FIG. 12 is a sub-flowchart for the ARL logic for the present invention.
Figure 13:
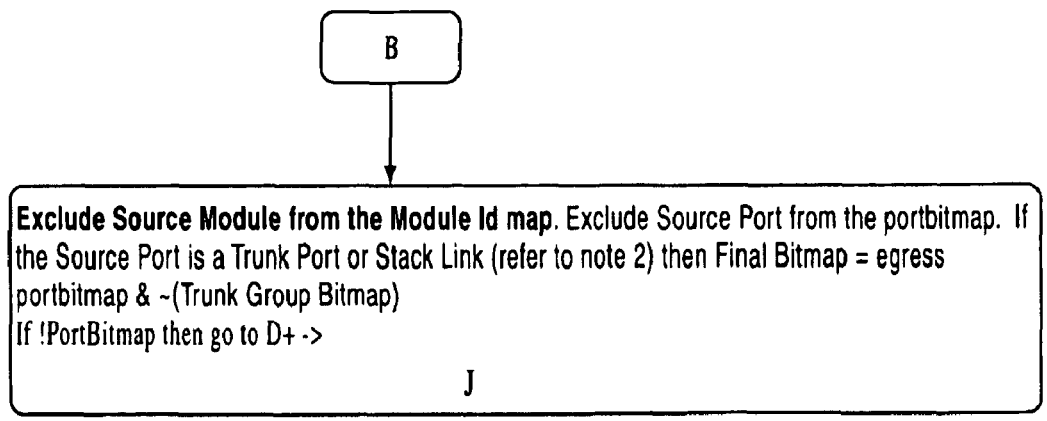
FIG. 13 is a sub-flowchart for the ARL logic for the present invention.

When the packet is a multicast packet, the J1 flowchart, illustrated in FIG. 12, is followed. The PFM bits are defined in the section on Traffic Class Expediting and Dynamic Multicast Filtering (802.1 p) Support. The PFM for stacking Link is picked up from the stack Tag. If the Packet is a Tagged Packet then the CoS is chosen from the Priority field in the packet. For the Untagged packet if the RPE is set, then the priority is picked up from the new priority field in the PTABLE otherwise, the CoS is chosen from the matched Source Entry in the ARL Table, if the Source CoS Priority (SCP) bit is set or MC miss or PFM==0. If (SCP is set to zero or SLF) and PFM !=0 then it is picked up from the matched Entry in the MC Table. The sub-flowchart for B, is shown in FIG. 13. For Stack Link, the SRC_TGID is picked up from Stack Tag and SRC_TGID is valid only if SRC_T is set to 1.

Figure 14:
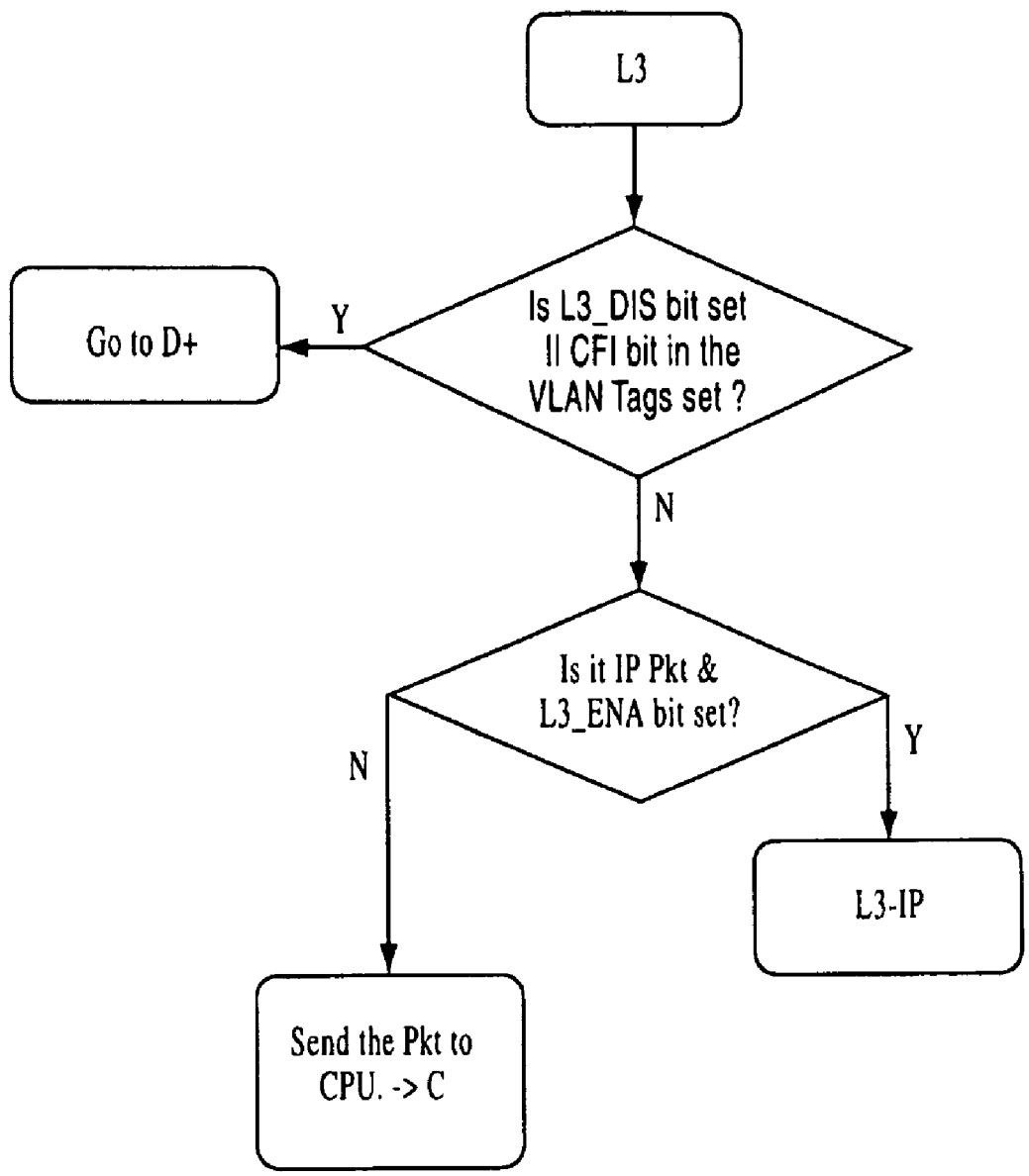
FIG. 14 is a sub-flowchart for the ARL logic for the present invention.
Figure 15:
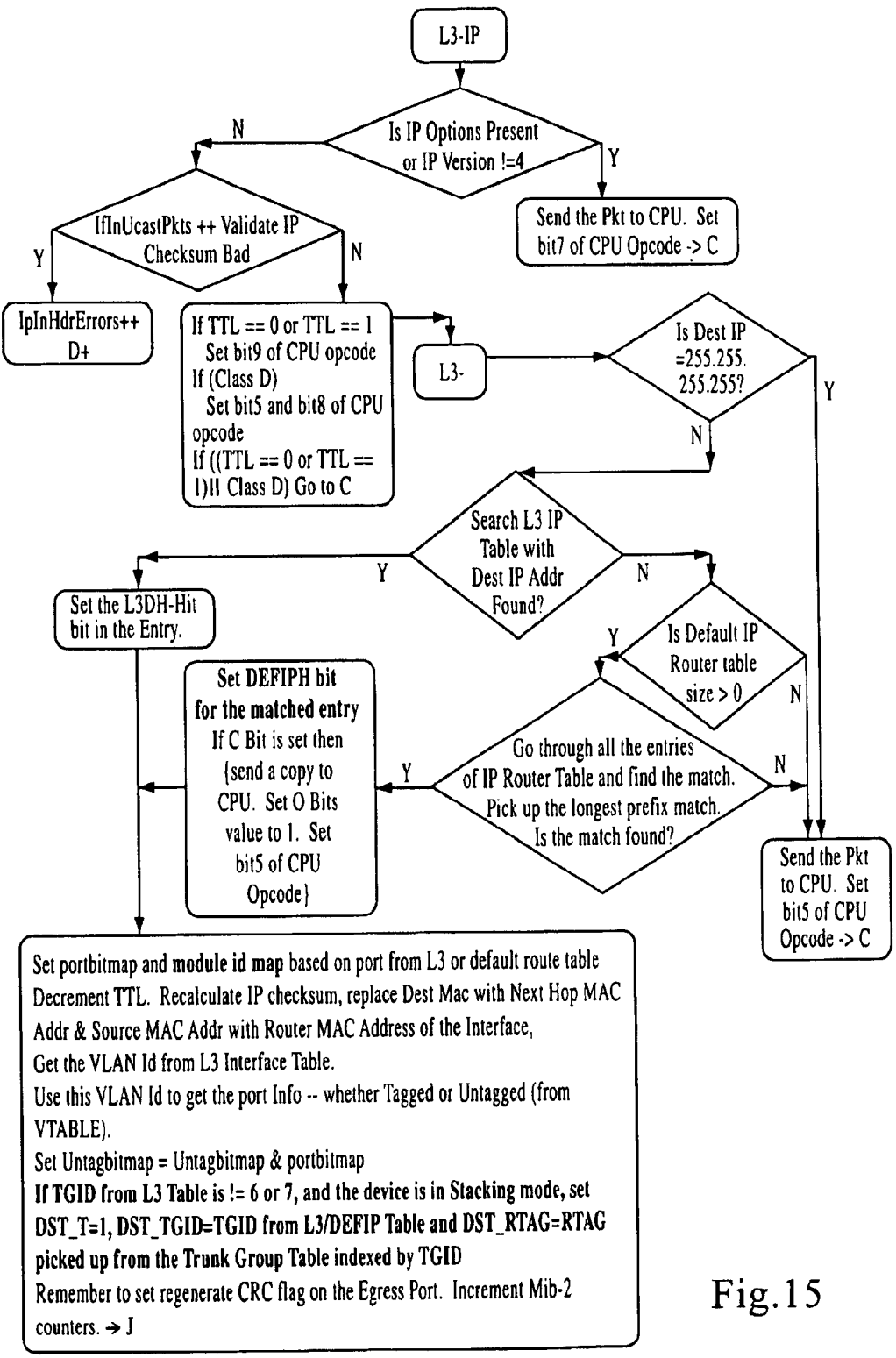
FIG. 15 is a sub-flowchart for the ARL logic for the present invention.
Figure 16:
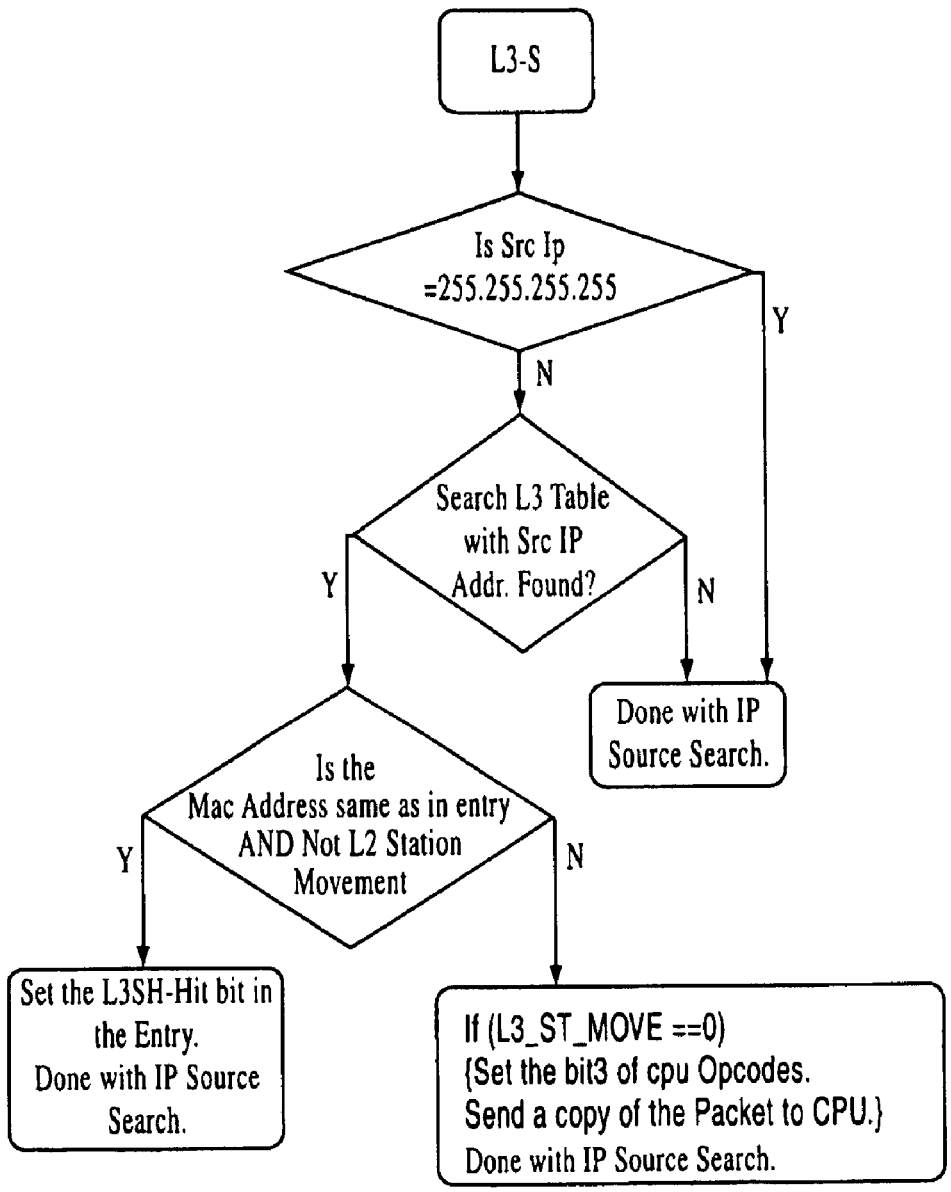
FIG. 16 is a sub-flowchart for the ARL logic for the present invention.
Figure 17:
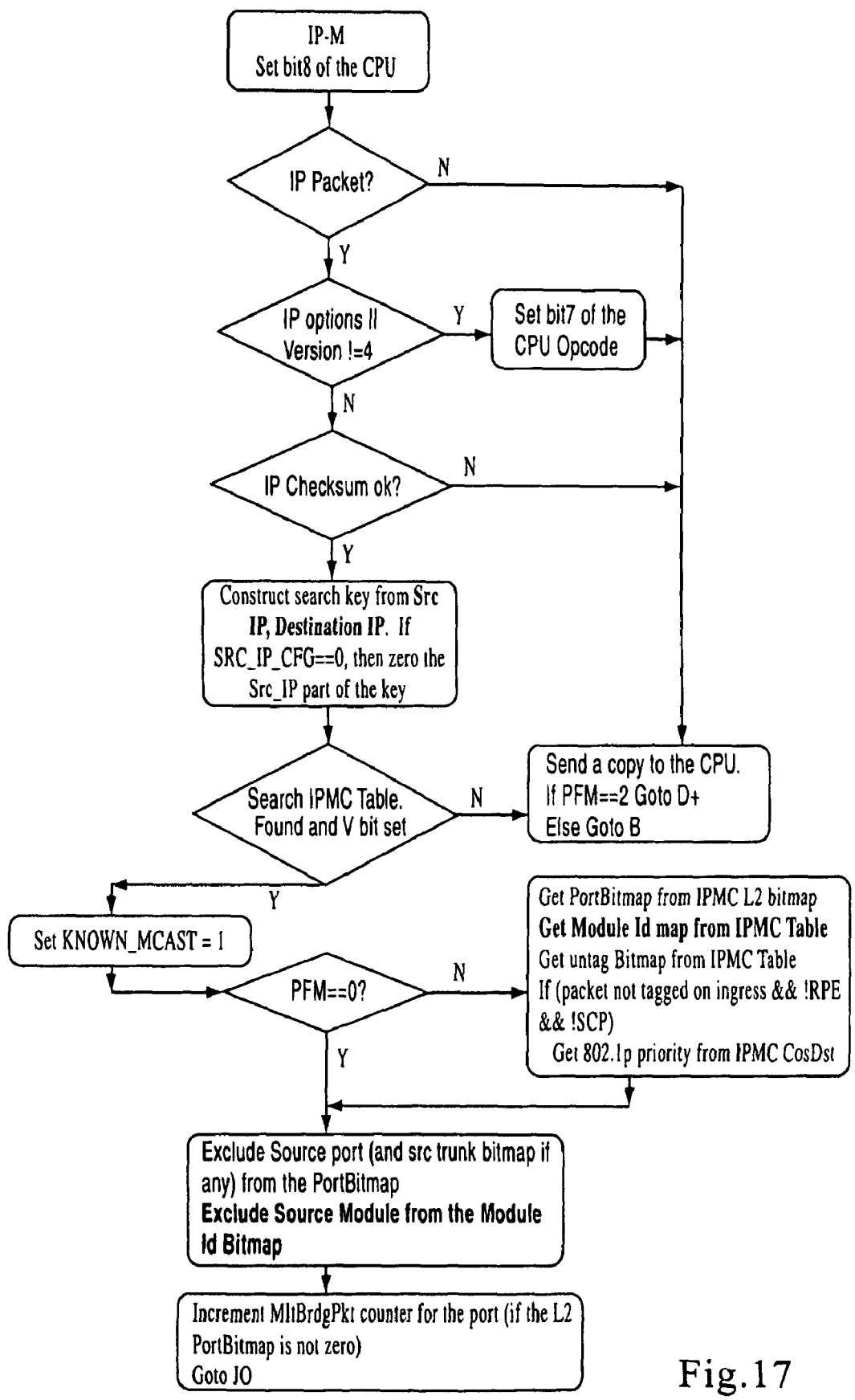
FIG. 17 is a sub-flowchart for the ARL logic for the present invention.
Figure 18:
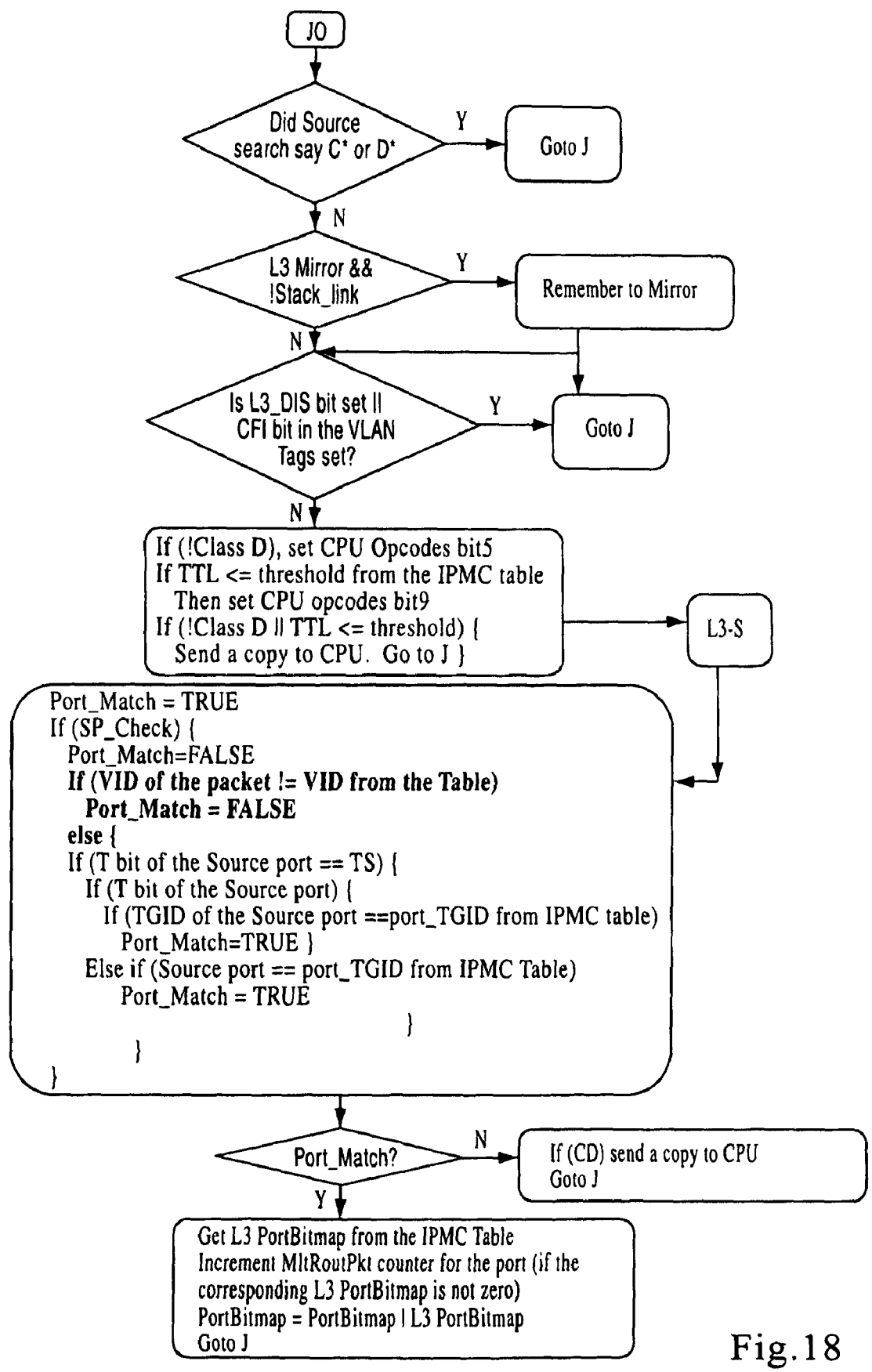
FIG. 18 is a sub-flowchart for the ARL logic for the present invention.

When the packet needs to be L3 switched, the flowchart of FIG. 14 is followed, with the sub-flowchart for L3-IP being illustrated in FIG. 15. The sub-flowchart for L3-S, when the Source IP search needs to be done for setting the L3SH Hit Bit, is illustrated in FIG. 16. For the L3 Switched Packet, the Packet Modification happens after going through the FFP. This means that the Filter Masks are applied on the received packet and not on the modified packet with two exceptions (new DSCP, new Priority). For the FFP, the Egress Port used is the one picked up from the L3 Switching Logic. If the packet is L3 switched, then the untagged bitmap is derived from the VTABLE lookup of the VLAN ID from the L3 Interface, with all the bits except the Egress port masked to zero. If the packet is Priority Tagged, pick up VLAN Id from the PTABLE and modify the packet. IP-M is followed when a packet goes through IP Multicast table. This is illustrated in FIG. 17, with FIG. 18 illustrating the logic followed for J0. For IP Multicast, a port bit should be set either in L2 PortBitmap or L3 PortBitmap, but not in both.

Figure 19:
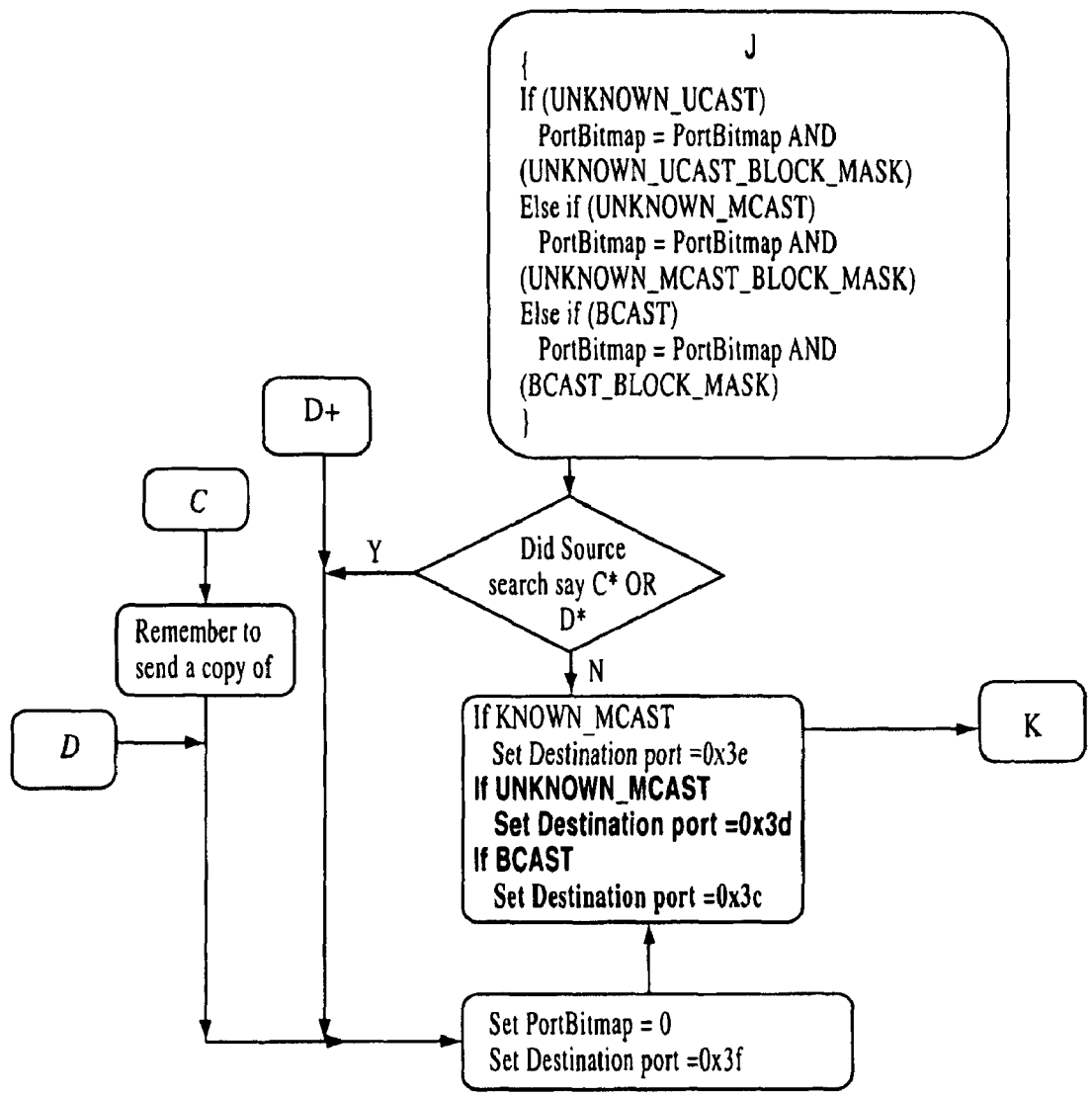
FIG. 19 is a sub-flowchart for the ARL logic for the present invention.
Figure 20:
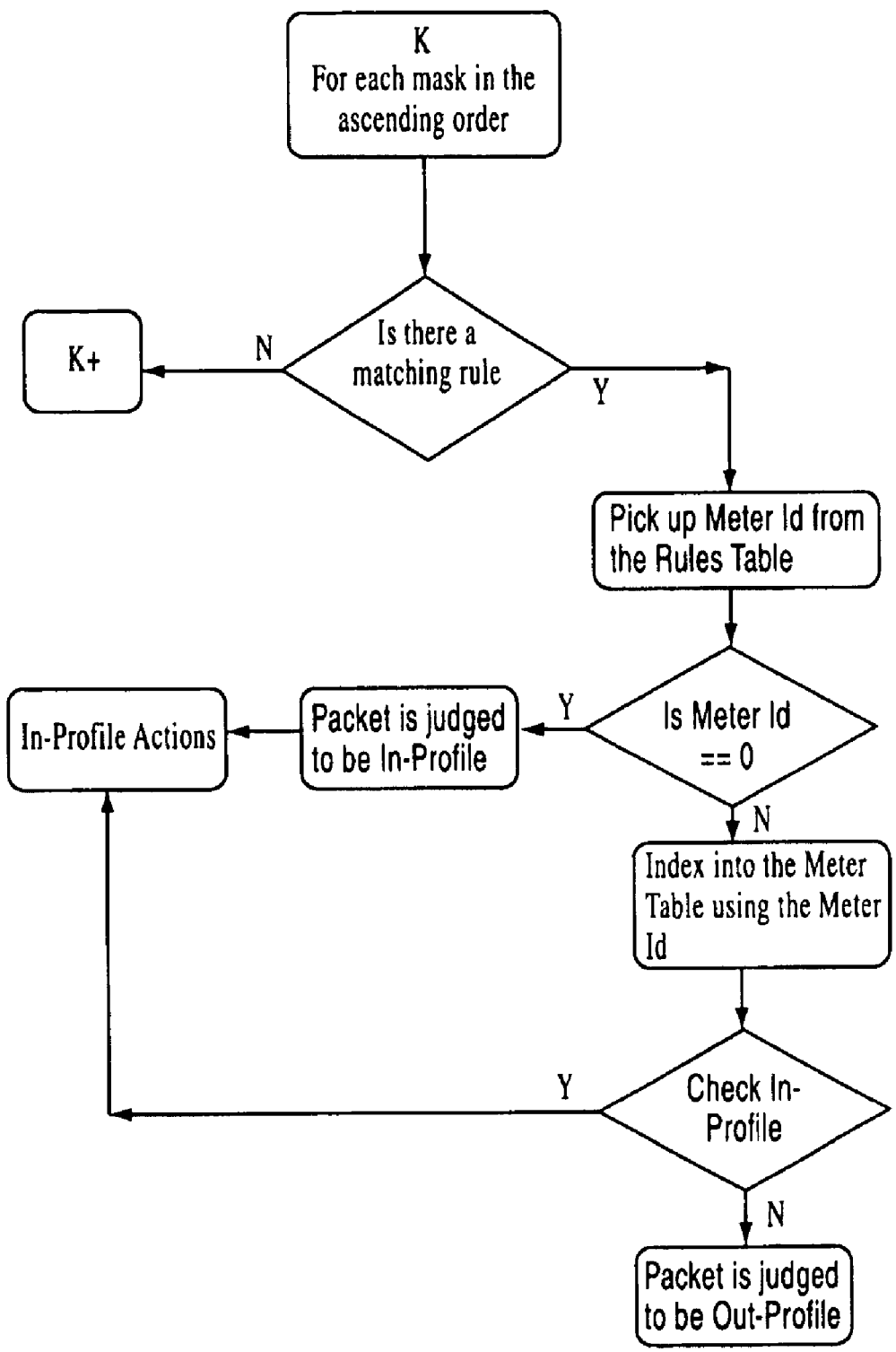
FIG. 20 is a sub-flowchart for the ARL logic for the present invention.
Figure 21:
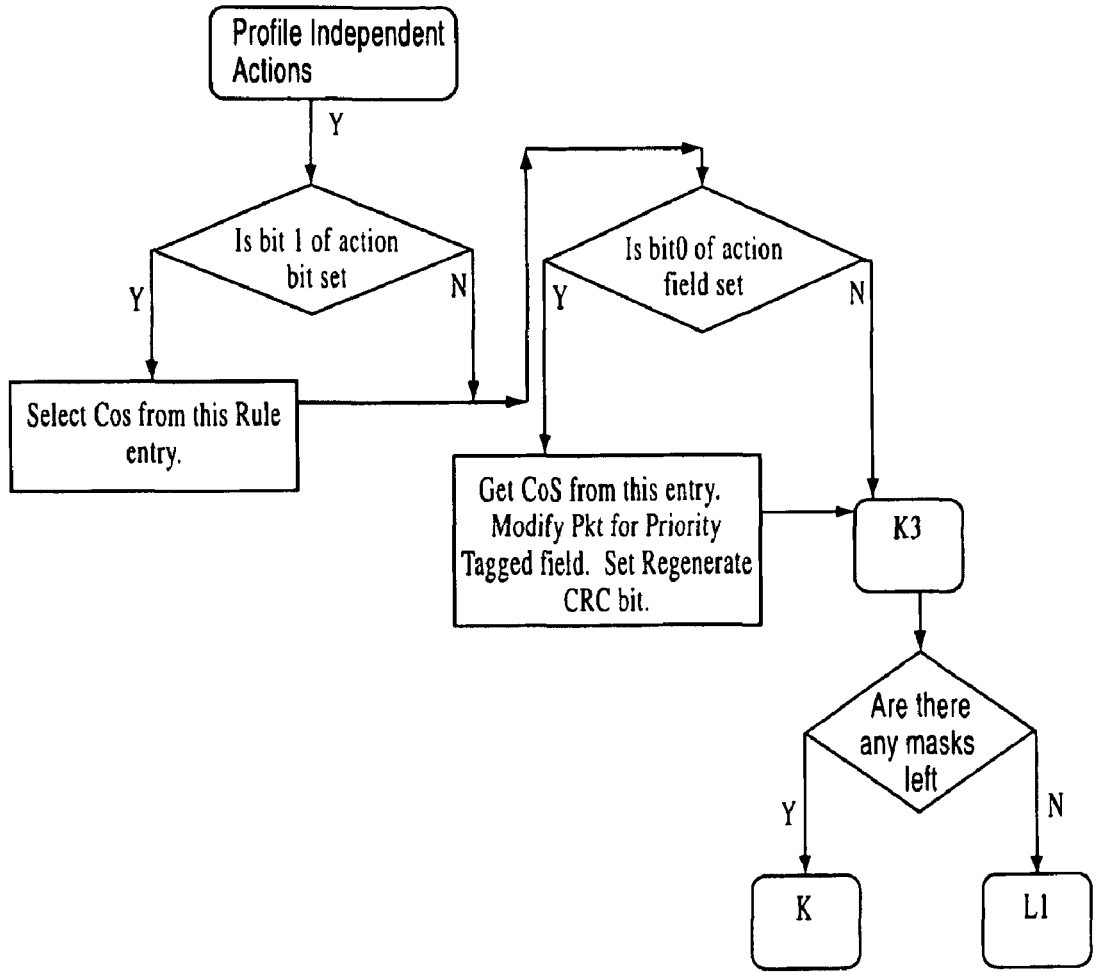
FIG. 21 is a data flow diagram for Profile Independent actions.
Figure 22:
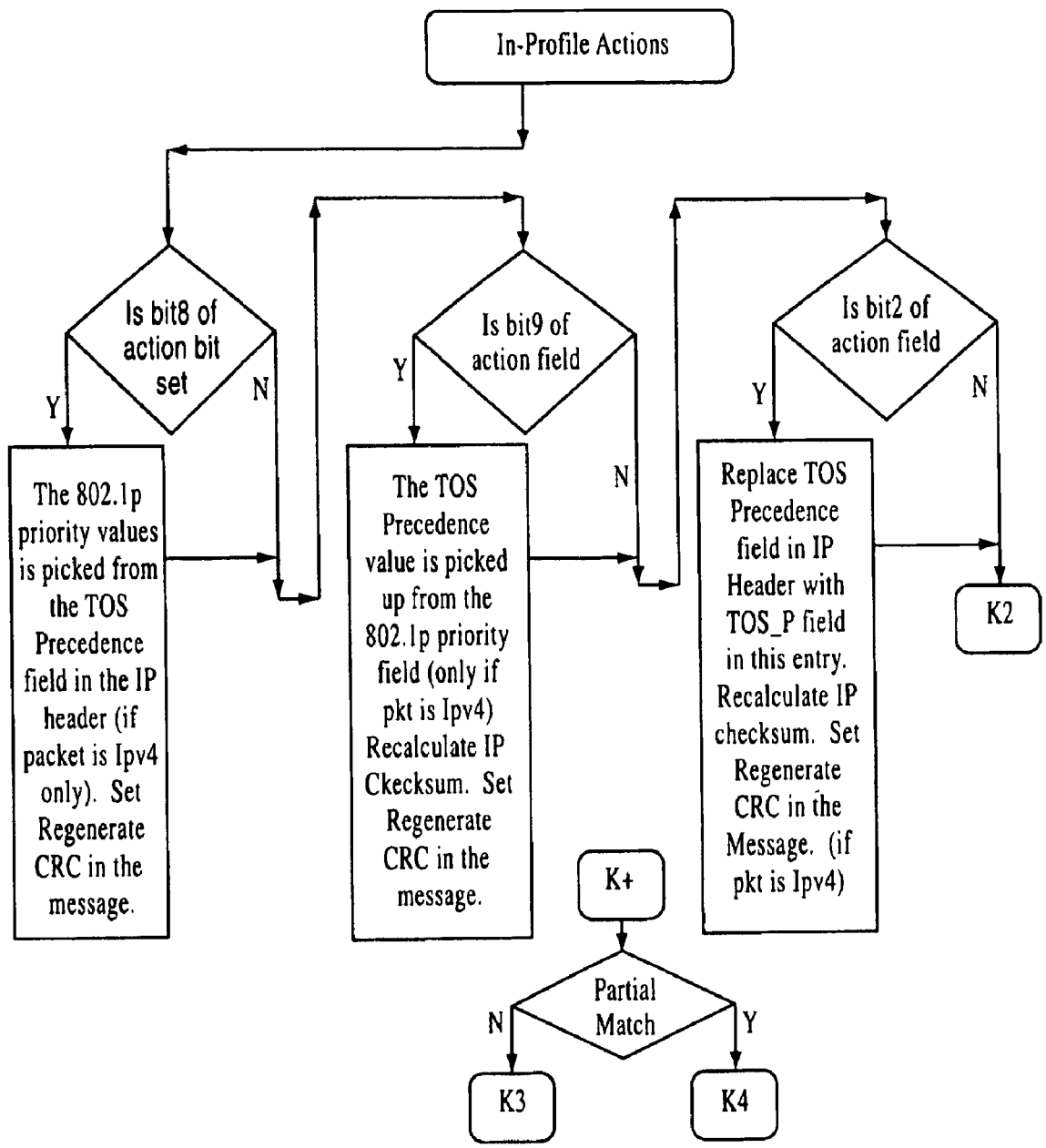
FIG. 22 is a data flow diagram for In-Profile actions.
Figure 23:
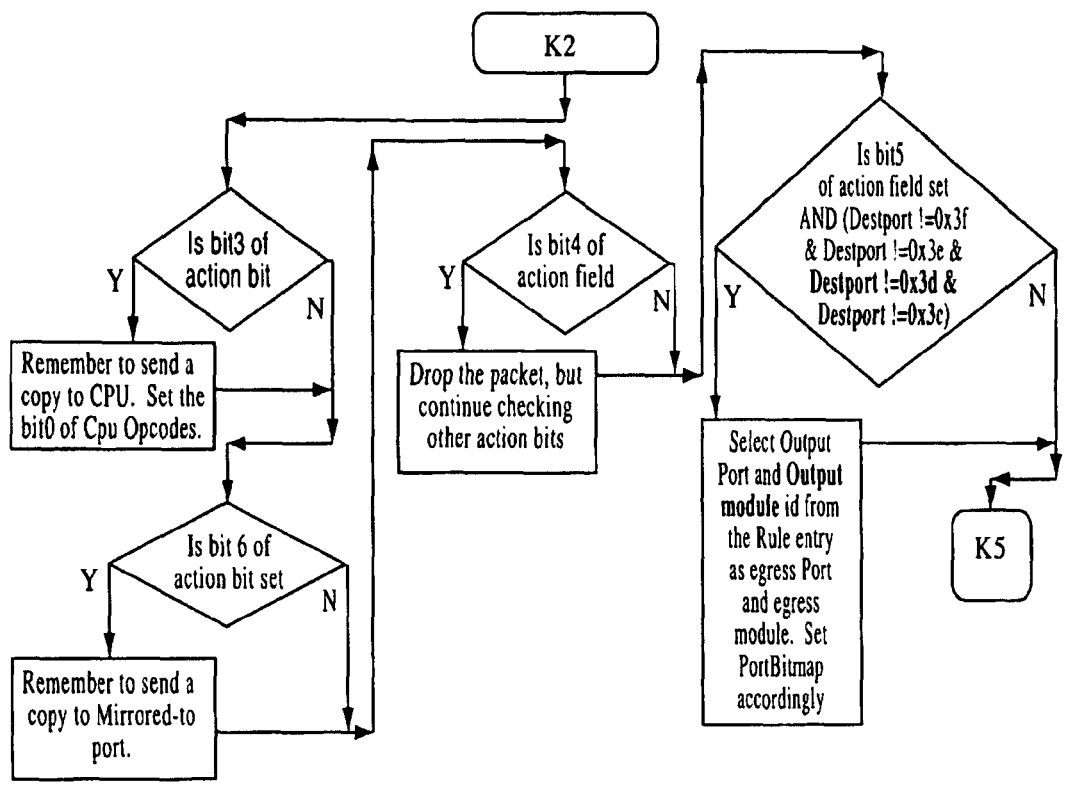
FIG. 23 is a sub-flowchart for In-Profile actions.
Figure 24:
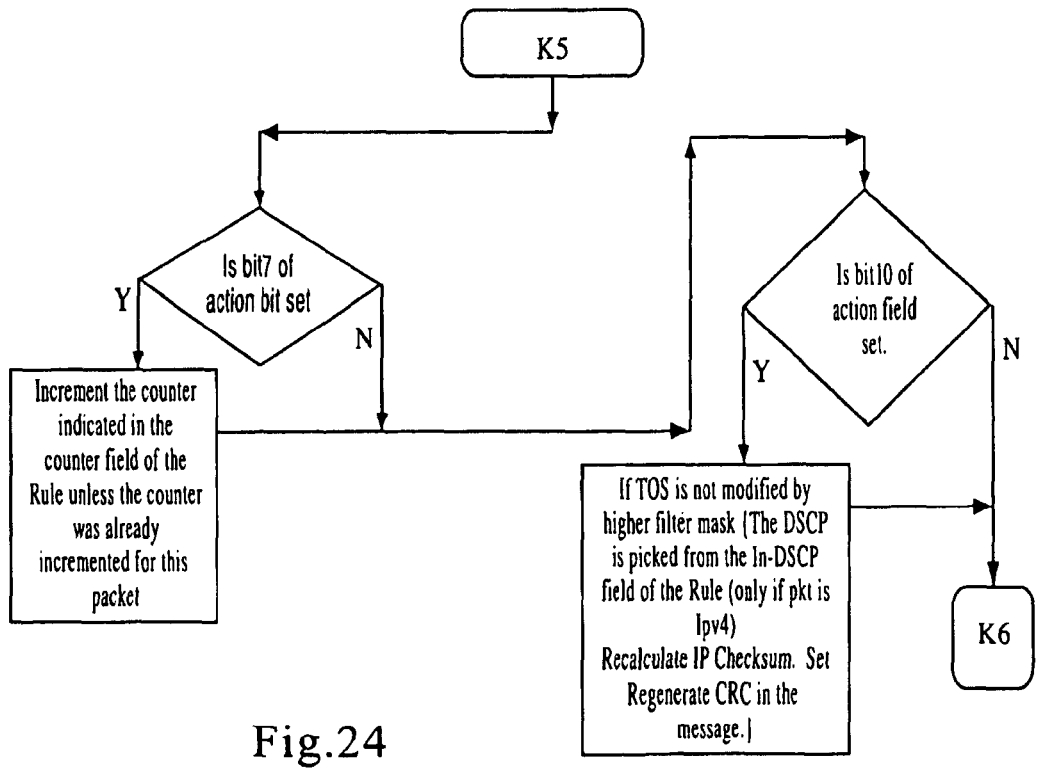
FIG. 24 is a sub-flowchart for In-Profile actions.
Figure 25:
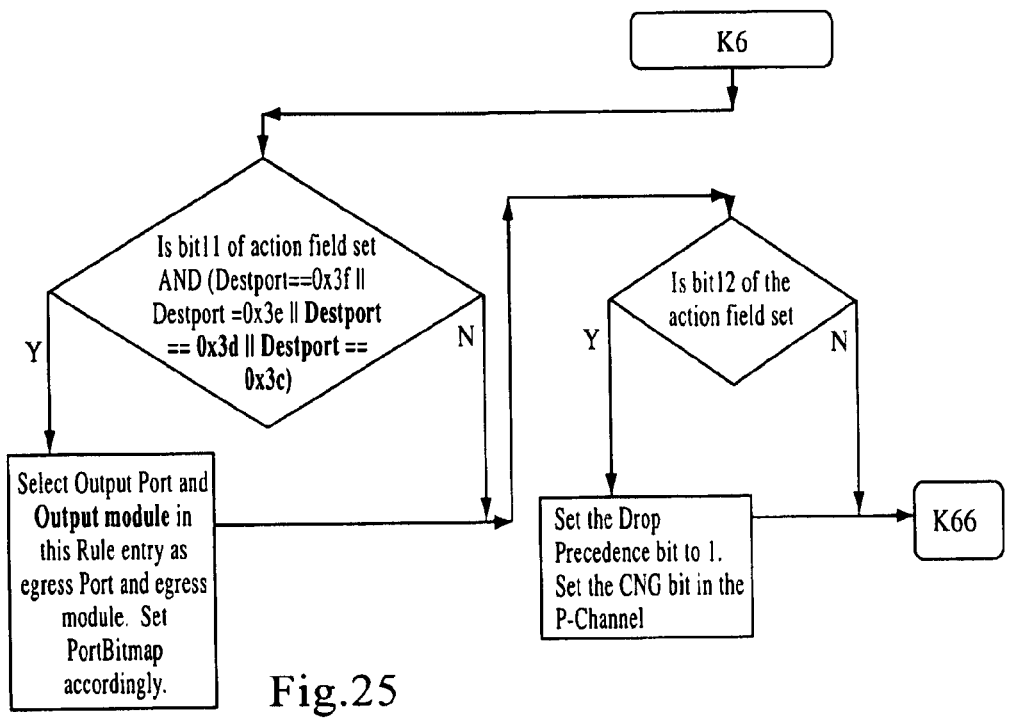
FIG. 25 is a sub-flowchart for In-Profile actions.
Figure 26:
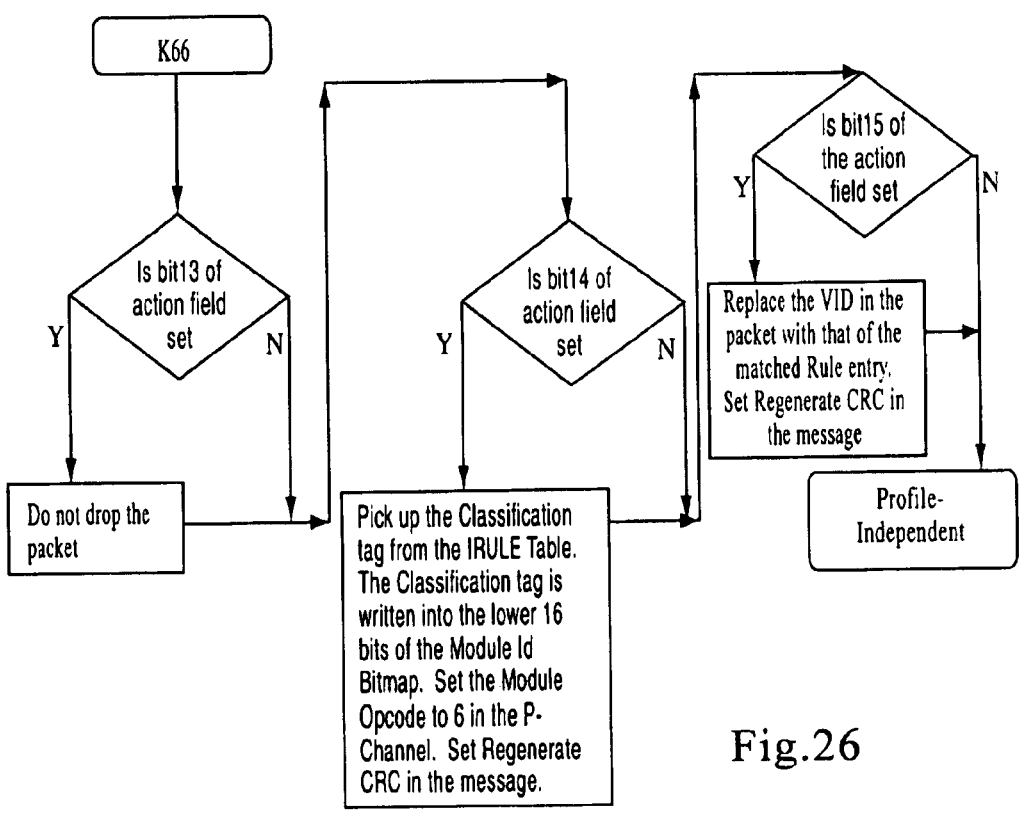
FIG. 26 is a sub-flowchart for In-Profile actions.
Figure 27:
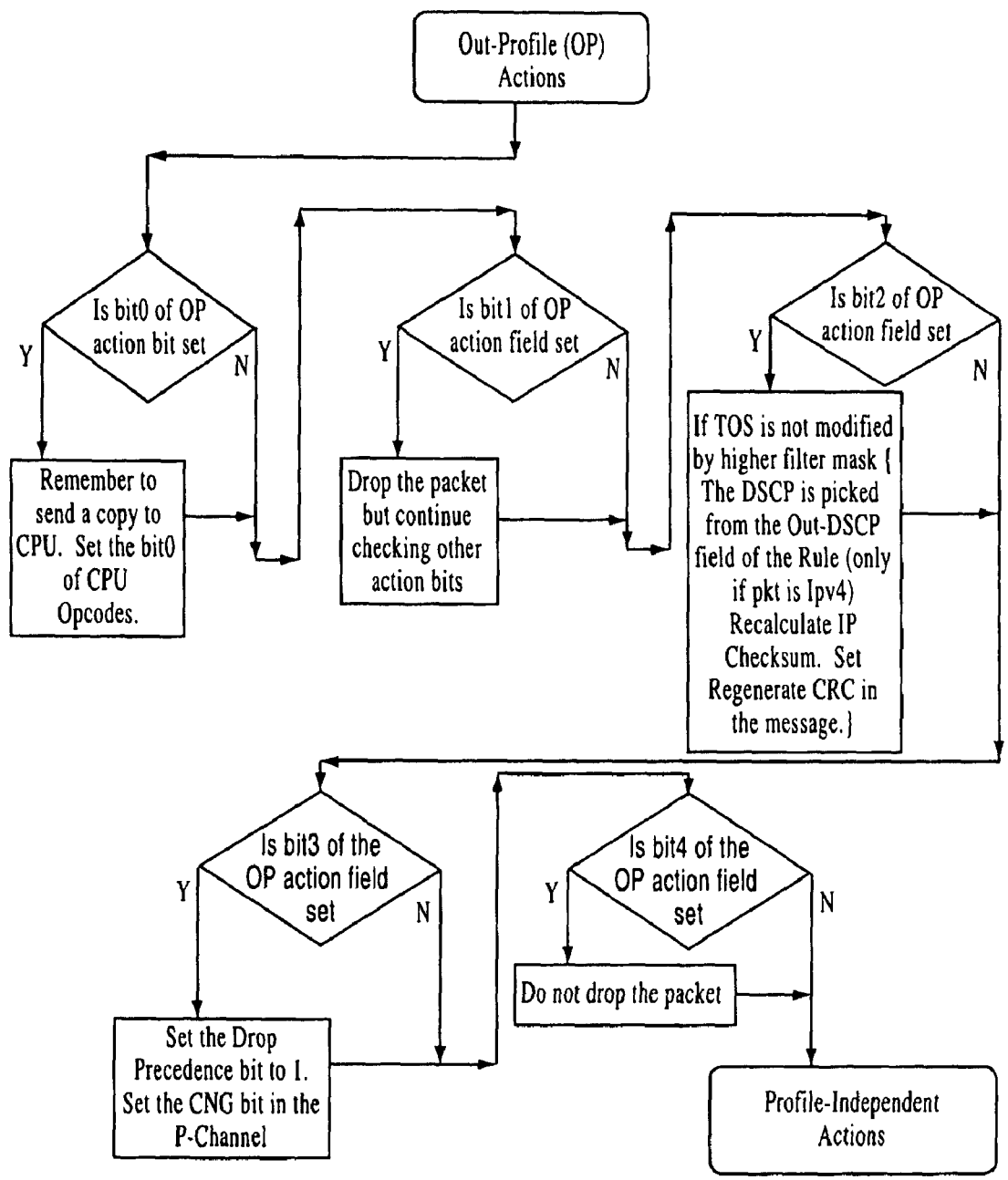
FIG. 27 is a data flow diagram for Out-Profile actions.
Figure 28:
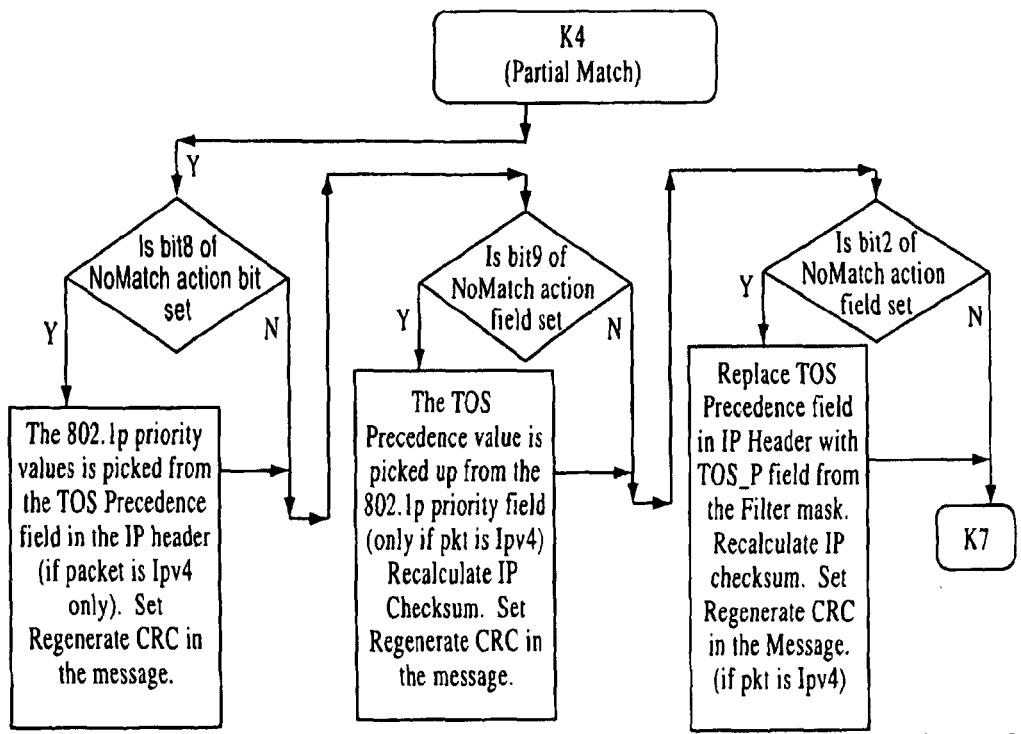
FIG. 28 is a sub-flowchart for Out-Profile actions.
Figure 29:
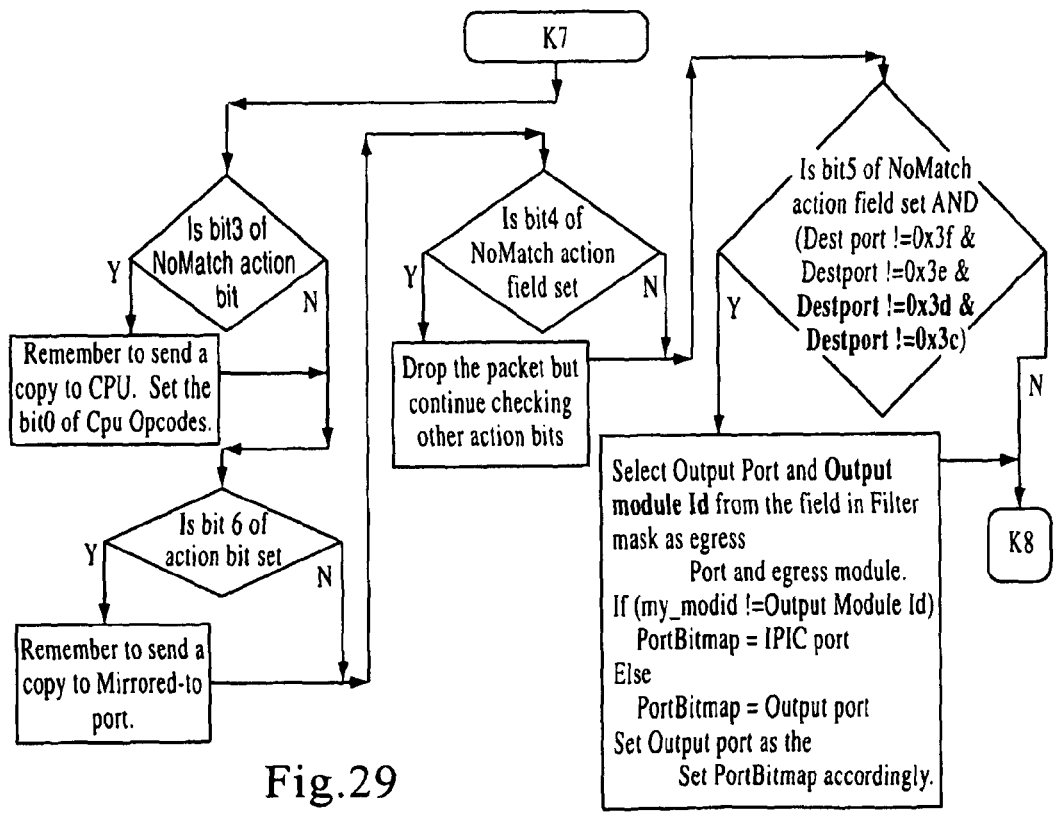
FIG. 29 is a sub-flowchart for Out-Profile actions.
Figure 30:
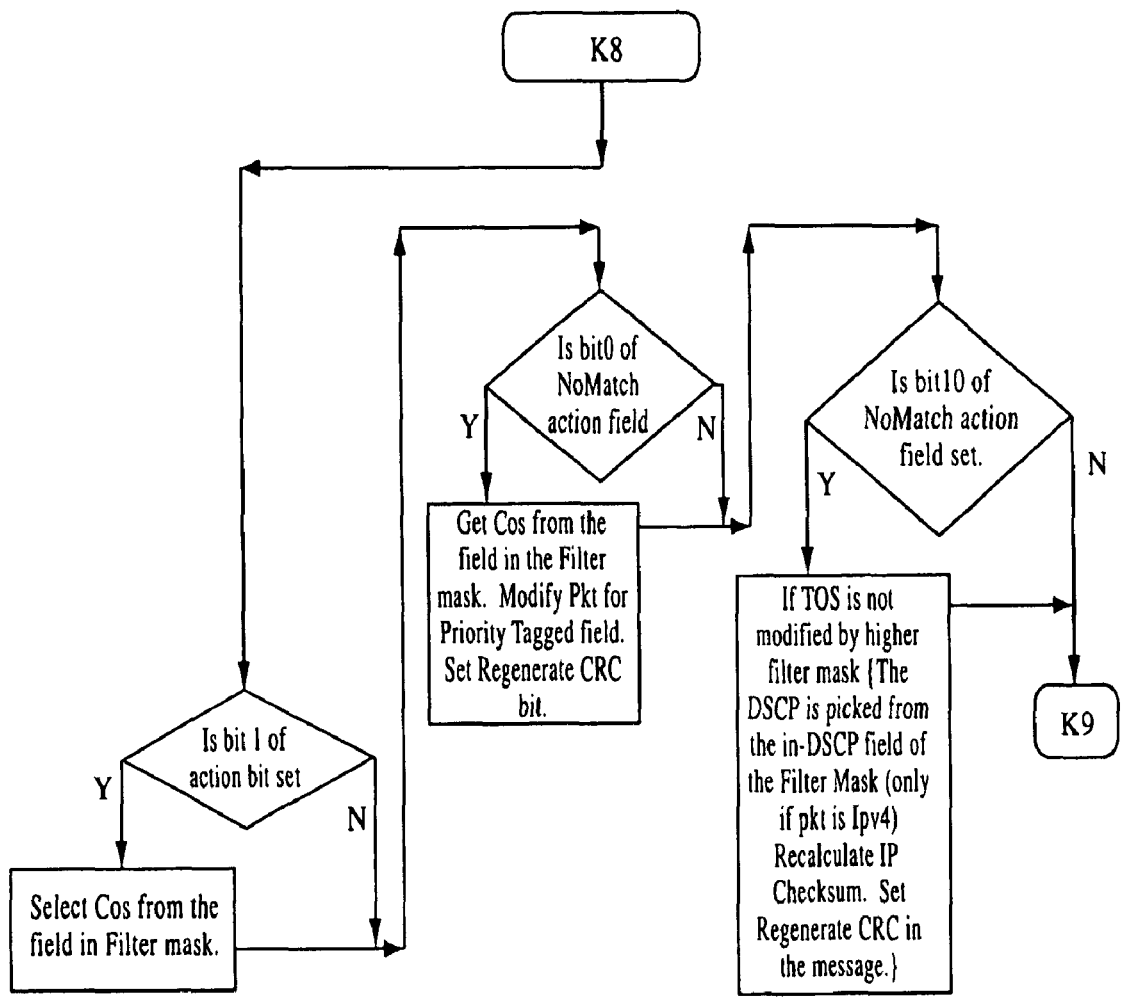
FIG. 30 is a sub-flowchart for Out-Profile actions.
Figure 31:
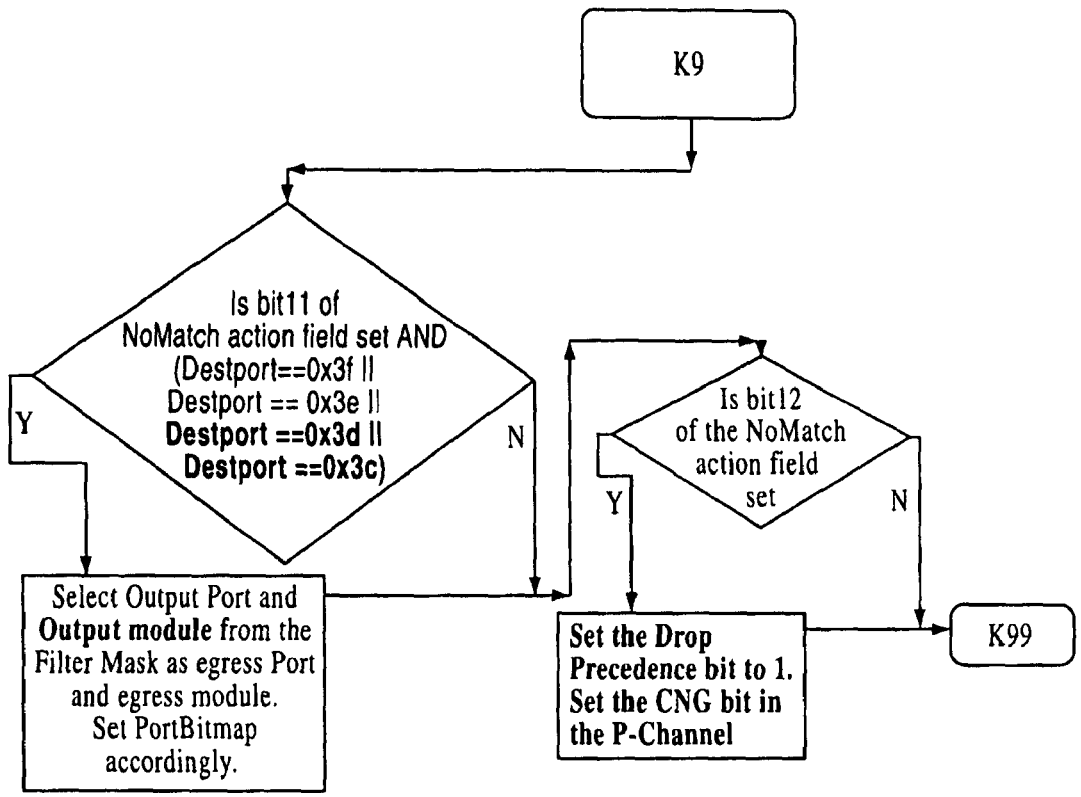
FIG. 31 is a sub-flowchart for Out-Profile actions.
Figure 32:
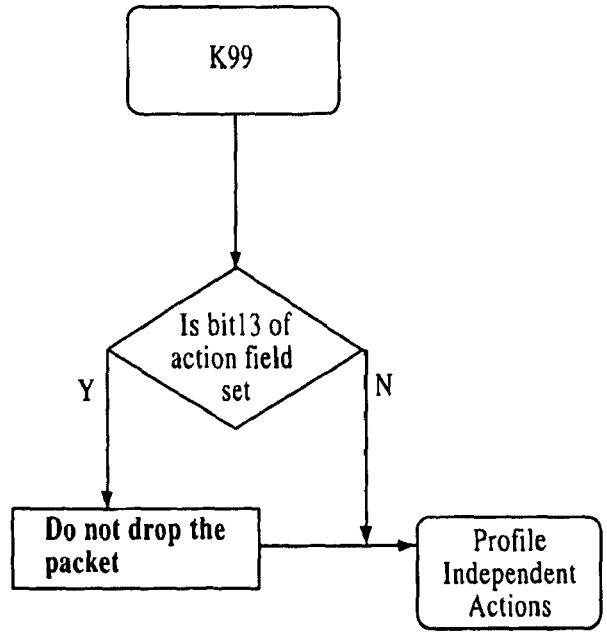
FIG. 32 is a sub-flowchart for Out-Profile actions.

The FFP logic process is illustrated in FIG. 19. If the packet is an untagged packet, then the ingress must tag the packet with information got from ARL Logic, before going through FFP. In doing so one can set only one Filter for both tagged and untagged packets. The packet has to go through all FFP Actions if it reaches K in the flowchart, with the logic for K being illustrated in FIG. 20. The result of K is to determine if the packet is judged to be In-Profile or Out-Profile. FIG. 21 illustrates profile independent actions. FIG. 22 shows In-Profile Actions, with sub-flowcharts for K2, K5, K6 and K66 being illustrated in FIGS. 23-26. FIG. 27 shows Out-Profile Actions, with sub-flowcharts for K4, K7, K8, K9 and K99 being illustrated in FIGS. 28-32.

Figure 33:
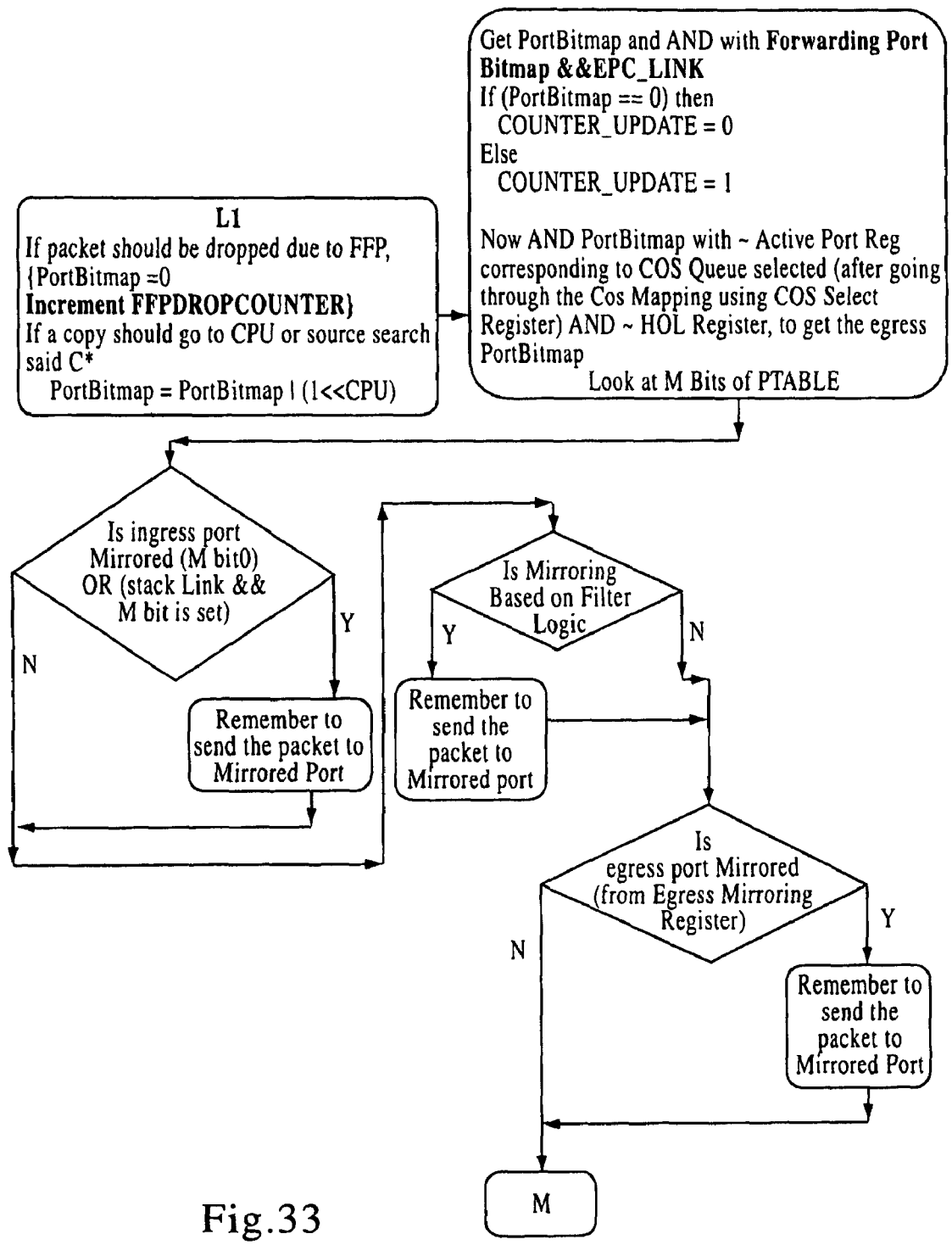
FIG. 33 is a data flow diagram for a L1 process.
Figure 34:
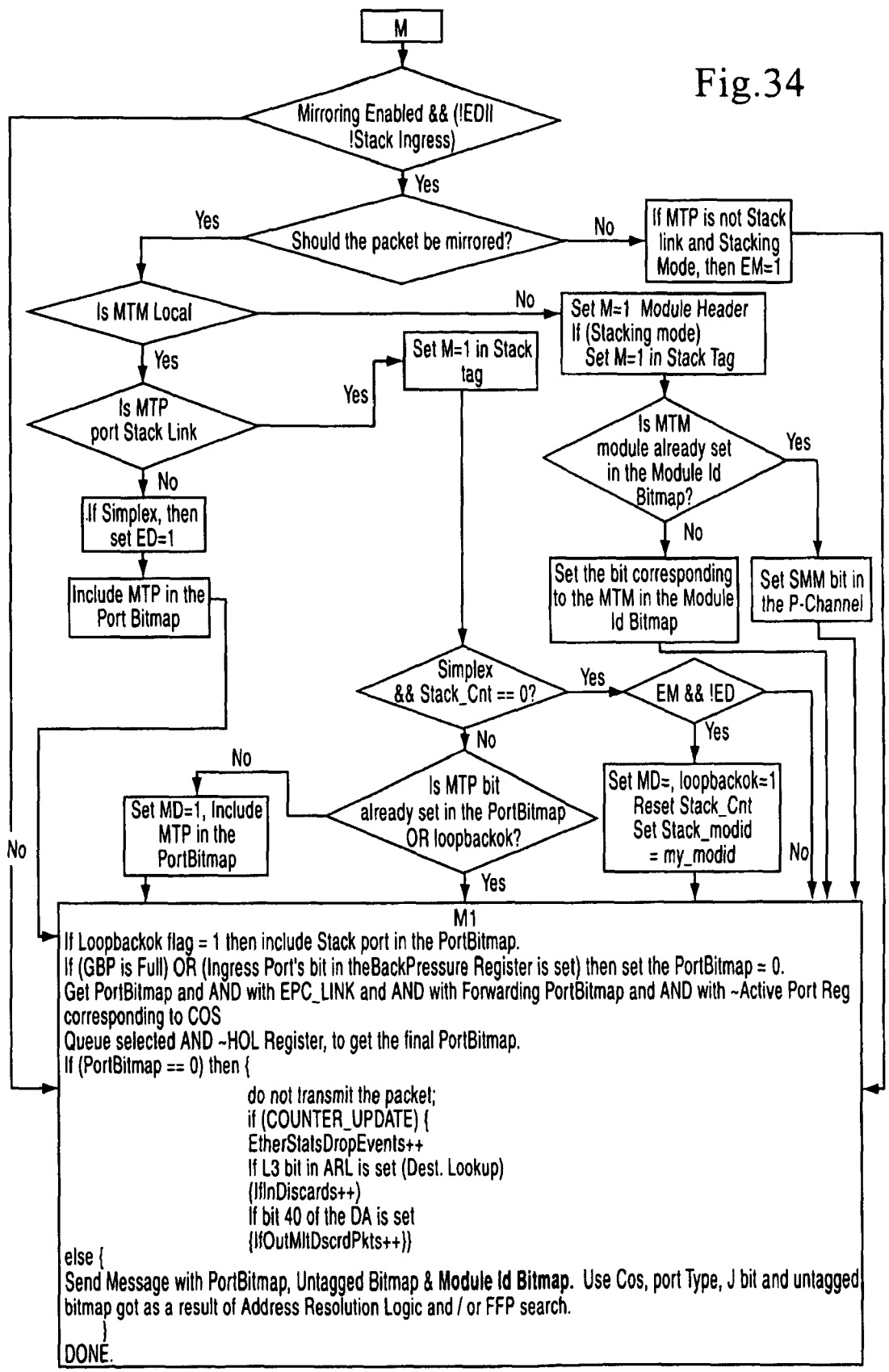
FIG. 34 is a sub-flowchart for the L1 process.

All the incoming packets, after going through ARL and FFP, go through COS Mapping to get the COS Queue. This is illustrated in FIG. 33. The COS Select Register is used for this Mapping. The logic flows to M, where the packet is checked for Mirroring conditions, as illustrated in the flowchart of 34. If the GBP is full, then the packet is not sent out on the CP Channel. If the CPU sends a packet to another CPU and it is egress mirrored, then the CPU should send the packet with ED=1 on the Stack tag. When multiple simplex stacking links are configured, Egress Mirroring is not supported across the stack. If MD bit is set, then the M bit must be set. Limitations on updating the counters occur if the packet is sent to the MTP port, then the counters may not get updated if the packet did not go out on the destination port. If the packet was destined to the Stack link port and got dropped because of flow control, then the counters may also not get updated.

Figure 35:
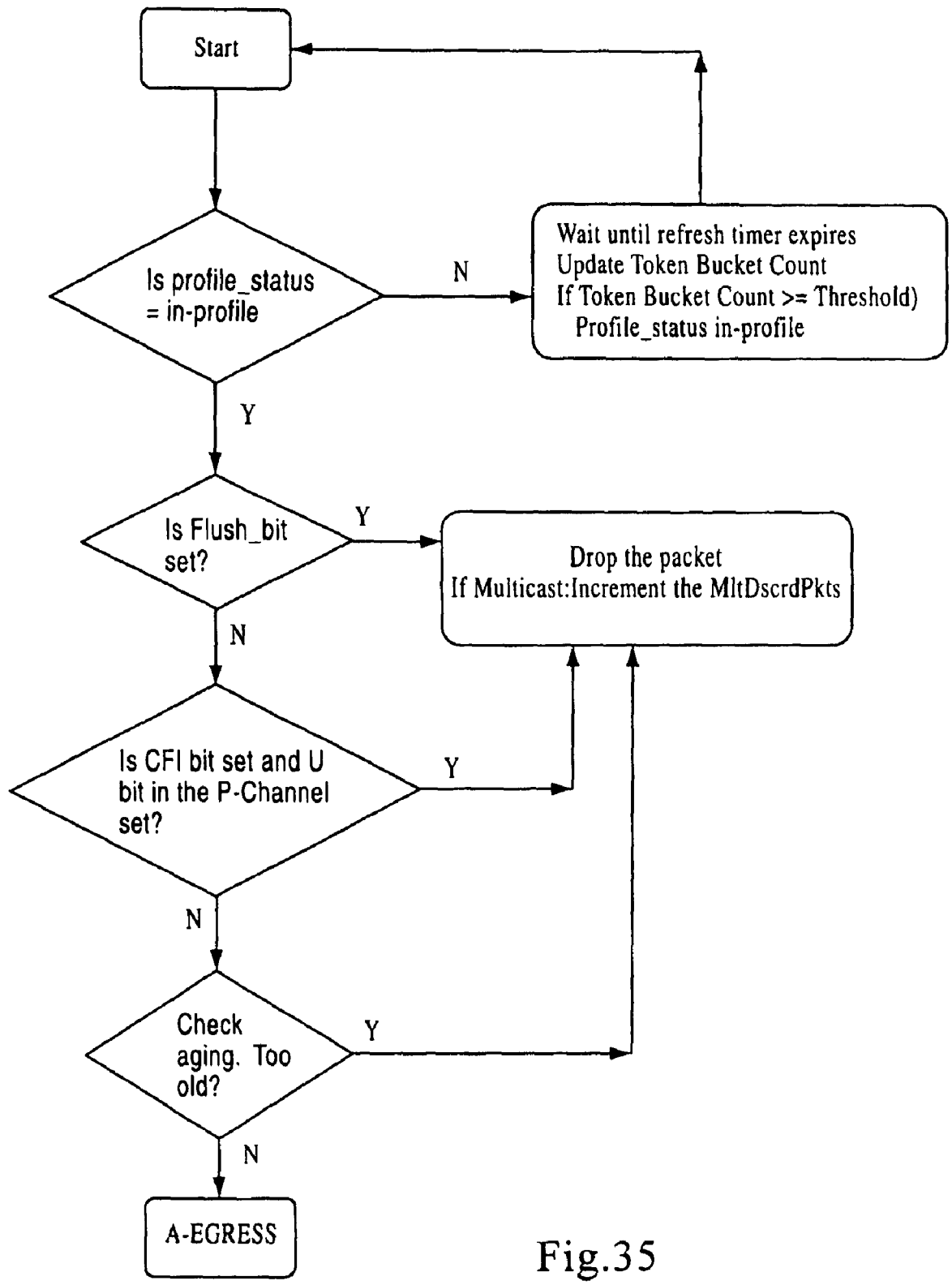
FIG. 35 is a data flow diagram for egress flow of packets.
Figure 36:
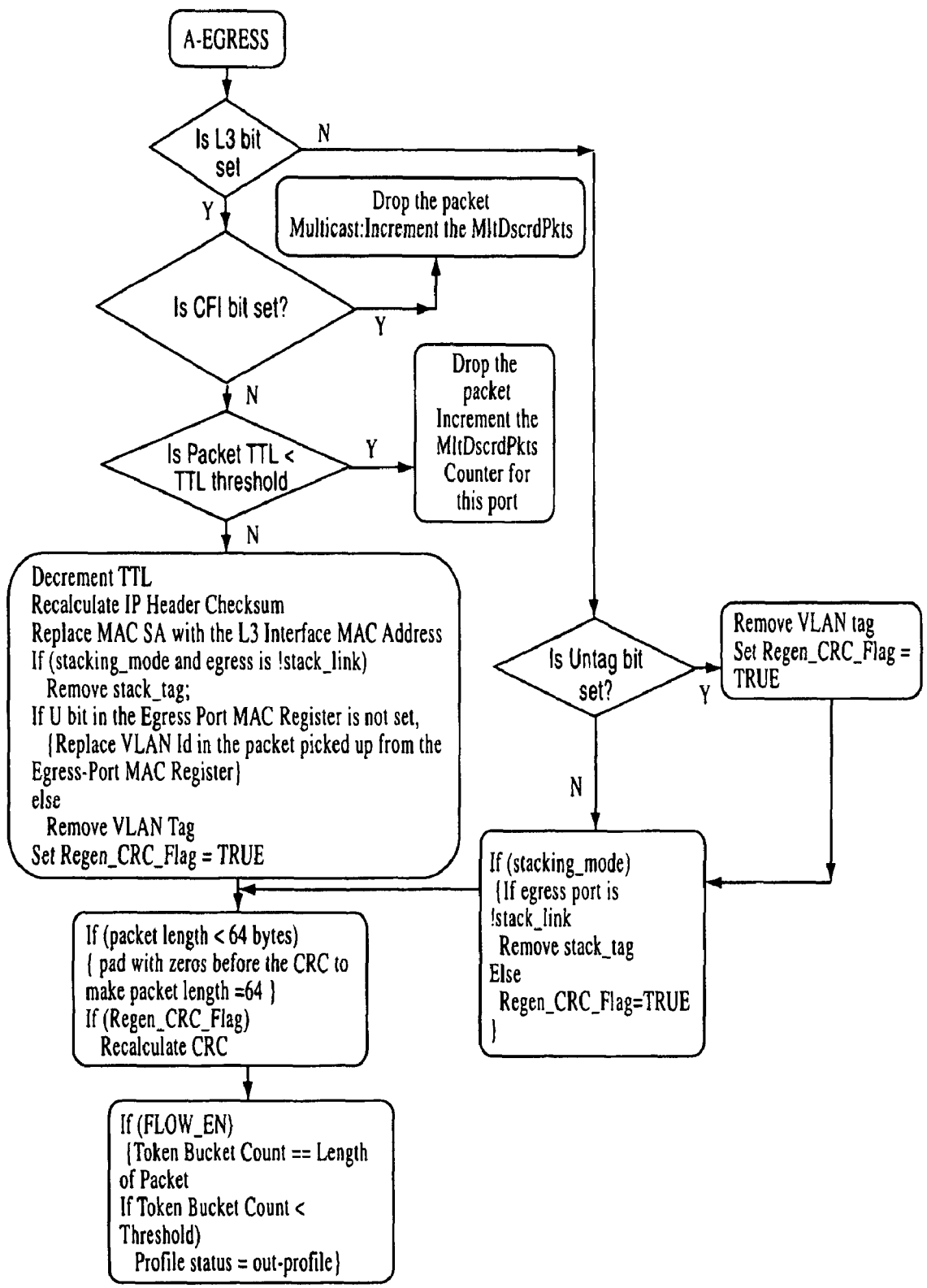
FIG. 36 is a sub-flowchart for egress flow.
Figure 37:
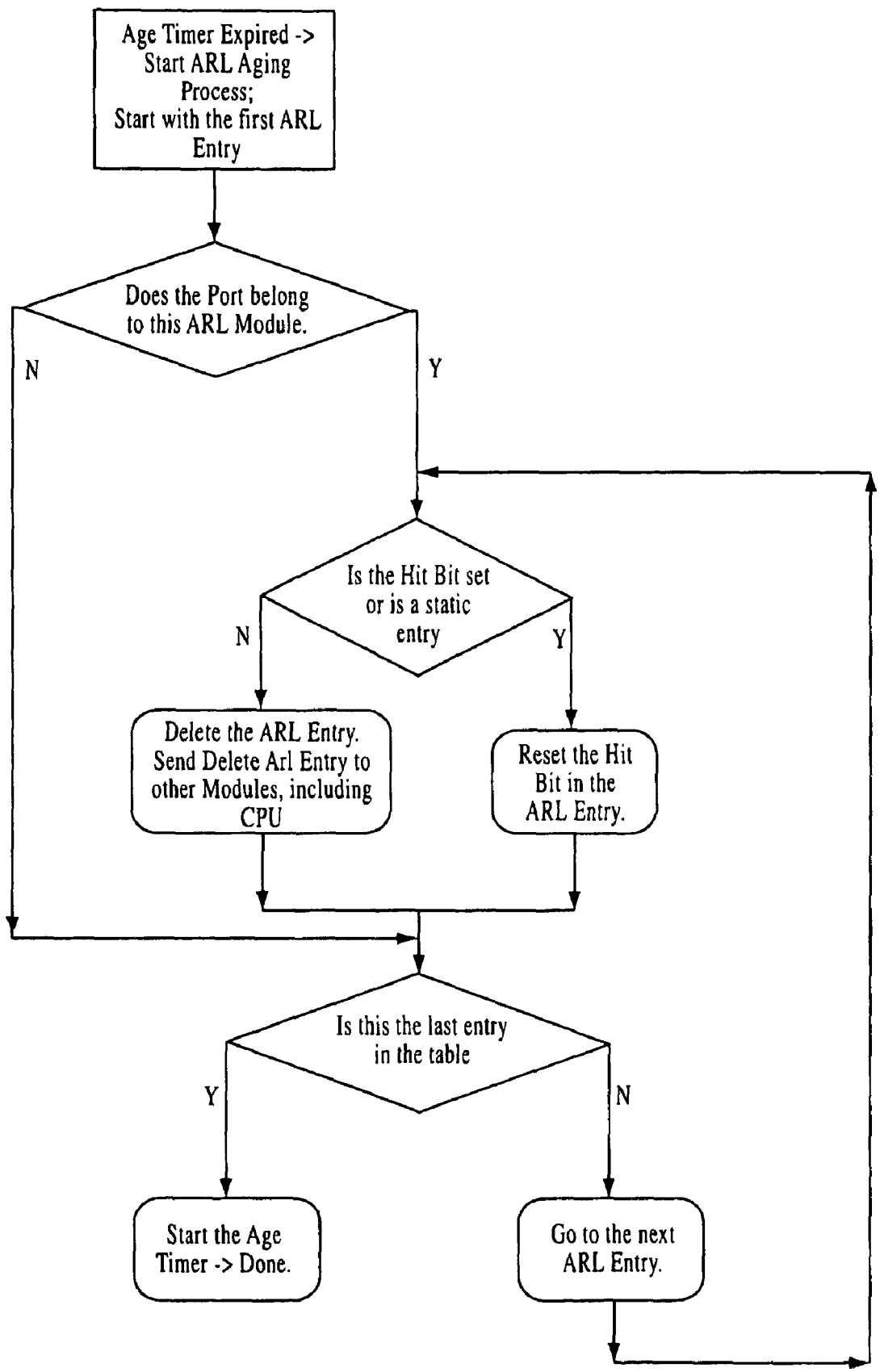
FIG. 37 is a data flow diagram for the ARL aging process.

The Egress flow chart is illustrated in FIG. 35. It is noted that there are many counters in the egress, including aged packet timer, L3 transmitted packets, L3 aborted packets, transmitted VLAN tagged packets, packets purged due to TTL, aborted packets, and multicast packets dropped. The A-EGRESS flowchart is provided in FIG. A34 and the ARL aging process is illustrated in FIG. 37. MltDscrdPkts Counter also gets incremented for packets dropped due to packet aging, and other reasons.

When a packet arrives with source MAC address=0, the address is not learnt in the ARL Table. No lookup is performed for Source address. However, a DA lookup is performed and if found the packet is forwarded to egress port(s). If the Destination Mac address=0, the packet is flooded to all members of the VLAN since it will be an unknown unicast address.

When a packet arrives with a CRC error, ideally the source address should not be learnt and the packet should be dropped. This would, however, require significant changes to the design to accommodate this. A packet with CRC error is handled as follows for address learning. For Packets less than or equal to 60 bytes with CRC errors, the source address is not learnt and the packet is dropped. For Packets greater than 60 bytes with CRC errors, the source address is learnt and the packet is dropped. It is noted, however, the source address will be aged out eventually. The Ingress port should set Regenerate CRC bit if the ingress is a stack link or the other packet modifications warrant. The egress port should regenerate CRC of the packet if the Regenerate CRC bit is set or the packet is untagged on the Egress or the Egress is a Stack Link or padding required Layer 3 Switching Layer 3 switches are like superfast routers that do Layer 3 forwarding in hardware. Most of the conventional switches are layer two devices, which operate at layer 2. With Layer 3 switching functionality implemented in switches, the switches themselves acts like a router, when the traffic has to cross the VLAN Boundaries.

The advantages of Layer 3 switching include providing routing capability in the same switch box, thus eliminating the need for a separate router and allowing for routing to occur at line speed.

Embodiments of the present invention support Layer 3 switching only for IP Protocol under certain conditions. Unlike Layer 2 switching where the CPU is offloaded completely of Layer 2 switching functions, in case of Layer 3 Switching, a CPU still plays an important role. Even though the chip offloads to the CPU in Layer 3 switching for IP Protocols, the CPU is still involved running RIP, RIP2, OSPF, NLSP or any other Routing Protocol to generate the Routing Tables, running ARP Protocol to resolve the IP Address and to generate and maintain an ARP Table, and setting up the L3 table and Default Router Table which will be used by the chip for Layer 3 IP Switching.

The present invention provides the following supports for L3 IP Switching. A L3 Table is provided to do the Destination IP Address search. The table has following fields a) IP Address, b) Next Hop Mac Address, c) the Egress port number and L3 interface Number and Module Id. The invention also provides a Default Router Table (DEFIP Table) and a L3 Interface Table, the latter to get the Router Mac Address and VLAN Id. A L3 Aging Timer is provided, as well as ARL Logic which identifies the L3 Interface Address and starts the L3 Table search. The search key used is Destination IP Address. If the search is successful it decrements the TTL, recalculates IP checksum, changes the Destination and Source Mac Address, add or remove Tagging Fields depending on the egress port and VLAN Id and recalculates the Ethernet Checksum.

The table required for L3 search is called L3 Table. The search key for this table is {Destination IP Address}. This table is 2K entries deep and is mainly used to get the next Hop Mac Address for the packet destined for a Station, which has to cross the VLAN Boundaries through the Router Interface.

If a match is not found in the L3 table for the Destination IP Address, then packet is forwarded to the default IP Router. Default IP Router Table contains Default Router Entries for each IP subnet. This table is 2K entries deep and is similar to that of L3 table except that it also has netmask Information. In addition, a L3 Interface Table Format (L3INTF Table) is also provided and is mainly used to get the Router Mac Address and VLAN Id from the L3 Interface Number. This table is 1K entries deep and is indexed by L3 Interface number. Although it is 1K deep, the number of virtual interfaces is 256.

L3 Switching is enabled by configuring specific L3 interfaces. L3 interfaces are configured with the following information: 1) L3 interface identifier (index), 2) IP Address, 3) Subnet Mask (if appropriate), 4) Broadcast Address, 5) MAC Address and 6) VLAN ID.

L3 interfaces (using their unique MAC addresses) can be addressed by end systems to send packets off the local subnet. Multiple L3 interfaces can be configured per VLAN, but there can be only one L3 interface per IP subnet. L3 interfaces are not inherently associated with a physical port, but with VLANs. If a VLAN is defined to be limited to a single physical port, then effectively the classical router model of L3 interfaces per physical port can be imitated. Up to 256 L3 interfaces can be configured per chip.

The L3 Switching, the way it is provided by the present invention, optimizes the implementation for delivery of packets between subnets in VLANs physically connected to the switch, and (optionally) forwarding of all other packets to a pre-designated or CPU-controlled default router. If the forwarding option is not chosen, all forwarding of packets to remote subnets is performed by software running on the associated CPU.

When packets arrive destined to a MAC address which is associated with an L3 interface for the VLAN, the chip looks to see if the packet is destined (at the IP level) for a subnet which is associated with another locally resident L3 interface. If there is no match at the IP destination subnet level, the packet is forwarded by default to the CPU for routing. However, an optional capability can be configured where-in such packets are L3 switched to a default IP router address, for which a MAC address has been configured in the Default Router Table. This default router address can be global, or up to 16 defaults can be configured by destination subnet, with one of the defaults encompassing the "all others" case. These default routes can be modified by the CPU, but from the perspective of the Switch Fabric they are static. If there is a match at the IP destination subnet level, then the Destination IP Address is searched in the L3 Table using IP Address as the key. If the IP address is not found then the packet is given to the CPU for routing. If the IP Address match is found then the Mac Address of the next hop and the egress port number and module id is picked up from this table.

In all cases, in performance of L3 IP switching, the following functions are performed. The IP checksum is validated and the substitution of the destination and source MAC address occurs. The TTL counter is decremented and the L3 and L2 CRC are recalculated. These functions are only performed for IP packets with no options fields.

The steps involved in Layer 3 IP switching are:
1. Search ARL Table with Destination Mac address and check if the Mac Address is associated with an L3 interface.
2. Check if the packet is an IP packet (check for Ethernet V2 type, 802.3, tagged Ethernet V2 and Tagged 802.3 types of Packets). If the packet is not an IP packet then send the packet to the CPU for routing.
3. Check for the presence of Option Field in the packet. If Option fields are present then send the packet to CPU for routing.
4. Check for the Class D, also called Multicast Group IP Address. (The Class D addresses are identified with the four high order bits of the address set to "1110". The class D address range is from 224.0.0.0 to 239.255.255.255). If the destination IP Address in the packet is a Multicast Group Address then send the Packet to the CPU for further processing.
5. Validate the IP Checksum.
6. Search the L3 Table with Destination IP address as the key. If the entry is found then it will have the next Hop Mac Address, the egress port and module id on which this packet has to be forwarded. If the Entry is not found then send the packet to CPU if no Default Router is configured (i.e. Default Router is Empty). If Default Router is not empty then find a match in Default Router Table. This is done by ANDING the Destination IP Address with the Netmask in the Entry and checking if there is a match with the IP Address in the Entry. If there are multiple matches then one with highest Subnet Bitmap is selected. If the CPU Bit is set in that entry then a copy is sent to the CPU (This is done so that the CPU can learn the new Route) and the Packet is modified before forwarding on to the destination port, as described below.
7. Decrement TTL, if it reaches zero then give it to CPU.
8. Recalculate IP Checksum, change Destination MAC Address with Next Hop Mac Address and Source Mac Address with Router Mac Address on the L3 Interface.
9. Check whether the packet should go out on the egress port as tagged or untagged and add or remove the Tagging Fields depending on this information.
10. Recalculate the L2 CRC.
11. Finally increment the Mib-2 interface counters.

IP Multicast

Multicast Applications such as Multimedia Conferencing, Real video and Real Audio, Push Technology, etc are very popular. These applications depend heavily on the Point to Multipoint delivery of Service. Support for multicast routing protocols along with very efficient way of delivering the Multicast packets is becoming vital important for the success of these next generation applications.

Some of the IP protocols accepted/deployed by the Internet community includes Distance Vector Multicast Routing Protocol (DVMRP), Protocol Independent Multicast—Dense Mode, Protocol Independent Multicast—Sparse Mode, and Multicast Extensions to OSPF, etc.

The present invention supports IP Multicast through the following components: 1) an IP Multicast Table, 2) Ingress Logic to handle IP Multicast Packet, and 3) Egress Logic to handle IP Multicast Packet.

IP Multicast Table is like the Layer 2 Multicast Table, where all the Port Bitmaps are stored. This table is 256 entries deep. The search key for the table is {Source IP Address, Multicast IP Address}.

When an IP Multicast packet arrives at an ingress port, the address resolution logic is done using the IP Multicast Table. The following steps need to be taken for handling the IP Multicast Packet. Determine if the packet is an IP v4 Packet without any Option Fields; otherwise send the packet to CPU. Validate the IP Checksum. If there is a bad checksum then drop the packet. If the Destination IP Address is a not a Class D Address then send the packet to CPU. Search the IP Multicast Table with Key={Source IP Address, Destination IP Multicast Address}. If the entry is not found then send the packet to CPU. If the entry is found then check the TTL value. If it is less than the TTL Threshold value in the IP Multicast Entry then drop the packet. If the Source port and the VLAN Id is not the same as the Source port and the VLAN ID in the Entry then drop the packet. This is only checked when the SPCheck bit is set.

From the entry, the Bitmap is obtained from the bitwise OR operation of L2 Port Bitmap and L3 Port Bitmap. Finally send the packet over the CP Channel along with Port Bitmap and L2 Untagged Bitmap. If the L3_DIS bit is set in the PVLAN Table, then the Port Bitmap=L2 Port Bitmap only else Port Bitmap=L2 Port Bitmap ||L3 Port Bitmap. From the entry, the Module Id bitmap is picked up and set in the P Channel so that the IPIC can use the module id bitmap in constructing the Module Header. If the packet is to be L3 switched, the L3 bit is set in the P Channel indicating that the packet is IP Multicast Packet and that Egress needs to modify the IP header.

An Egress port gets the IP packet as a result of Layer2 switching or as a result of Layer 3 switching. If the Egress port is a part of L3 Port Bitmap then it has to modify the packet. The steps involved are, first, checking if the TTL of the packet is greater than the Egress TTL threshold. If it is less then do not perform L3 switching of the packet. Then, decrementing the TTL value and recalculate the IP Header checksum. The Source Mac address is changed with that of L3 Interface Mac Address. If the L3 Interface associated with the port is Tagged then change the VLAN Tag Header with the VLAN ID configured for this L3 Interface. If the header is modified, then the CRC calculation is done.

To handle some of the proprietary protocols where the Source information in not kept in the Multicast Table, a Configuration Register Bit (SRCIP_CFG) is provided to enable lookup based only on Multicast IP Address. The Source IP Address set to zero when programming the Multicast Table and the Ingress should set the key to {(Source IP Address=0), Multicast IP Address, VLAN Id} to do the search.

The above algorithm works only if port supports only one L3 Interface. If there are two or more L3 interfaces associated with a port then multiple packets need to be sent out on that port, which becomes a very complex problem. To handle this condition one has to include CPU bit in the Port Bitmap of the packet so that the packet is given to the CPU along with the Port Bitmap on which the packet has already sent out. So it is the responsibility of the CPU to send multiple copies on the port with Multiple L3 Interfaces.

IP Multicast across modules is handled in the following way. When an IP Multicast packet arrives within a module, the packet is L2 and L3 switched within the local module. The L2 and L3 Port Bitmaps are picked up from the IPMC Table. The packet should be L2 switched on the IPIC port. Therefore, the bit corresponding to IPIC bit should be set in the L2 Port Bitmap in the IPMC table. Setting the bit corresponding to IPIC port in the L3 Port Bitmap is a configuration error.

Fast Filter Processing

The present invention supports a very extensive Filtering mechanism that enables switch application to set filters on some of the important fields from Layer 2 to Layer 7 of the packet. The filters are used mainly for packet classification based on certain protocol fields in the packets. Based on packet classification various actions can be taken. Two classes of actions are defined: In-Profile Actions and Out-Profile Actions. When a packet is in in-profile, the actions associated with the in-profile are taken. When the packet is out of profile, the actions associated with out-profile actions are taken. The logic of the In-Profile Actions are provided in FIG. 22 and the Out-Profile Action illustrated in FIG. 27. Some of the actions may involve discarding the packets, sending the packet to the CPU, sending the packet to Mirrored-to Port, sending the packet on certain COS priority queue, changing the Type Of Service (TOS Precedence), remarking DSCP etc.

A preferred embodiment of the present invention has 12 FFP blocks, one for each port. Within each block, eight 4 byte fields are defined each with their own configurable offset such that the total width of the mask is a 32 byte field. However, the offsets can be defined in a way such that the filter mask can effectively look into the packet header up to 80 bytes.

The following table gives the various fields of interest and their offset from byte zero of the packet.

TABLE 1

| Field | Header | Size | Offset For Ethernet II Untagged | Offset For Ethernet II Tagged | Offset For SNAP Untagged | Offset For SNAP Tagged |
| --- | --- | --- | --- | --- | --- | --- |
| Destination Mac Address | Mac | 6 Bytes | 0 | 0 | 0 | 0 |
| Source Mac Address | Mac | 6 Bytes | 6 | 6 | 6 | 6 |
| Protocol Type | Mac | 2 Bytes | 12 | 16 | 20 | 24 |
| Destination SAP | 802.3 | 1 Byte | NA | NA | 14 | 18 |
| Source SAP | 802.3 | 1 Byte | NA | NA | 15 | 19 |
| 802.1p Priority | Mac | 3 bits | NA | 14 | NA | 14 |
| VLAN Id | Mac | 12 bits | NA | 14 + 4b | NA | 14 + 4b |
| TOS Precedence | IP | 3 bits | 15 | 19 | 23 | 27 |
| Differentiated Services | IP | 6 bits | 15 | 19 | 23 | 27 |
| Source IP Address | IP | 4 Bytes | 26 | 30 | 34 | 38 |
| Destination IP Address | IP | 4 Bytes | 30 | 34 | 38 | 42 |
| Protocol | IP | 1 Byte | 23 | 27 | 31 | 35 |
| Source Port | TCP/UDP | 2 Bytes | 34 | 38 | 42 | 46 |
| Destination Port | TCP/UDP | 2 Bytes | 36 | 40 | 44 | 48 |
| TCP Control Flags | TCP | 1 Byte | 47 | 51 | 55 | 59 |

It is noted that the TCP Control Flags are used for aligning on Byte boundary 2 bits of reserved bits preceding this field is included.

The 32 byte packet key is split into eight 4-byte subfields. Each sub-field will have a 4 bit mask indicating a multiple of 4 bytes to offset each subfield. For example, if the first 32 bytes of the packet are of interest, then the offset field of 000 is used for all the eight 4-byte sub-field. By choosing different offset field for each of the 4-byte sub-field, up to 80 bytes of the packet header can be parsed for classification and filtering.

The Filter Database contains 16 filters and associated 128 entries deep IRULES Table for each FFP block. The IMASK and IRULES Table are described in greater detail below. The IMASK has a Field Mask that consists of several Protocol Masks. For the fields, which are of interest, the Mask is set to all 1's and for other fields the mask is set to zero. The IMASK also includes an Egress Port Mask, where the mask is set to all 1's only if the Egress port is part of the Filter. The IMASK also has a No Match Action field that is valid only if at least one No Match Action Bit is set to 1. No Match Action is applied only if the filter has a partial match of the Entries in the IRULES Table and there is no Full match. To disable a IMASK, the mask bits are all set to zero. To disable the No Match Actions field, all the action bits in the No Match Action are set to zero.

The incoming packet first goes through the Address Resolution Logic. Once it goes through the ARL logic, the Filtering logic constructs a "Field Value" by concatenating the eight 4-byte subfields (with the correct offsets) including Ingress port and Egress port and Egress Module Id. If the egress port/module is not determined then it is set to an invalid value. For unknown unicast it is 0x3f, unknown multicast it is 0x3d, for known multicast it is 0x3e, and for broadcast it is 0x3c. The Filter logic then goes through all the IMASKs and applies the mask portion of the filter to the Field—(Field Value & Filter Mask). The result of this operation is concatenated with a Filter Number to generate the search key. This search key is used to search for the match in the IRULES Table. If all the No Match Action Bits are set to 0 then it is called an Inclusive Filter. For an Inclusive Filter there should be exact match to execute actions defined in the IRULES Table entry. If there is no match then no action is taken. In the No Match Action, if it at least one of the action bit is non-zero then it is called an exclusive filter. The Exclusive filter is applicable only when the meter-id is zero.

A Full Match occurs when the Filter Select+Egress Module Id+Ingress port+Egress port+Packet Format+Filter Value matches an entry in the IRULES Table. A Partial Match occurs when the Filter Select+Egress Module Id+Ingress port+Egress port matches an entry in the IRULES Table.

A status bit is used to indicate whether a packet is in-profile or out-profile. When a packet arrives, the IRULE table is searched with the constructed key as defined above. If there is a Full match, and the associated meter-id is zero, the packet is said to be in-profile. If the meter-id is not zero, then the associated status bit is checked to determine if the packet is in-profile or out-profile.

If the packet is in-profile, then the packet is sent out as in-profile and actions associated with in-profile are taken. At the end of the packet, the packet length is subtracted from the BucketCount. If the BucketCount is less than or equal to the threshold (2048 tokens), then the associated status bit is changed to be out-profile otherwise there is no change in the status bit. If the packet is out-profile, the BucketCount is left unchanged. The threshold value is hard coded to 2048 tokens for all port speeds.

When the refresh timer expires, new tokens are added to the token bucket and if the BucketCount>=the threshold, the status bit is set to in-profile, OW it is out-profile. The status bit can change at two points in time: 1) When the packet is done (from in-profile to out-profile and 2) when the refresh tokens are added (from out-profile to in-profile).

The following rules are used to execute actions from the IRULES Table Entry and "No Match Actions" from the Filter Mask. When there is a Full Match, then the actions from the matched IRULES Table entry are applied depending on whether it is in-profile or out-profile. If there is no Full Match and no partial Match then no action is taken. If there is no Full Match, but, there is Partial Match then the actions from "No Match Actions" field are applied. This No Match Action is derived from the filter mask field. If there is a Partial match with a filter, actions associated with the Filter mask are taken; if there is a Full match with a higher filter value, then the actions associated with the Rule entry are taken. If a particular action bit is set by No Match Action field and the Full match on another filter mask does not set the same action bit, then the action is taken, since the Partial Match and Full Match are on different filters.

FFP Counters are updated only when there is a Full Match in the IRULES Table. If all the 16 filters (or any number) have a full match in the IRULES Table and the action is to increment the same counter, then the counter is incremented only once. No counter update support is provided for partial match.

There is a separate 16-bit FFP Drop Counter that is updated if the packet is dropped due to FFP. This counter is updated when the FFP action associated with a IMASK is Drop. For each IMASK if there is a Full Match and the associated action is to drop the packet, the FFP Drop Counter is updated once. However, if there is a FFP Drop action associated with a lower IMASK followed by a FFP No-Drop Action associated with a higher IMASK, the FFP Drop Counter is not updated. The FFP Drop Counter is also updated when there is a Partial Match. If there are multiple Partial matches associated with several IMASKs and the associated action is to drop the packet, then the FFP Drop Counter is updated once. However, a higher IMASK with associated action of No-Drop will not cause the FFP to drop the packet; therefore the FFP Drop Counter is not updated.

Additionally, priority among Actions when there is conflict must be determined. The following actions can be in conflict: a) Change 802.1p priority, b) Change TOS to 802.1 p, c) Re-map to new COS, d) DSCP, e) Selection of the output port, f) Selection of output port and output module ID, g) FFP Drop, and h) FFP No-Drop.

The following rules are applied to conflicts:

Rule 1.—When there is a conflict of actions across the filters, then the action associated with the highest filter is carried out.

Rule 2.—When there is conflict of actions within the same filter, the following priorities hold. Six cases are possible.

CASE A: Conflict in 802.1p priority, then change 802.1p priority-Action 0 (Medium) and change TOS to 802.1p—Action 8 (Low)

CASE B: Conflict in COS Queue, then change Priority 802.1 p—Action 0 (Medium), re-map to new COS —Action 1 (Low), and change TOS to 802.1p —Action 8 (Low Low)

CASE C: Conflict in TOS/DiffServ Field, then change TOS_P field—Action 2 (Medium), change COS to TOS_P—Action 9 (Low); and DiffServ—Action 10 (High)

CASE D: Action bits 5 and 11, select Output port—Action 5 (Low) and select Output port, Output Module Id—Action 11 (High).

CASE E: Action bits within the same IMASK, then select FFP Drop (Low) and select FFP No-Drop (High)

CASE F: Action bits within the same IMASK, select Port Steer (Action bits 5 or 11) and discard packet. In this case the packet is dropped and is not steered. If a higher filter mask indicates No-Drop and a lower filter mask action indicates Drop, then the packet is not dropped.

The outcome for certain FFP actions on the Stacking port has a slightly different behavior from a system point of view. To understand this, we need to understand how and when the stack link port is included in the Port Bitmap. When a packet arrives on the Stack link, the stack count is decremented. If the stack count is not zero, a loopback flag is set to indicate that the packet has to go out on the stacking link. If the destination port from the ARL lookup is also stack link port, the port bitmap going into the FFP logic will be zero, since the source port is removed from the port bitmap. Going into the FFP logic (if the packet came in on stack link and has to go out on stack link), the port bitmap is 0. After the FFP logic, if the loopback flag is set, the stack link port is included in the port bitmap.

If a packet arrives on a stacking link port and the egress port from the ARL lookup is also the stacking link port, then the Port Bitmap going into the FFP logic is zero. Although, this is a normal unicast packet, the Destport will be 0x3f in the FFP logic. In this case, the packet cannot be filtered based on egress port alone. However, it can be filtered based on ingress port.

Assuming that the packet can be filtered on the Stacking link port, actions such as discard and port steer have the following behavior. If the FFP action is to drop the packet, the packet will not be "really dropped". The packet will egress on the Stacking link port, since the stacking logic will include the Stack link port in the Port Bitmap after the completion of the FFP logic. If the FFP action is to steer the packet to another port (a non stack link port), the packet will go out on the steered port as well as the stacking link port.

The IRULES Table is 128 deep in each FFP module. The entries in the IRULES Tables are stored with {Filter Select, Egress Module Id, Ingress port, Egress port, Packet Format, Filter Value} as the key. The Ingress port or egress port is set only if there is intention to do the filtering on a per port basis and in that case the Ingress and/or Egress port Mask should be set to 0x3F.

The 128 IRULES are shared among the 16 IMASKS in the following way. For every 8 masks—63 IRULES are allocated for sharing. Within this 63 IRULES, they can be shared anyway between the 8 IMASKS. For instance, if all 128 IRULES are to be applied for the same IMASK fields, a total of 2 identical IMASKs need to be programmed.

The IRULES Table includes a Filter Value field. For every incoming packet, the Filter Mask is applied and the result is compared with the Filter value. Since the incoming packet itself is in Big Endian Format the Filter value have to be set up in Big Endian Format. It is noted that all the Registers and Tables are defined in Little Endian Format, the Filter table and the Filter Mask being the only Exception. The IRULES Table also includes Profile-independent Action Bits define the actions to be taken in case of when the packet is profile independent. In-Profile Action Bits and Out-Profile Action Bits define the actions to be taken in case of when the packet is in-profile or out-profile, respectively.

A Metering table is also provided and is 64 entries deep. This table is used to determine if the packet is in-profile or out-profile. The index to this table is the Meter Id. The meter id is obtained when there is a Full Match in the IRULES Table for a given filter mask. The counters are implemented as Token bucket.

For all port speeds, a token equals 1 byte. The maximum BucketSize for the port is configurable to be one of the following on a per meter id basis: 4 k, 8 k, 16 k, 32 k, 64K, 128K, 256K or 512 k tokens. The refresh interval is fixed at 8 microseconds for port speeds of 10/100/1000. When the port is operating in TurboGig mode, the refresh interval is 2 microseconds. When the token bucket is first started, the Token_bucket_count is set to maximum value for the chosen BucketSize. Every 8 (or 2) microseconds, the Refresh_Count number of tokens are added to the Token_Bucket_count. If Token_Bucket_count increases above the BucketSize, then set the Token_Bucket_count equal to BucketSize.

When a packet arrives, a copy is made of the state of the status bit into a holding register associated with that meter-id. The status bit will indicate if the packet is in-profile or out-profile. At the end of the packet, the packet length is subtracted from the Token_Bucket_Count if the packet was in-profile. If the Token_Bucket_Count is less than the in-profile threshold (2048 tokens), then the status bit is changed to out-profile otherwise there is no change in the status bit. If the packet is out-profile to begin with, the Token_Bucket_Count is left unchanged.

The threshold will be just one value for all the meter-ids, which will be hardcoded. When the refresh timer expires and more tokens are added into the bucket, and if the BucketCount>=in-profile the threshold, the status bit is set to in-profile, OW it is out profile. The status bit can change at two points in time. 1) When the packet is done (from in-profile to out-profile and 2) when the refresh tokens are added (from out-profile to in-profile)

When there is a Full Match in the IRULES Table and the packet is out-profile, then the Out_Counter is incremented for the meter id. However, if there are multiple Full Match across different filter mask and they are all out-profile, then Out_Counter is incremented only once if the meter ids are the same in each matched entry. If the meter id is different in each matched entry, then the Out_Counter is incremented for each out-profile instance.

When a Gigabit port is operating at 2.5 Gbps, the following are the requirements for masks and filters. 1) 4 IMASKs per FFP block, 2) a total of 128 IRULES, with 2 IMASKs sharing 63 IRULES, and 3) 16 Meter-ids will be supported. If more than 16 meter-ids are programmed then the packet will always go out as in-profile.

Memory Management Unit

The present invention supports a maximum frame length support of 9 Kbytes. This has implications on the MMU design. When a packet arrives, a budget of 24 cells is allocated at the beginning of the packet arrival to guarantee space in the memory. To support 9 Kbytes of packet length requires a budget allocation of 144 cells. Jumbo support is configured on a per port basis which is specified in the PTABLE.

An Assured Forwarding Support feature provides a preferential dropping of packets in the FFP when the CNG bit in the P-Channel is set. The CNG bit in the P-Channel is set when the FFP action—Set High Drop Precedence is taken. When a packet arrives in the MMU with the CNG bit set, the number of packet pointers for the COS queue associated with the packet is checked against a CNGTHRESHOLD register. If the number of entries in the COS queue for the port exceeds the value in the CNGTHRESHOLD register, the packet is dropped. Otherwise, the packet is accepted into the COS queue in the MMU. When the packet is dropped a CNG-DROPCOUNT register is updated. If the CNG bit is not set in the P-Channel, all packets are accepted into the COS queue until the COS queue threshold is reached.

Interconnect Port Interface Controller

Figure 38:
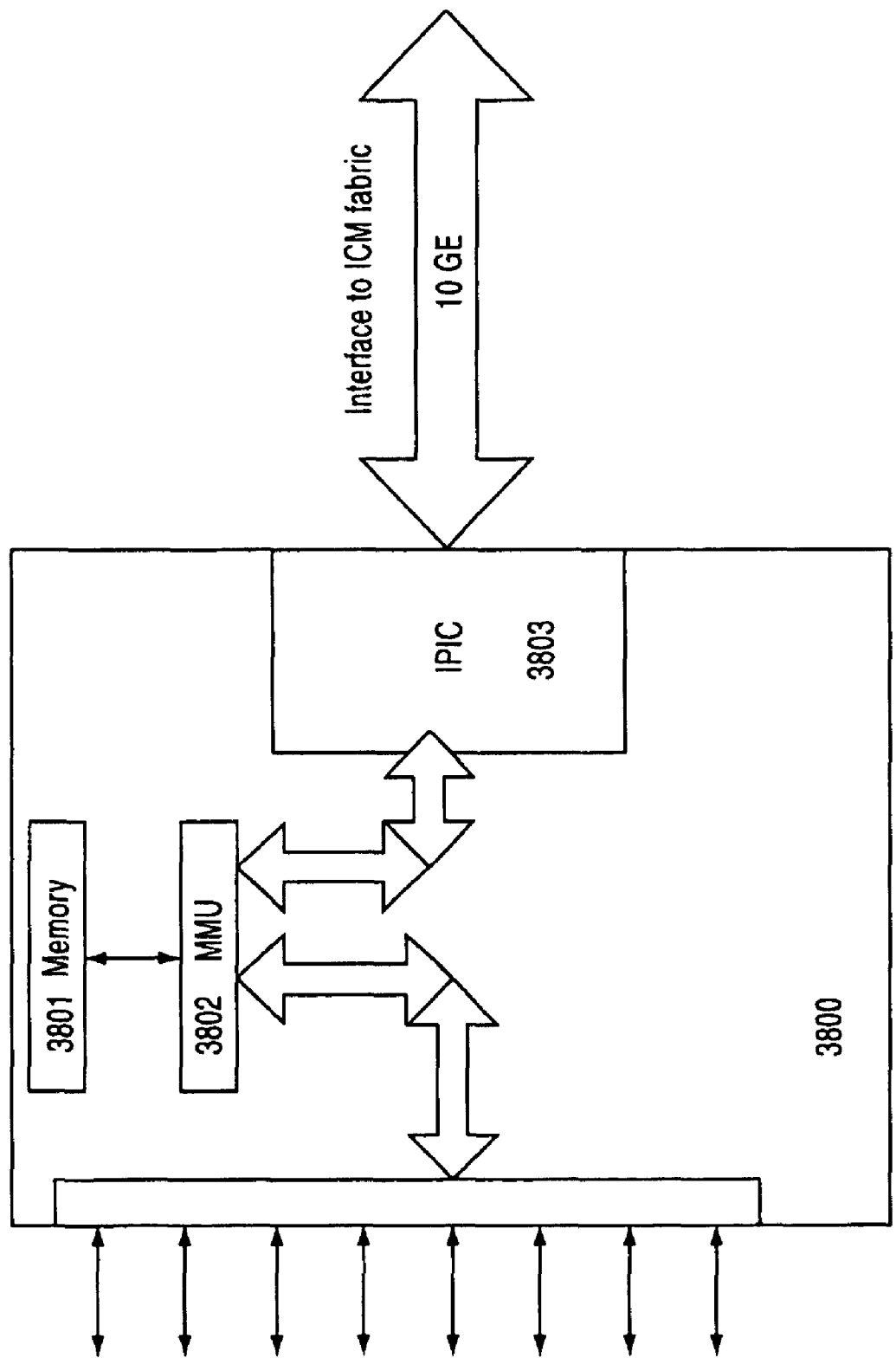
FIG. 38 illustrates the interconnect Port Interface Controller (IPIC) Module used to interface the switch to other switching devices through a cross-bar fabric or through a ring.

The Interconnect Port Interface Controller (IPIC) Module 3803 is used to interface the device of the present invention to other like devices through a cross-bar fabric or through a Ring. FIG. 38 below shows a switch of the present invention having components interfacing to a Interconnect Module (ICM). The IPIC module 3803 interfaces to the CPS Channel on one side and the 10-Gigabit Ethernet on the other side. The 10GE Interface is a high-speed data connection with a bandwidth up to 10 Gbps full duplex.

Figure 39:
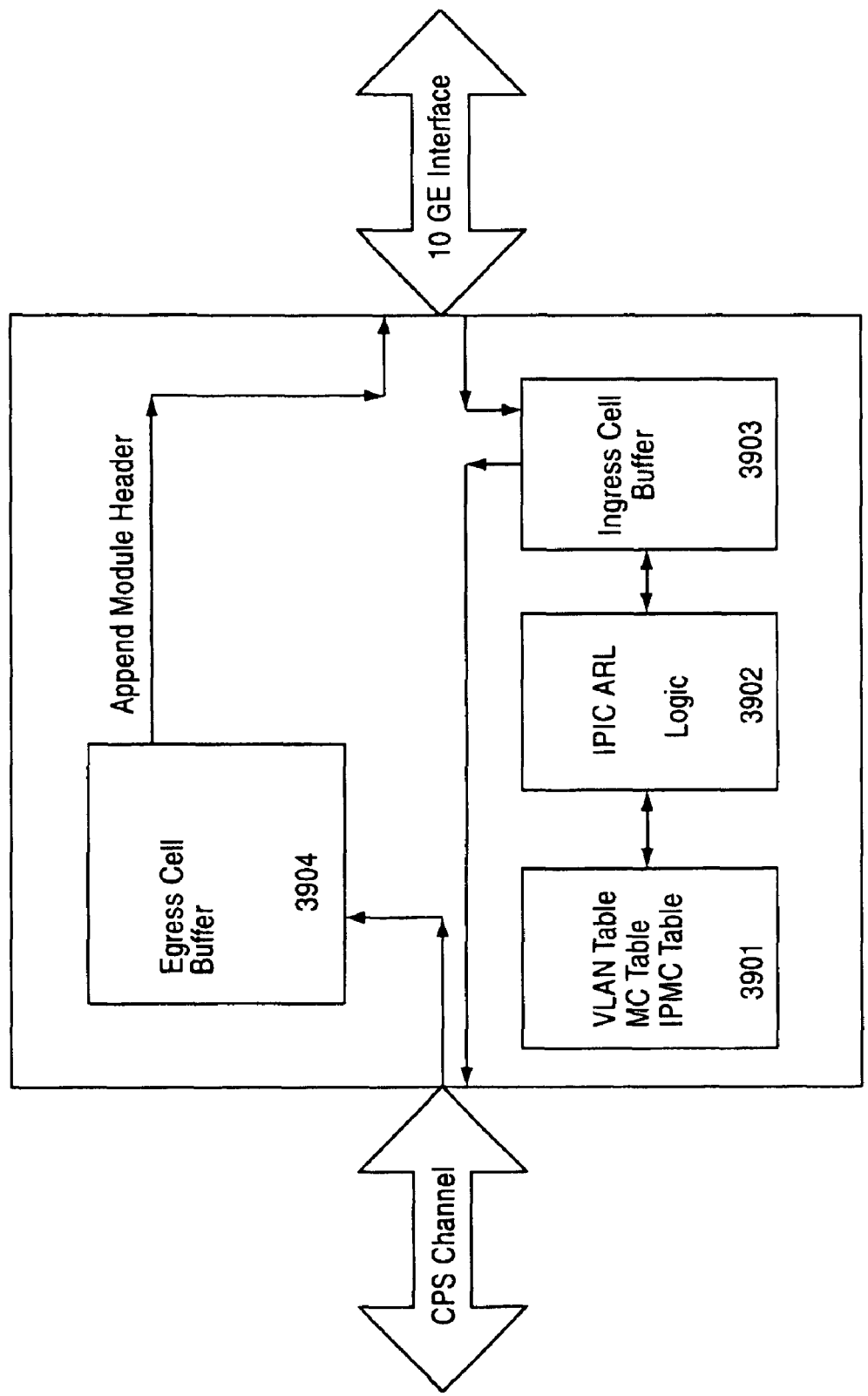
FIG. 39 illustrates the high level functions of the IPIC.

The high level functions of the IPIC are described below and illustrated in FIG. 39. First, the IPIC receives cells from the MMU 3802 and sends the Frame out on the 10GE Interface. The egress function in the IPIC requests cells from the MMU 3802 to transmit. If there are cells queued for the IPIC in the MMU, the MMU will send the cells to the IPIC. IPIC will also append the appropriate Module header. The IPIC gets the information to be appended in the Module Header from the P-Channel fields. This information includes Module Opcodes, Module Id Bitmap, Egress port, COS, Source Trunk Group Id or Source port of the packet etc. The IPIC also strips the VLAN tag from the current position in the packet (after the SA) and will insert 2 bytes of VID+Priority+CFI in front of the Module Header. The IPIC then sends the Frame along with the constructed Module Header onto the 10GE Interface.

In a second function, the IPIC receives Frames from the 10GE and send the cells on the CP Channels to the MMU after the Address Resolution is done. The Frame is received from the 10GE Interface. IPIC has a shallow buffer to store the frame. IPIC strips the 2 bytes of tag header and the Module Header. Module Header is the header appended to the frame by the Source Module. The Tag header is re-inserted in the packet after the SA along with the VLAN Type of 0x8100 (totally 4 bytes). IPIC goes through IPIC ARL Logic, which is described in the IPIC ARL Logic Flowchart below. The Source MAC Address of the packet is learnt in the IPIC ARL Table. The Source Module, Source Port and the VLAN ID of the packet is picked up from the Module Header which gets populated in the IPIC ARL Table.

If the packet is unicast (as indicated by the Module Opcode), the egress port is contained in the module header. This packet is forwarded to the egress port under the following conditions 1) M=0 and 2) M=1 and SMM=1. If the packet is a broadcast or an unknown unicast (DLF) which is identified by the Module Opcode, the packet is flooded to all members of the associated VLAN. The VLAN bitmap is picked up from the IPIC VTABLE. If the packet is Multicast and IPMC_DISABLE bit is NOT set, the egress port(s) is(are) picked up from the IPIC IPMC Table. If the packet is Multicast and IP_MC_DISABLE bit is set, the egress port(s) is(are) picked up from the IP IC MC Table. From the address resolution the egress port(s) is(are) decided and the Port Bitmap is constructed, the packet is sliced into 64 byte cells and these cells are sent to the MMU over the CP Channel. The Opcode value in the Module header is mapped to the Mod Opcode in the P-Channel. If the egress port is mirrored and the MTP is on another module, then the Port Bitmap will also include the IPIC port to be sent out. This packet will be sent to the Mirrored-to-port only.

The incoming packet from the 10GE is stored in the Shallow Buffer. After getting the first 48 bytes of the Packet+8 bytes of the Module Header, the IPIC ARL Logic sends the ARL Request to do the Address Resolution, only if the Opcode value in the Module Header is set to a non zero value, i.e. the packet is a Unicast, Multicast, Broadcast or a DLF. The ARL Logic for IPIC is quite different from that of any other ingress port. The differences include that the Packet starts after 8 bytes of the Module Header. In addition, the Module header contains the information whether it is a Control Frame or Data Frame. The Control Frame is always sent to the CPU after stripping the Module Header. The Trunk Group Identifier of the port is picked up from the Module Header and for the unicast packet where the Address Resolution is done by the Ingress Module/port, the egress port is picked up from the Egress port field of the Module Header. For Broadcast or DLF packet, the egress Port Bitmap is picked up from the IPIC VTABLE. For Multicast the egress Port Bitmap is picked up from IPIC MC Table. In case of IP Multicast the Port Bitmap is picked up from the IPIC IPMC Table.

Figure 40:
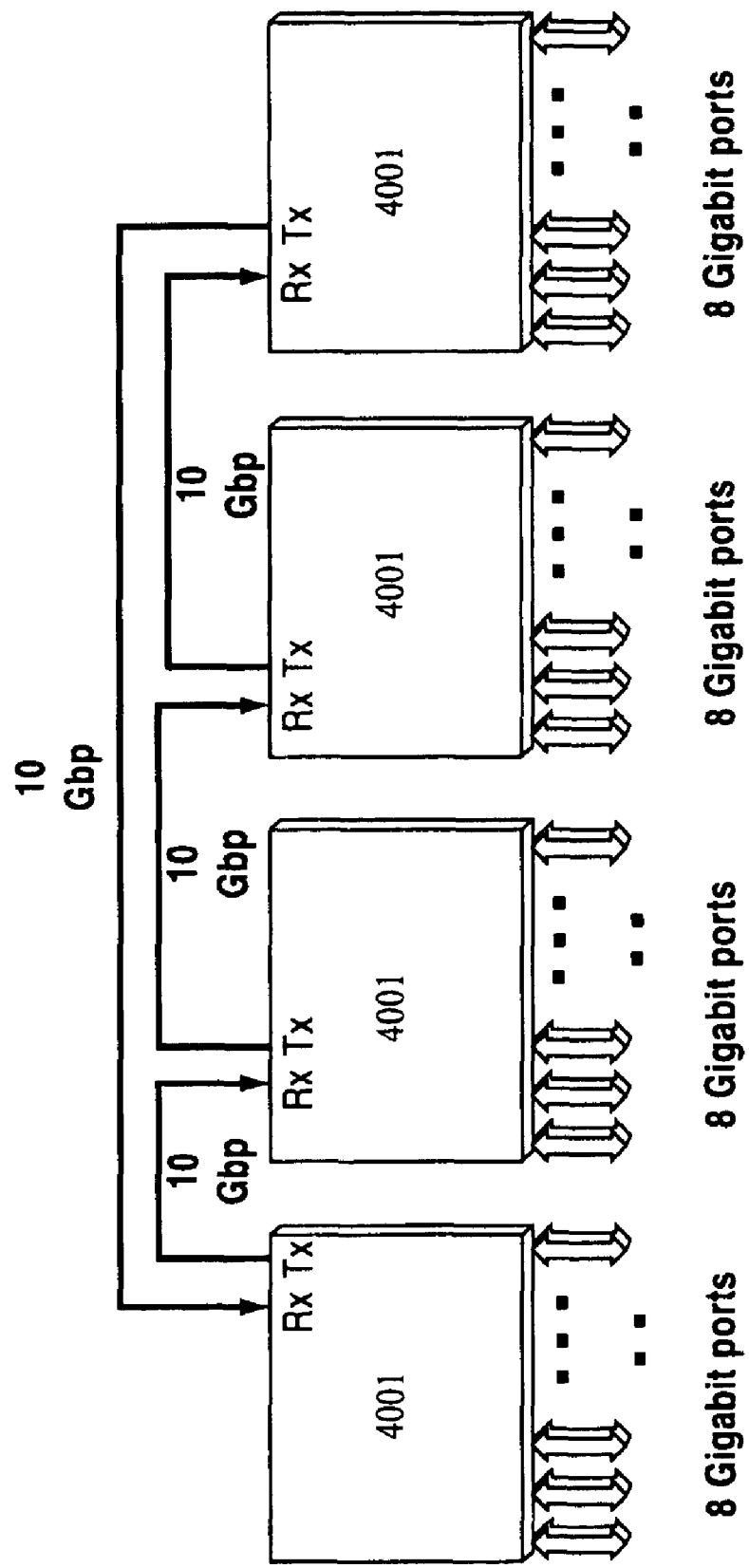
FIG. 40 illustrates a series of switches, according to the present invention, in a cascade formation.

The IPIC can also operate in a cascade mode. Since there in only one IPIC per device, only Simplex Interconnection (or uni-directional ring) mode of provided. FIG. 40 shows the interconnection of four devices connected in a simplex fashion.

The operation of the IPIC in the Cascade mode is as follows. When a packet is received from the 10GE interface, the IPIC module first checks if its bit is set in the Module ID Bitmap. If it is set, then the packet goes through the normal ARL logic. The IPIC will also flip the bit in the Module ID bitmap. If the resulting Module ID bitmap is not zero, then the IPIC port is also included in the Port Bitmap and sent to the MMU. If the resulting Module ID bitmap is zero, then the port bitmap will not include the IPIC port. This will prevent looping of the packets on the stack.

In the Cascade mode, both ingress and egress mirroring are supported. The following scenarios are possible with mirroring. First, the Packet is ingress mirrored and sent to destination port. In this case the packet needs to be ingress mirrored as well as sent to the destination port. The destination module and the Mirrored-To-Module (MTM) may be the same or different. The IPIC in the source module will set the M bit, set the bit in the module id bitmap corresponding to the MTM and the Opcode value is set depending on the packet is unicast (known or unknown), multicast or broadcast. The bits corresponding to destination module(s) are also set. The ingress logic in the IPIC will determine if the packet needs to be sent to the MTP or the destination port or both.

Second, the Packet may be egress mirrored. When a packet ingresses on the IPIC, if the destination port needs to be mirrored which is defined by the Egress Mirroring Register, the packet is sent to the MMU and then is sent back out again on the IPIC port.

The following tables and Registers are provided in IPIC. An IPIC CONFIG Register provides the configuration of the IPIC module, including if it is operating in cascade mode. An IPIC VTABLE (802.1Q) is also provided, where this table is used to get all the member ports of explicitly tagged VLAN. The VID of the incoming packet is used to index into the IPIC VTABLE.

Also, an IPIC STG Table is provided. The IPIC STG table is used to get the Spanning Tree State of the port. The Spanning Tree Group (STG) is picked up from the IPIC VTABLE. The STG is used as an index along with the ingress port number to obtain the Spanning Tree State of the ingress port for that VLAN. Entry 0 is the default SST and is used when the device runs a Single Spanning Tree or if the VLAN ID is not found in the VTABLE. When the device runs a single SST, the STG group is 0 for all VLANs.

Before sending the message to the egress port/ports the IPIC checks if the egress ports are in Forwarding State. The Forwarding PortBitmap for egress ports is constructed on a packet by packet basis. For a given STG, the 2 bits for each port are ANDED to determine the Spanning Tree state for that port and for that STG. This constructed Forwarding Port Bitmap is ANDED with the Egress PortBitmap along with EPC_LINK, Active Port Register and HOL Register to get the Final Port Bitmap.

An IPIC STACKMASK Table is provided. The table provides a PORT_BLOCK_MASK field that is ANDED with the Port Bitmap. This defines a specific set of ports that should be blocked for an ingress port in a module. If the bit position value is 0, then that port is blocked.

When packet ingresses on normal port, it goes through the ARL logic after which a Port Bitmap is obtained that indicates all the ports that the packet has to go out. The Port Bitmap is ANDED with the PORT_BLOCK_MASK from the PTABLE, which will determine the Port Bitmap before the packet processing enters the FFP and Mirroring logic. If the packet is tagged, the logic will pick up the PORT_BLOCK_MASK from the PTABLE for the ingress port and the VLAN bitmap from the VTABLE. This will allow the packet to be blocked on the ports in the local device.

When packet ingresses on HiGig port, it will go through the ARL logic to obtain the Port Bitmap for the current device. The PORT_BLOCK_MASK for the IPIC port is obtained by indexing the IPIC STACKMASK Table for the IPIC port with Src_Modid+Src_Port/SRC_TGID (obtained from the Module Header). The Port Bitmap is ANDED with this bitmask. This will allow the packet to be blocked on the current device based on the ingress port in another device.

The IPIC has its own ARL Table that is identical to the ARL Table defined for the Gigabit ports, discussed above. An IPIC Multicast Table and an IPIC IP Multicast Table are also provided. The search key for the Multicast Table is {Destination Multicast Mac address, VID}. When a Multicast packet arrives, the Multicast Table is searched with the key. If the entry is found, the Mc Port Bitmap and the Untagged Bitmap is picked up if the PFM for the ingress port is set to 1 or 2. If the PFM=0, the Port Bitmap and the Untagged Bitmap are always picked up from the PTABLE or VTABLE depending on whether the packet came in untagged or tagged. Multicast logic is further detailed in the ARL Flowchart. IP Multicast Table is used for L3 switching IP Multicast Packet coming in through the Stacking Interface (IPIC) The fields of the table are given below. The search key is {Source IP Address, Multicast IP Address}.

The IPIC Trunk Group Bitmap table is used to mainly to prevent the packet from going back on the same Trunk Group. The Source TGID from the module header of the incoming packet is used to index into this table. The Trunk Group Port Bitmap is 15 bits wide. The RTAG is also picked up from this table.

The Active Module Bitmap Register is a 32-bit register that has the bitmap of all the Active Modules. The bit is set if the module is active. When the Module goes down the CPU should reset the bit corresponding to that Module. This register is used in making the decision to send a packet to a module. Before sending the Packet out on the 10GE Interface this Register is ANDED with Module Id Bitmap from P channel to get the Module Id Bitmap to be inserted in the Module Header.

When a packet comes on the 10GE interface to the IPIC, destination port can be egress mirrored. In this case, the packet has to be sent to the Mirrored-To-Port (MTP) as well. If the egress port is in the local module, then a copy of the packet goes out on the MTP. If the MTP port is on another module, then the IPIC port is included in the Port Bitmap so that the packet goes our on the IPIC port again.

The IPIC DLF Trunk BitMap register (15 bits wide) contains the Bitmap for all the ports, which can receive Broadcast, Multicast and Unknown Unicast. For trunk ports only one port for the TGID should be set which is the designated port for Broadcast, Multicast and Unknown Unicast.

On certain ports in the switch, DLF unicast and multicast packets should be prevented from being forwarded. However, broadcast packets should always be forwarded to all ports. Currently, in the PTABLE or VTABLE, a single VLAN bitmap exists that is used for unknown unicast, multicast or broadcast packets. The present invention also provides separate bitmaps for unknown unicast and unknown multicast packets, and although the Broadcast packets should always be forwarded, a separate bitmap for broadcast is provided as well.

Mechanism to Prevent Head of Line Blocking,

When many ports are sending the packets to one port, then that port can get congested and this may lead to dropping of frames going out on other port. The best example of this is many clients are sending packets to the server, in which case server port can get congested.

Figure 41:
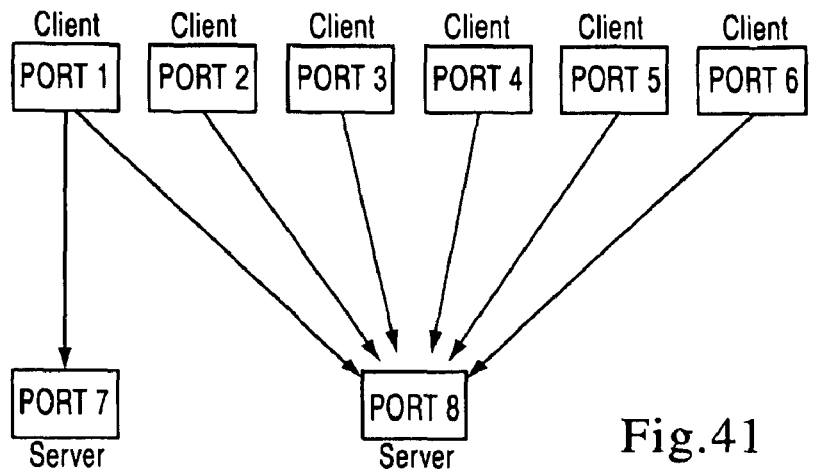
FIG. 41 illustrates the problem of Head Of Line blocking.

In the example illustrated in FIG. 41, ports 1-6 are sending packets to port 8. At some point in time if there is substantial traffic from ports 1-6 then port 8 will get congested. In switches that do not implement a mechanism to prevent Head of Line blocking, the congestion on one port can affect the traffic going to other port. In FIG. 41, even though port 8 is congested, port 1 and 7 should be able to communicate with each other without any problem. The present invention supports a mechanism to prevent Head Of Line Blocking based on number of packets per egress port per COS basis and number of cells on per egress port.

This mechanism considers the number of packets in each of the COS queues for a given port. Each port is allowed to have a maximum of 1024 packets from all the COS queues, waiting in the outgoing queue. This maximum is divided between the number of COS queues supported by a given port and is referred to as Maximum Transaction Queue Size.

Whenever, the total number of outstanding PIDs for a given COS on a port exceeds the sum of the Maximum Transaction Queue Size, the port is considered to be in COS_HOL blocking state for that COS. This condition of the port is updated in the Active Port Register, which shows a port bitmap of all ports in this state, for a given COS. There are also copies of these registers in the PCI memory space for the host CPU to be informed. The information in these registers is used by the ingress of all ports, before accepting packets destined to the ports in the COS_HOL blocking state.

A Temporal and Spatial Hysteresis mechanism is used to resume handling of the packets, when the outstanding packet count for the port falls below the Maximum Transaction Queue. A finite period controlled by the Poaching Timer Register is used as a waiting period before packets are handled again.

After the waiting period, the MMU sends the COS Queue Status Notification Message on the S-Channel with the bit set for the port. When the Ingress gets this message it sets the bit corresponding to this port in the Active Port Register. Ingress port can now send the packet to this Egress port on the COS Queue.

There are a total of 15 registers called HOL Cell Limit Register, one associated with each of the ports, including CPU. The 16-bit value programmed into these registers, represent the total allocated packet memory space for the port in cell (64 byte) units. Whenever the total packet memory utilized by a port exceeds this limit, the port is considered to be in HOL blocking state. This condition of the port is updated in the HOL Blocking Status Registers, which shows a port bitmap of all the ports in this state. There is also a copy of this register in the PCI memory space for the host CPU to be informed. The information in these registers is used by the ingress of all ports, before accepting packets destined to the ports in the HOL blocking state.

A Temporal and Spatial Hysteresis mechanism is used to resume handling of the packets, when the packet memory space utilized by the port falls below the HOL Cell Limit (spatial). A finite period controlled by the Poaching Timer register is used as a waiting period before packets are handled again.

After the waiting period, the MMU sends the HOL Notification Message on the S-Channel with the bit set for the port. When the Ingress gets this message it sets the bit corresponding to this port in the Active Port Register. Ingress port can now send the packet to this Egress port. It is noted that both mechanisms are active at the same time. Depending on the configuration and the packet length received for the egress port either the Cell HOL may reach first or the COS HOL may reach first.

Aging of Packets,

A Packet Aging Mechanism enables the Switch Fabric to discard a packet if it is sitting in the Switch Packet Memory for more than Egress Max Time duration. When a packet comes in it is Time Stamped (TS) by the ingress port. The Time Stamp is stored along with the packet header. When the egress port decides to send the packet out it checks if the Packet has exceeded the Egress Max Time, in that case the packet is dropped and the Age Frame Counter is incremented.

If Tc—TS Of Packet>Egress Max Time then drop the Packet, where Tc is the current Time and TS is Time Stamp on the packet. Time is tracked as a counter with a granularity of 2 microseconds. The only register used for Aging Mechanism is Egress Max Time Register.

Back Pressure Mechanism,

The present invention supports a mechanism to handle Back Pressure on any port, allowing for flexible flow control on packet transactions. Upon reaching a limit, whenever Back Pressure is detected on a port, three types of actions may be taken: 802.3x flow control, discard the incoming Packets when the Receive cell Discard Limit is hit, or enable a Jamming Signal when the Receive Cell Discard Limit is hit.

Each of the Gigabit port or TurboGig and the CPU port has its own programmable register, the Back Pressure Limit Register used to set the limit for detecting Back Pressure. The value programmed represents the number of cells budgeted for packet memory for that ingress port. Whenever the number of packets received reaches this programmed limit, MMU sends the Back Pressure Warning Status Message on the S Channel with the Port Bitmap indicating which port/ports have crossed the programmed limit.

The ingress ports applies flow control as follows: 802.3x Flow Control, when operating in Full Duplex mode, the 802.3x flow control is used. A PAUSE frame is sent to inhibit traffic incoming traffic on that port for specified period of time. A Jamming Signal is enabled if the port is configured in Half Duplex mode (10/100) and enabled to send Jamming Signal, the Jamming Signal is asserted.

For ports that continue to receive packets, even after applying the above flow control, a grace of 256 cells is provided above the Back Pressure Limit. This also helps to accommodate packets that may cross the memory boundary specified by the Back Pressure Limit. If the Back Pressure Limit+256 cells is also exceeded, the MMU sends the Back Pressure Discard message, with the Port Bitmap, such that the bit is set in the Port Bitmap for the port that has crossed this limit. The ports that have crossed the limit will start discarding the incoming packets.

A Temporal and Spatial hysteresis mechanism is used to resume handling of the packets when the packet memory space utilized by the port falls below the Back Pressure Limit. A finite period of time controlled by the Poaching timer is used as a waiting period before packets are handled again. At the end of this period, for Full Duplex ports, another PAUSE frame is sent (XON), with the time period set to '0' upon which the remote port can transmit again. For Half Duplex ports, if the Jamming Signal was asserted, it will be removed.

When a PAUSE frame (XOFF) message is sent a programmable timer is started (in the port). The timer value is less than the PAUSE time value (the max is 64K bit times). If the programmable timer expires and the backpressure signal is still asserted, then another PAUSE frame (XOFF) is sent. This process is repeated until the backpressure signal is de-asserted at which point, a PAUSE frame with zero time (XON) is sent.

Rate Control on Unicast, Multicast and Broadcast Packets

In real life, sometimes a NIC card can malfunction and flood the network by sending packets, either Unicast, Broadcast or Multicast at very high rate. In such situation, the rate control on a switch is a very useful feature which can prevent the packets from flooding into other part of network. The present invention provides a single configuration Rate Control Register for all the ports.

Port Mirroring,

Port Mirroring is a very useful feature for monitoring the traffic coming in or going out on particular port. One can mirror a port and put a Sniffer on "mirrored-to" port and monitor the traffic going on the port.

When a port is mirrored, any packet received on that port is sent to the mirrored-to port and any packet transmitted from the mirrored port is also sent to the mirrored-to port. However, the following additional rules can be configured to reduce the amount of traffic sent to the "mirrored-to" port. First, only frames destined for (egress) a specified port or coming from (ingress) specified port are forwarded. Second, only the frames destined for an internal L3 interface are forwarded. The logic that implements Port Mirroring was described in more detail as a part of ARL Logic section.

Link Aggregation

Port Bundling, also called Trunking, is a mechanism by which up to eight ports can be bundled together, to form what is called as port bundle or a trunk. The port bundle is like one logical link and is useful when one requires higher bandwidth and/or redundancy between switches.

The trunk ports in a bundle are always configured for full duplex. Apart from bandwidth the port trunking offers several other advantages, namely it provides aggregate throughput up to 16 Gbps and it provides Incremental bandwidth depending on the need. The increment is in terms of 2 Gbps. Other advantages are that trunking provides link redundancy and provides a way to balance the load going on the trunk ports. In case of trunk port failure the trunk group is modified and port trunk port which has a failure is removed from the group.

The Trunk Group table is indexed by Trunk Group Number (TG Index). Embodiments of the present invention support 6 trunk groups and each trunk group can have up to 8 trunk ports. If the MSB of the TGID/Port Number field is set in the ARL entry for the matched Destination Address, then this specifies that the destination address is learnt from one of the trunk ports. In that case, the egress port is decided not from the port number obtained from the ARL entry, but from the Trunk Group Id (TGID) and Rules Tag (RTAG). TGID identifies the Trunk Group Number and RTAG defines the criterion used in selecting the port.

TGID is used to index into Trunk Group Table to get the Trunk Group. Once the Trunk Group is obtained, the Trunk Port Index is needed to get the egress local port and the Module. The Trunk Port Index is picked up depending on the value of RTAG.

If RTAG=1, then the last three bits of the Source Mac Address are used to get the trunk port Index. Trunk Port Index=(Source Mac Address byte0 & 0x07) MOD (size of TrunkGroup)

If RTAG=2, then the last three bits in the Destination Mac Address are used to get the trunk port Index. Trunk Port Index=(Destination Mac Address byte0 & 0x07) MOD (size of TrunkGroup)

If RTAG=3, then the last three bits of Source Mac Address are XORED with the last three bits of Destination Mac Address. This result is used get the trunk port Index. Trunk Port Index=((Source Mac Address byte0 XOR Destination Mac Address byte0) & 0x07) MOD (size of TrunkGroup)

If RTAG=4, then the last three bits of Source IP Address is used to get the trunk port Index. Trunk Port Index=(Source IP Address byte0 & 0x07) MOD (size of TrunkGroup)

If RTAG=5, then the last three bits of Destination IP Address is used to get the trunk port Index. Trunk Port Index= (Destination IP Address byte0 & 0x07) MOD (size of TrunkGroup)

If RTAG=6, then the last three bits of Source IP Address are XORED with the last three bits of Destination IP Address. This result is used to get the trunk port Index. Trunk Port Index=((Source IP Address byte0 XOR Destination IP Address byte0) & 0x07) MOD (size of TrunkGroup)

It is noted that for RTAG 4, 5, 6, the Packet has to be an IP Packet. If the packet is not an IP Packet then the RTAG value is ANDED with 0x03 and the resulted is incremented by 1 to get the derived RTAG (Derived RTAG=(RTAG & 0x03)+1). This Derived RTAG value is used to get the Trunk port Index.

The Broadcast and DLFs are handled slightly differently than the unicast packets. There is no need to send the Broadcast or DLFs Packets on all the ports of the trunk Group. The VLAN bitmap in the PTABLE and VTABLE is set for all the ports in the trunk group. This Port Bitmap is ANDED with the DLF Trunk Bitmap so that the DLF/Broadcast packet goes out only one port.

If the packet comes in on one of the trunk port and after the Address resolution it is found that it has to go out as a Broadcast Message or as unknown unicast, then the ports on which this packet should go out (PortBitmap) is derived as follows. The TGID is picked up from the PTABLE. This TGID is used to index the Trunk Group Bitmap Table to get the Trunk Group Bitmap. Final Broadcast/DLF Bitmap=Port Bitmap from PTABLE/VTABLE & ~(Src Trunk Group Bitmap) & DLF Trunk Bitmap.

The Multicast packets are handled in two different ways for trunk Group. If the Multicast Address is not present in the Multicast Table then it is handled the same way as Broadcast or DLFs. For the Multicast addresses added in the Multicast Table under explicit management control, either by the user or by the GMRP process, the Port Bitmap is set such that it contains only one trunk port of the trunk Group. If the packet comes in on one of the trunk port then the Multicast Bitmap is derived the same way as is done for Broadcast or DLF.

If one of the trunk ports goes down then the following tables need to be changed: Trunk Group Table, PTABLE, VTABLE, and Multicast Address entries in the Multicast Table.

Once the trunk Group logic gets the notification that one of the egress port has gone down, it sends notification to CPU. It is the responsibility of CPU to go through the Trunk Group table and delete that port from the table. It should also go through both the VLAN Tables, PTABLE and VTABLE, and change the Port Bitmap, such that the port which has gone down is removed from the Bitmap. For the Multicast Addresses the CPU should go through the Multicast Table and change the Port Bitmap so as to exclude the port which has gone down and include other port from the Trunk Group.

The Unicast addresses are handled in different manner. They either will be aged out once the AGE TIMER expires or will be re-learnt on a new port.

When the trunk port comes up the above process has to be reversed. The Port Up Event is sent to the CPU and it is the responsibility of CPU to modify VLAN Port Bitmap in PTABLE and the VTABLE and also the McPortBitmap for the Multicast Addresses in the MARL Table to include this port.

The software insures that frames do not go out of order when a trunk port goes down or comes up. Specifically, the following steps need to be taken. 1. Stop all traffic going to the trunk group. 2. Drain all packets in the memory queued to this trunk group until it is zero. 3. Set the TG_SIZE to the new value and update the trunk group table, PTABLE, VTABLE and the MARL table. 4. Enable all the trunk ports (i.e. set EPC_LINK).

Since a trunk Group is like one logical link, it should accept BPDUs on only one of the trunk ports of the trunk Group. Capability is needed in the PTABLE to reject incoming BPDUs. This is provided by B Bit in that table. For the ports, which do not accept BPDUs, this bit should be set to 1.

Spanning Tree (802.1D) Support.

In order to make the switch fully compliant with the Spanning Tree (IEEE 802.1 D) specification, the following Spanning Tree support is provided in embodiments of the present invention.

Spanning Tree State bits (Sp Bits) in the PTABLE allows the CPU to program the ports for a specific ARL State, so that the ARL Logic takes the necessary action on the incoming packet depending on this state. The Spanning Tree States are Disable, Blocking, Listening, Learning and Forwarding. B Bit in the PTABLE provides capability to reject BPDUs. This bit is set for trunk ports which are not suppose to accept BPDUs. St Bit in the ARL Table allows CPU to learn the Static Entries. Static Entries should not be aged out by the Aging Process.

Hit Bit in the ARL Table allows the ARL to detect whether there was a hit in on this entry. If there is no hit on the entry for the Age TIME duration (default is 300 seconds) then the ARL Aging Mechanism deletes this entry. The present invention also provides a Self Learning Mechanism, an Aging Mechanism and a Filtering Mechanism.

In addition, ARL Logic Detects BPDUs and send it to CPU. ARL Logic detects Reserved Addresses from 0x01-80-C2-00-00-00 to 0x01-80-C2-00-00-10 and gives it to CPU. ARL does not forward BPDUs nor the reserved addresses. Lastly, the present invention supports Transparent Bridging. Apart from the ARL Table and PTABLE, the register used for Spanning Tree implementation is AGE_TIMER Configuration Register, which is used to set the AGE_TIMER in seconds Traffic Class Expediting and Dynamic Multicast Filtering (802.1P) Support IEEE 802.1p specification defines capability to provide expedited traffic capabilities, to support the transmission of time critical information through the LAN segment, and filtering services that support the dynamic use of Group MAC addresses in a LAN environment.

The present invention provides the following support for the IEEE 802.1p standard. A Mc Port Bitmap is provided in the Multicast table which identifies all the port Members for the Multicast Address. ARL Logic identifies the GMRP address 0x01-80-C2-00-00-20 and forwards it to CPU. Lastly, a Port Filtering Mode Register is also provided to provide the port filtering mode for a particular port.

The following Bridge Filtering Modes are defined by the standard. In Bridge Filtering Mode 1, the Forwarding Process forwards all frames destined for individual and group MAC addresses for which the Filtering Database has no explicit filtering information in the form of Static and Dynamic Filtering Entries. In Bridge Filtering Mode 2, the contents of any Static or Dynamic Filtering Services and any Group Registration Entries in the Filtering Database are taken into consideration in the forwarding/filtering decisions taken by the Forwarding Process.

The following Port Filtering Modes are defined below. In Port Filtering Mode A, All Addresses are forwarded. In this mode, the Forwarding operates as Bridge Filtering Mode 1. In Port Filtering Mode B, All Unregistered Addresses are forwarded. In this mode where the Group Mac Address Registration entries exist in the Multicast Table, frames destined for the corresponding group MAC addresses will be forwarded only on ports identified in the member port set, which in our case is identified by the Mc PortBitmap. In Port Filtering Mode C, All Unregistered Addresses are filtered. In this mode frames destined for group MAC addresses are forwarded only if such forwarding is explicitly permitted by a Group Address entry in the Multicast Table.

Virtual Bridged Local Area Networks (802.1Q) Support

IEEE 802.1Q specification defines capability to provide filtering services that support dynamic definition and establishment of VLAN Groups and the filtering of frames by the switch such that frames addressed to a particular VLAN Group are forwarded only on those LAN segments that are required in order to reach members of that VLAN Group. Additionally, Generic Attribute Registration protocol is also provided which is used to support the mechanism for providing Group Filtering capability.

The present invention provides the following support the IEEE 802.1q standard. PTABLE is provided to identify the VLAN ID associated with an Untagged or Priority Tagged Frame (i.e. a frame with no Tag Header, or a frame with a Tag Header that carries the NULL VLAN ID) and, also the membership of all the ports which are members of this VLAN. 802.1Q based VLAN Table is provided to get the VLAN port membership from the VLAN ID got from the Tag Header of the frame. Discard Untagged Frame Bit in PTABLE is provided, used to discard all the Untagged Frames. If this bit is set then any Untagged Frames and Priority Tagged frames are discarded.

VLAN Tag field in the ARL Table is used as part of Source Key and Destination Key to get to the ARL Entry, when doing the ARL searches. ARL Logic identifies the GVRP address 0x01-80-C2-00-00-21 and forwards it to CPU. The Untagged bit in PTABLE, 802.1Q based VLAN Table and the Multicast Table, to identify whether the frame going out on the ports, identified by the PortBitmap in case of Broadcast, DLFs or multicast address or by the port Number in case of unicast address, should be Tagged or Untagged. Ingress Filtering Mode Register is used to enable Ingress Filtering Mode.

The Tag Protocol Id Register is used to program the Tag Protocol Identifier value. The only reason this register exists is because the 802.1Q standard is not finalized. The default value of this register is 0x8100. The Tag Header consists of the Tag Protocol Identifier (TPID), and the Tag Control Information (TCI). The TCI field is two octets in length, and contains user priority, Canonical Format Indicator (CFI), and VLAN ID (VID).

The frame can be identified for the Tag header looking at 802.1Q Tag Type which comes after Source Address field in the Frame header. Once a packet is identified as the Tagged Frame, the VLAN ID and the User Priority can be extracted from the next two bytes. VLAN Id zero indicates that the Tag header contains only user priority information; no VLAN identifier is present in the frame. VLAN Id 0xFFF is Reserved. This VLAN Id should not be configured as a Port VLAN Id, configured in any Filtering Database entry, used in any Management operation, or transmitted in Tag Header. In case of VLAN Id=0, the VLAN Id is picked up from the PTABLE. In case the frame contains VLAN Id 0xFFF, the frame is dropped.

When a Tagged frame has to be transmitted out on a port as Untagged frame, the Tag header needs to be removed. This can be done by removing the 4 bytes of the Tag Header and recalculating the Frame Checksum. When an Untagged Frame has to be sent on a port as a Tagged Frame. The 4 bytes of Tag header need to be inserted after the Source Address field in the frame. The VID and COS field are got as a result of ARL search and the Common Format Indicator (CFI) should be set to 0. Priority tagged frame is tagged frame with VLAN ID=0. When a Priority Tagged Frame has to go out on a port as a Tagged Frame, the VLAN Id for the tagged frame is picked up from the PTABLE.

Figure 42A:
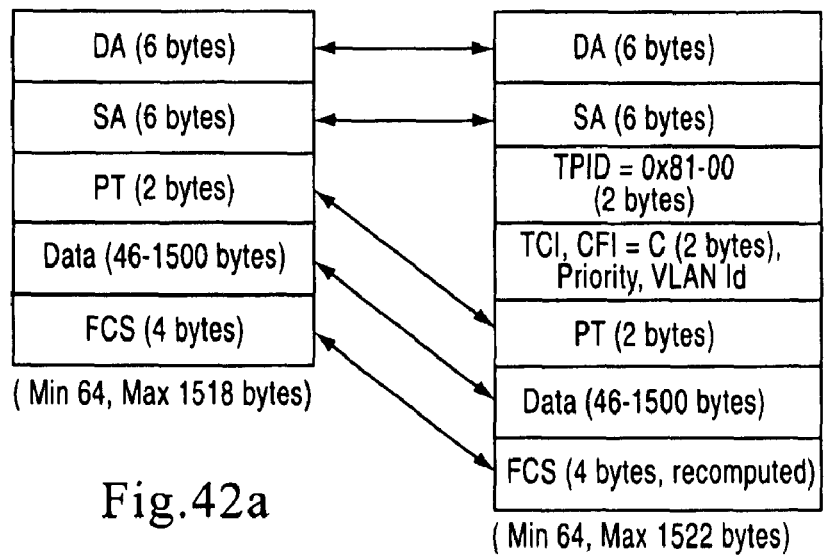
FIGS. 42a and 42b illustrate a general translation between untagged and tagged frames and the translation where the untagged frame carries LLC information, respectively.
Figure 42B:
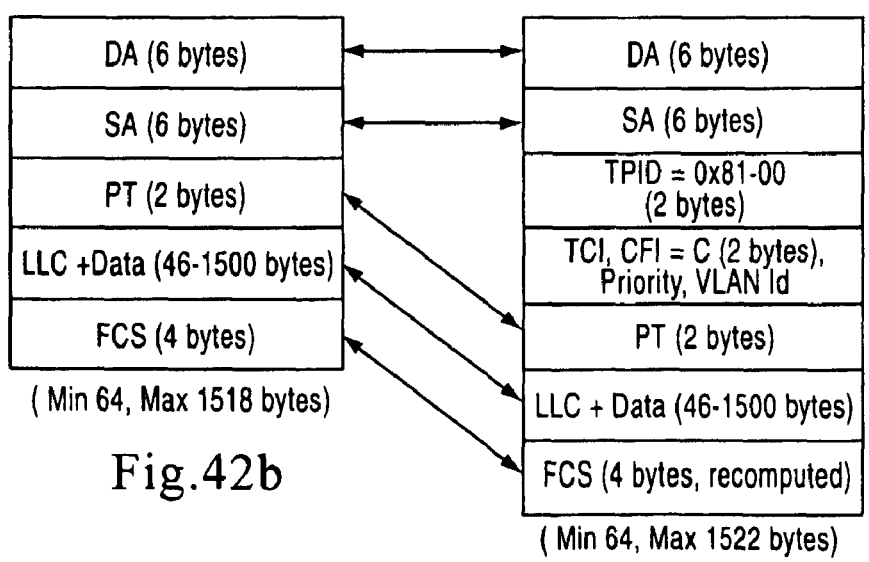

FIGS. 42a and 42b illustrate the translation between an Untagged Ethernet frame on 802.3/Ethernet and a Tagged Frame on 802.3/ethernet. FIG. 42b specifically illustrates the translation between an Untagged frame on 802.3/Ethernet carrying LLC information and a Tagged Frame on 802.3/ethernet.

Auto-Negotiation to Turbogig Speed

The switches of the present invention has the ability to Auto-negotiate speed on the uplink either as 1 Gbps or 2.5 Gbps. Auto-Negotiation for the speed is accomplished by the use of Next pages. Bit 15 of the ANNP/ANADV register should be set for the local as well as the link partner to auto-negotiate. In addition, the following changes are required: The packet engine's MAC code needs modifications to support auto-negotiation feature on Turbo ports. The modifications are 1) a Read Only bit to indicate that the Mac is Turbo capable and 2) a Read-Write bit to select the port speed, either 2.5 Gbps or 1 Gbps.

When Auto-Negotiation completes and the link partners next page is received with the correct message code, the software will program the Gigabit port to the turbo speed. There is no-auto negotiation in the Turbo mode; the MAC will go into the data transfer mode. If the port looses the link then it will fall back to the lower speed and restart the auto negotiation process.

Co-Existence of SL and HIGIG Style of Stacking.

Figure 43:
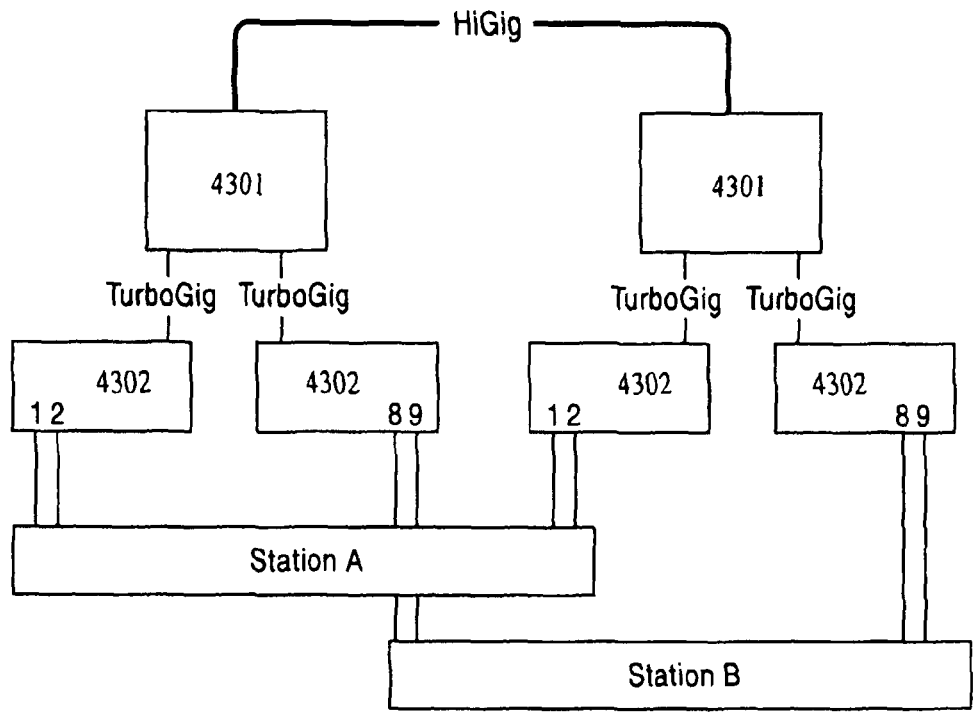
FIG. 43 illustrates an example of different types of stacking of switches in different configurations.

A unique feature of the present invention is seamless support for both styles of stacking at the same time. FIG. 43 shows an example configuration in which the both styles of stacking co-exist at the same time. In FIG. 43, the lower capacity devices 4302 are connected to the higher capacity devices 4301 using a TurboGig link as a Stacking link (SL Style—Duplex). Station A is connected to a trunk port, which comprises of port 1 and 2 on the left most device 4302 and ports 1, 2 on another device. Station B is connected to a trunk port which comprises of ports 8,9 on the right most device 4302 and ports 8,9 on another device.

In this mode of operation, the trunk ports span across the SL style stacking as well as HiGig style of stacking. The following points are required for this to work. All devices in the configuration should be configured to be in Stacking Mode. When the 4301 device is in Stacking Mode, the ARL Logic in the 4301 device will learn the address depending on whether the SRC_T bit in the Stack Tag is set or not set. In addition, the 4301 device will have to insert its module id in the ARL Table. For example, if packet arrives on port 1 in left most 4301 device from Station A, the ARL logic would learn the address, where the TGID and RTAG are picked up from the Stack Tag if the SRC_T bit is set.

The Stack Tag in the packet is passed on the HiGig along with the Module Header. If the destination port is a trunk port, the specific egress port (4301) gets resolved in the source module itself. When the packet arrives at the destination module, the packet is sent to specific egress port in the 4301 device. The module header is stripped by IPIC before it is sent to specific egress port. The packet when it goes to the 4302 device will contain the Stack Tag and the egress port gets resolved based on the Stack Tag for trunked ports.

Source Port Delivery in Stack Tag

Figure 44:
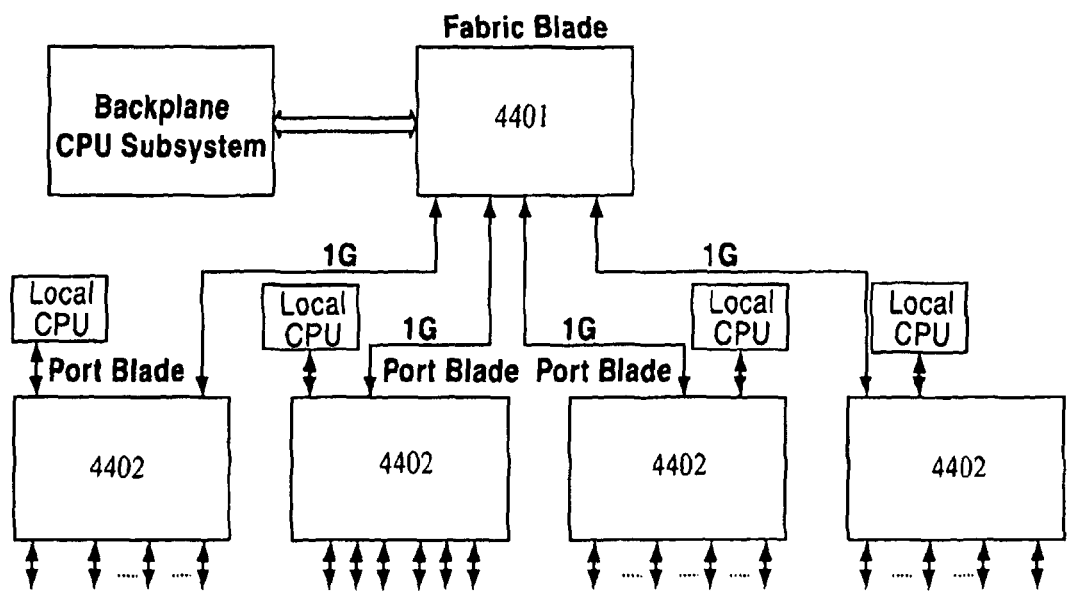
FIG. 44 illustrates a configuration of switches into port blades and a fabric blade.

The switches of the present invention can be used in many different applications. One such application involves a low cost chassis solution, which would have a many Port blades and a Fabric blade. The Fabric blade would have the CPU, while the Port blades may have a local CPU. In such a system, it may be necessary to send BPDUs and all management traffic to the CPU on the Fabric blade. FIG. 44 shows a schematic configuration of a 5 blade chassis.

The Port blades 4402 would be connected to the Fabric blade 4401 through the Stacking link. When a BPDU arrives at one of the ports in the Port blade, the BPDU should be sent to the Fabric CPU. This is accomplished using the Port steering feature in the FFP. In addition, the source port of the BPDU packet should be conveyed to the Fabric CPU. This would require a change in the ingress logic, which is explained below.

The present invention supports stacking of multiple switches through the Gigabit ports. In the Stacking mode, both trunking and mirroring is supported across the stack. This is accomplished by appending a Stack tag, which contains information relevant to trunking, and mirroring across the stack. The format of the packet on the Stack link is shown below.

TABLE 2

| DA | SA | VLAN Tag | Stack Tag | Type/Len | Data |
|---|---|---|---|---|---|
| (6 bytes) | (6 bytes) | (4 bytes) | (4 bytes) | (2 bytes) | |

This Stack tag can be used to convey the source port information on the Stacking ports. When the packet arrives on the trunk port, the ingress logic appends the stack tag with the SRC_T set and the SRC_TGID and the SRC_RTAG which is picked up from the PTABLE for the ingress port. However, when a packet arrives on a non-trunk port, the SRC_T is zero and the SRC_TGID and the SRC_RTAG are do not care fields.

The ingress changes are as follows. When a packet arrives on a non-trunk port, the ingress logic should write the source port in the SRC_TGID and SRC_RTAG fields. The SRC_TGID and SRC_RTAG are 3 bit fields and only the first 5 bits are needed. When the Fabric CPU receives a packet with Stack Tag, if the SRC_T bit is zero then the SRC_TGID and SRC_RTAG field is interpreted as source port. The delivery of source port information in the Stack tag is valid in only between two directly connected devices.

In the following sections, the stacking behavior specific to the Simplex interconnection, which is the preferred method of connectivity between the switch modules, will be described. Specifically, the Layer 3 operation is described in detail.

When a packet arrives on one of the ports, the ingress logic determines whether the packet needs to be L2 switched or L3 switched. If the packet arrives with the DA MAC address of that of the Router interface, the packet will be L3 switched. If the destination IP address is another module, then the packet is sent on the Stacking link after packet modification. The packet is then L2 switched to the final destination module and again L2 switched to the egress port within the final module.

The following rules are followed for the L3 stacking solution. When two stations, belonging to two different VLANs, are sending packets to each other and both the stations are within the same module, the packet is not sent on the stacking link. When two stations belonging to two different VLANs are sending packets to each other and the two stations are in different switch module, the packet is sent on the stacking link to all the modules. All packets are tagged on the Stacking link with VLAN tag and Broadcom proprietary tag. All Stacking link ports should be configured to be members of all VLANs.

Figure 45:
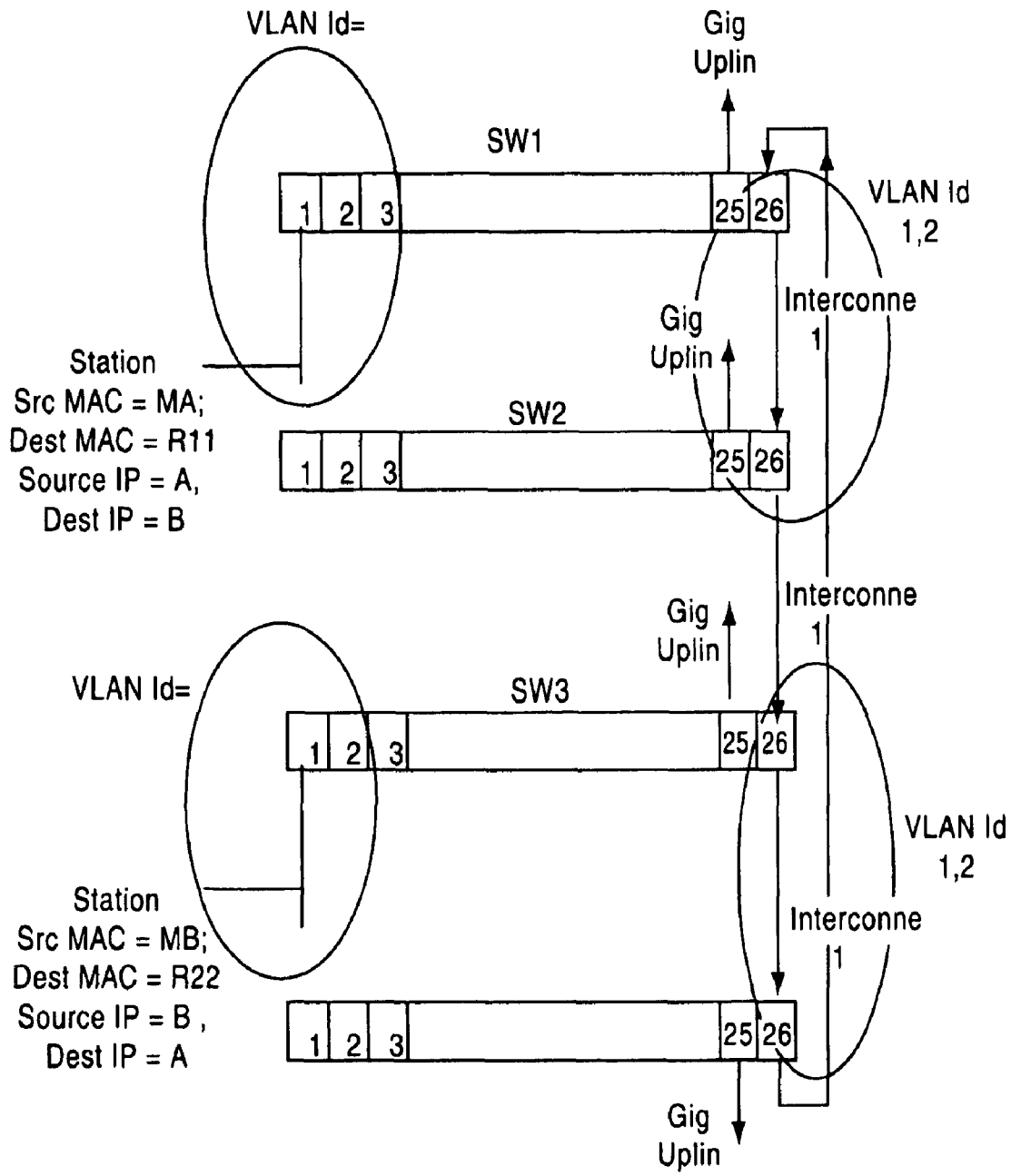
FIG. 45 illustrates a configuration of modules illustrating Layer 3 switching.

FIG. 45 illustrates L3 address learning and forwarding across the stack. Station A on port 1 in SW1 sends a packet to station B on port 1 in SW3. Station A is on port 1 in VLAN 1 in SW1 and Station B is on port 1 in VLAN 2 in SW3. It is also assumed that IP addresses A and B are not learnt in the L3 Table.

A Packet arrives on port 1 in SW1 with DestIP=B, Src MAC Address=MA and DA with that of the Router interface address R11. MAC address MA is learnt in SW1 on source lookup failure as shown in Table 1.2. L3 lookup for the DestIP=B will be a miss in the L3 Table and in the DEFIP Table. The packet is sent to CPU. CPU populates the L3 table with the Src IP Address A as shown in Table 3.

TABLE 3

| IP Address | Port Number | Next hop MAC Address | MAC Address of Router Interface | VLAN Id |
|---|---|---|---|---|
| A | 1 | MA | R11 | 1 |
| B | 26 | MB | R12 | 2 |

The CPU in SW1 will then do an ARP request for Destination IP address B to all the ports. Station B in SW3 will do an reply with MAC address of Station B. CPU on SW1 will populate the IP address B as shown in Table 4. CPU will also populate the ARL Table with MAC address of R11 with the L3 bit set and the ST bit set to indicate that it is a Static entry in Table 4. CPU should also insure that the source MAC address (MA and MB) is learnt in all the ARL Table of all the switch modules with ST=1.

TABLE 4

| VLAN ID | Mac Address | Port Number | ST | L3 |
|---|---|---|---|---|
| 1 | MA | 1 | 1 | 0 |
| 1 | R11 | 27 | 1 | 1 |
| 2 | MB | 26 | 1 | 0 |

CPU in SW1 will L3 switch the packet and the packet is modified as follows. Dest MAC address=MB, VLAN ID=2, Src MAC address=R12. The Stack Count is set to 3 (since there are 4 modules). Packet is sent on the Stacking link (i.e. port 26 in this example). Packet arrives on port 26 in SW2. Stack Count is decrement by 1 (now 2). In SW2, a source lookup of Source MAC address is a failure. Therefore the Source MAC address R12 is learnt as shown in Table 5. DA lookup of MAC address MB indicates that the packet should be sent on port 26. Packet is sent on the Stacking link.

TABLE 5

| VLAN ID | Mac Address | Port Number | ST | L3 |
|---|---|---|---|---|
| 2 | R!2 | 26 | 0 | 0 |
| 2 | MB | 26 | 1 | 0 |

The Packet arrives on port 26 in SW3. Stack Count is decrement by 1 (now 1). In SW3, a source lookup of Source MAC address is a failure. Therefore the Source MAC address R12 is learnt as shown in Table 6. DA lookup of MAC address indicates that the packet should be sent on port 1. Station A receives the packet. Packet is also sent on the Stacking link.

TABLE 6

| VLAN ID | Mac Address | Port Number | ST | L3 |
|---|---|---|---|---|
| 2 | R12 | 26 | 0 | 0 |
| 2 | MB | 1 | 1 | 0 |

The Packet arrives on port 26 in SW4. Stack Count is decrement by 1 (now 0) In SW4, a source lookup of Source MAC address is a failure. Therefore the Source MAC address R12 is learnt as shown in Table 7. DA lookup of MAC address MB indicates port 26. However, the packet is not sent on Stacking link (port 26) since Stack Count is 0.

TABLE 7

| VLAN ID | Mac Address | Port Number | ST | L3 |
|---|---|---|---|---|
| 2 | R12 | 26 | 0 | 0 |
| 2 | MB | 26 | 1 | 0 |

Now consider if Station B on port 1 in SW3 sends a packet to station A on port 1 in SW1. Packet arrives on port 1 in SW3 with DestIP=A, Src MAC Address=MB and DA with that of the Router interface address R22. MAC address MB is learnt in SW3 on source lookup failure as shown in Table 9. L3 lookup for the DestIP=A will be a miss in the L3 Table and in the DEFIP Table. The packet is sent to CPU. CPU populates the L3 table with the Src IP Address B as shown in Table 8.

TABLE 8

| IP Address | Port Number | Next hop MAC Address | MAC Address of Router Interface | VLAN Id |
|---|---|---|---|---|
| B | 1 | MB | R22 | 2 |
| A | 26 | MA | R21 | 1 |

CPU in SW3 will then do an ARP request for Destination IP address A to all the ports. Station A in SW1 will do an reply with MAC address of Station A. CPU on SW3 will populate the IP address A as shown in Table 8. CPU will also populate the ARL Table with MAC address of R22 with the ST bit set to indicate that it is a Static entry as shown in Table 9.

TABLE 9

| VLAN ID | Mac Address | Port Number | ST | L3 |
|---|---|---|---|---|
| 2 | R12 | 26 | 0 | 0 |
| 2 | MB | 1 | 1 | 0 |
| 2 | R22 | 27 | 1 | 1 |
| 1 | MA | 26 | 0 | 0 |

CPU in SW3 will L3 switch the packet and the packet is modified as follows. Dest MAC address=MA, VLAN ID=1, Src MAC address=R21. The Stack Count is set to 3 (since there are 4 modules). Packet is sent on the Stacking link (i.e. port 26 in this example). Packet arrives on port 26 in SW4. Stack Count is decrement by 1 (now 2). In SW4, a source lookup of Source MAC R21 address is a failure. Therefore the Source MAC address R21 is learnt as shown in Table 10. DA lookup of MAC address indicates port 26. So packet is sent on Stacking link.

TABLE 10

| VLAN ID | Mac Address | Port Number | ST | L3 |
|---|---|---|---|---|
| 2 | R12 | 26 | 0 | 0 |
| 2 | MB | 26 | 1 | 0 |
| 1 | R21 | 26 | 0 | 0 |
| 1 | MA | 26 | 1 | 0 |

Packet arrives on port 26 in SW1. Stack Count is decrement (now 1). In SW1, a source lookup of Source MAC R21 address is a failure. Therefore the Source MAC address R21 is learnt as shown in Table 11. DA lookup of MAC address MA indicates that the packet should be sent on 1. Station A receives the packet. Packet is also sent on Stacking link.

TABLE 11

| VLAN ID | Mac Address | Port Number | ST | L3 |
|---|---|---|---|---|
| 1 | MA | 1 | 1 | 0 |
| 1 | R11 | 27 | 1 | 1 |
| 2 | MB | 26 | 1 | 0 |
| 1 | R21 | 26 | 0 | 0 |

Packet is received on port 26 in SW2. Stack Count is decrement by 1 (now 0). In SW2, a source lookup of Source MAC R21 address is a failure. Therefore the Source MAC address R21 is learnt as shown in Table 12. DA lookup of MAC address MA indicates port 26. However, packet is not sent on Stacking link since Stack Count is 0.

TABLE 12

| VLAN ID | Mac Address | Port Number | ST | L3 |
|---|---|---|---|---|
| 2 | R12 | 26 | 0 | 0 |
| 2 | MB | 26 | 1 | 0 |
| 1 | R21 | 26 | 0 | 0 |
| 1 | MA | 26 | 1 | 0 |

Next, Station A sends a packet to Station B after addresses are learnt (L3). Port 1 in SW1 receives a packet addressed to the Router interface R11 with IP Dest Address=B. ARL Table search for DA=R11 has L3 bit set. Packet needs to be L3 switched. L3 Table lookup for Source IP=B is a hit. Packet is modified with Source MAC Address=R12, DA=MB. Packet is sent on Port 26 after TTL decrement and IP Header Checksum calculation and L2 CRC calculation. Stack Count is set to 3. Packet arrives on port 26 in SW2. Decrement Stack Count by 1 (now 2). Source Address of R12 is already learnt. DA lookup of MB indicates Port 26. Packet is L2 switched to port 26. Packet arrives on port 26 in SW3. Decrement Stack Count by 1 (now 1). Source Address of R12 is already learnt. DA lookup of MB indicates Port 1. Packet is L2 switched to port 1. Since Stack Count is not zero, packet is also sent on the Stacking link (Port 26). Packet arrives on port 26 in SW4. Decrement Stack Count by 1 (now 0). Source Address of R12 is already learnt. DA lookup of MB indicates Port 26. Since Stack Count is zero, packet is not so sent on the Stacking link. In general, the Layer 3 switching of the packet would involve crossing VLAN boundaries within the module, followed by bridging across the modules. This has the advantage that the TTL in the IP Header is decrement only once in the entire stack even though the packet traverses through multiple modules.

Figure 46:
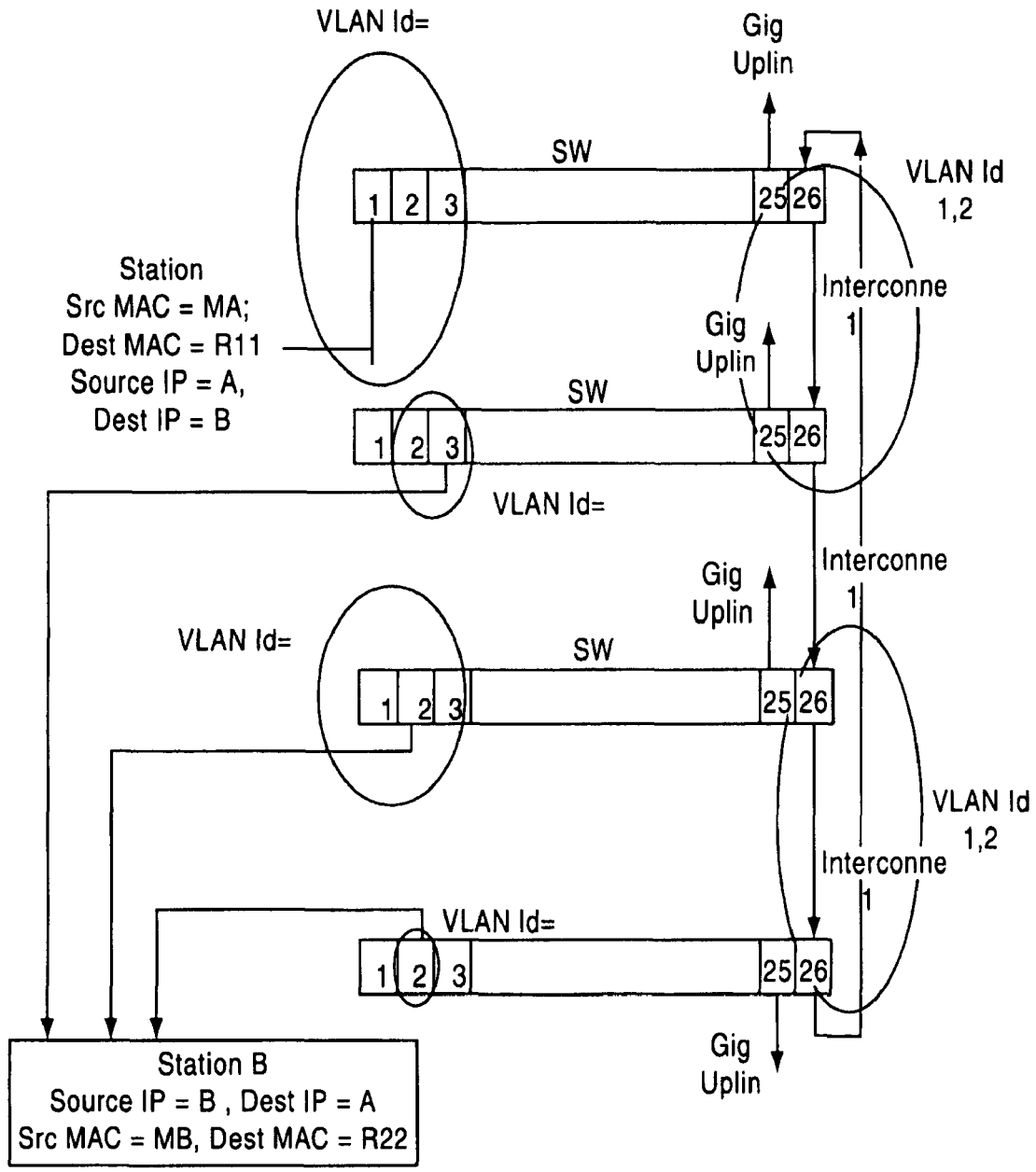
FIG. 46 illustrates a configuration of modules illustrating Layer 3 switching to a trunk port across a stack.

In this section, the L3 switching to a trunk port across modules is discussed. The configuration is illustrated in FIG. 46. The following scenarios are possible. In Scenario 1, an IP Packet arrives at a module. One (or many) of the destination trunk ports is (are) in the source module. In this case, the packet is L3 switched to the local trunk port. The local trunk port is the egress port specified in the L3 Table.

In scenario 2, the IP packet arrives at a module. The destination trunk port is not on the source module. FIG. 46 shows an example configuration. A packet with Source IP=A and Destination IP Address=B arrives in SW1 on port 1. IP Address B is a trunk port.

The packet flow is as follows. Packet is L3 switched to the stack link port in SW1. Stack Count is set 3. Packet is modified with outgoing VLAN ID=2. If the TGID==6 or 7, then the destination port is not a trunk port. Otherwise, the destination port is a trunk port. The TGID is used as index into the Trunk Group Table to get the RTAG. In the Stack tag, the DST_T is set, and the DST_TGID and DST_RTAG are set to values picked from the L3 Table and the Trunk Group Table. If the Source port was a trunk port, then the SRC_T, SRC_TGID and the SRC_RTAG is set which is picked up from the ARL Table.

Packet arrives on port 26 in SW2. Decrement Stack Count (now 2). Since the DST_T bit is set, the ingress will go through the trunking logic to determine the egress port. Packet is also sent on Stacking link since Stack Count is not zero. Packet arrives on port 26 in SW3. Decrement Stack Count (now 1). Since the DST_T bit is set, the ingress will go through the trunking logic to determine the egress port. Packet is also sent on Stacking link since Stack Count is not zero.

Packet arrives on port 26 in SW4. Decrement Stack Count (now 0). Since the DST_T bit is set, the ingress will go through the trunking logic to determine the egress port. Packet is not sent on the Stacking link since Stack Count is 0. The trunking logic in each module will ensure that the packet will go out on only module to Station B.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A network switch for network communications, the network switch comprising:
    a first data port interface supporting a data port transmitting and receiving data at a first data rate;
    a second data port interface supporting a data port transmitting and receiving data at a second data rate; and
    a plurality of lookup tables, the lookup tables including an address resolution lookup table and a VLAN table,
    wherein:
        the first data port interface or the second data port interface is configured to determine an egress port by obtaining a class of service;
        the second data rate is greater than the first data rate, a header of the incoming data packet contains an opcode used to identify a packet type, and when the incoming data packet arrives at a port of the second data port interface, the second data port interface is configured to forward the incoming packet based on the opcode; and
        the opcode identifies whether the incoming data packet is a unicast packet, a multicast packet, a broadcast packet or resulted in a destination lookup failure.

2. The network switch as recited in claim 1, wherein the first data port interface or the second data port interface is configured to determine the egress port for an incoming data packet received by performing a search of the address resolution lookup table and the VLAN table' using an identifier derived from the incoming data packet.

3. The network switch as recited in claim 2, wherein the identifier comprises a VLAN ID.

4. A method of switching data in a network switch, the method comprising:
    receiving an incoming data packet at a first port of a switch;
    reading a first packet portion, less than a full packet length, to determine particular packet information;
    modifying the incoming data packet to include forwarding and routing information;
    obtaining the egress port by obtaining a class of service;
    sending the modified data packet to the egress port;
    deriving a VLAN ID from the first packet portion;
    searching a VLAN table using the VLAN ID;
    searching an address resolution lookup table using the particular packet information and the VLAN ID;
    determining whether there is a matched entry in the address resolution lookup table; and
    when the matched entry is not in the address resolution lookup table, learning the particular packet information and placing the particular packet information as an ent in the address resolution lookup table.

5. The method as recited in claim 4, wherein the deriving of the VLAN ID from the first packet portion comprises:
    reading the VLAN ID from a VLAN tag in a header of the incoming data packet, when the incoming data packet is tagged; and
    searching a port-based VLAN table based on the particular packet information to obtain the VLAN ID, when the incoming data packet is untagged.

6. The method as recited in claim 4, wherein when the incoming data packet is a multicast packet, the obtaining of the egress port comprises:
 deriving a multicast index from a result from the step of searching the address resolution lookup table; and
 searching a multicast table using the multicast index as a key to obtain the egress ports.

7. The method as recited in claim 4, wherein the obtaining of the egress port comprises obtaining a port bitmap, a module ID bitmap, and an untagged port bitmap.

8. The method as recited in claim 4, further comprising:
 determining whether the incoming data packet is to be mirrored to another port;
 determining whether a destination for the incoming data packet is a trunked port; and
 determining whether a destination for the incoming data packet is on a stacked linked network switch connected to the network switch.

9. A network switch, comprising:
 a first port;
 means for receiving an incoming data packet at the first port;
 means for reading a first packet portion, less than a full packet length, to determine particular packet information;
 means for searching an address resolution lookup table using the particular packet information and an identifier;
 means for modifying the incoming data packet to include forwarding and routing information;
 means for obtaining the egress port by obtaining a class of service; and
 means for sending the modified data packet to the egress port,
 wherein when the matched entry is not in the address resolution lookup table, means for updating the address resolution lookup table with the particular packet information.

10. The network switch as recited in claim 9, further comprising:
 means for deriving the identifier from the first packet portion;
 means for searching a VLAN table using the identifier;
 means for determining whether there is a matched entry in the address resolution lookup table; and
 means for learning the particular packet information and means for placing the particular packet information as an entry in the address resolution lookup table.

11. The network switch as recited in claim 10, wherein the means for deriving the identifier from the first packet portion comprises:
 means for reading the identifier from a VLAN tag in a header of the incoming data packet, when the incoming data packet is tagged; and
 means for searching a port based VLAN table based on the particular packet information to obtain the identifier,
 wherein the means for reading the identifier supplies the identifier when the incoming data packet is tagged and the means for searching a port based VLAN table supplies the identifier when the incoming data packet is untagged.

12. The network switch as recited in claim 9, wherein when the incoming data packet is a multicast packet, the means for obtaining an egress port comprises:
 means for deriving a multicast index from a result from the step of searching the address resolution lookup table; and
 means for searching a multicast table using the multicast index as a key to obtain the egress ports.

13. The network switch as recited in claim 9, wherein the means for obtaining the egress port comprises means for obtaining a port bitmap, a module ID bitmap, and an untagged port bitmap.

14. The network switch as recited in claim 9, further comprising:
 means for determining whether the incoming data packet is to be mirrored to another port;
 means for determining whether a destination for the incoming data packet is a trunked port; and
 means for determining whether a destination for the incoming data packet is on a stacked linked network switch connected to the network switch.

15. The network switch as recited in claim 9, wherein the identifier comprises a VLAN ID.

* * * * *